United States Patent
Lee et al.

(10) Patent No.: US 11,327,333 B2
(45) Date of Patent: May 10, 2022

(54) LENS DRIVING DEVICE, AND CAMERA MODULE AND OPTICAL DEVICE COMPRISING SAME

(71) Applicant: LG INNOTEK CO., LTD., Seoul (KR)

(72) Inventors: Sung Guk Lee, Seoul (KR); Byung Wook Son, Seoul (KR); Seong Min Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/627,186

(22) PCT Filed: Jun. 29, 2018

(86) PCT No.: PCT/KR2018/007387
§ 371 (c)(1),
(2) Date: Dec. 27, 2019

(87) PCT Pub. No.: WO2019/004765
PCT Pub. Date: Jan. 3, 2019

(65) Prior Publication Data
US 2020/0166770 A1    May 28, 2020

(30) Foreign Application Priority Data

Jun. 30, 2017  (KR) .......................... 10-2017-0083121
Nov. 27, 2017  (KR) .......................... 10-2017-0159338

(51) Int. Cl.
*G02B 27/64* (2006.01)
*G02B 7/09* (2021.01)
(Continued)

(52) U.S. Cl.
CPC ............... *G02B 27/64* (2013.01); *G02B 7/09* (2013.01); *G03B 17/12* (2013.01); *G03B 5/02* (2013.01)

(58) Field of Classification Search
CPC .......... G02B 27/64; G02B 7/09; G03B 17/12; G03B 5/02
See application file for complete search history.

(56) References Cited

U.S. PATENT DOCUMENTS

2016/0011394 A1*  1/2016  Cho .......................... G03B 3/10
                                                          359/822
2016/0178925 A1   6/2016  Park et al.
(Continued)

FOREIGN PATENT DOCUMENTS

CN  103809263 A   5/2014
CN  105022203 A   11/2015
(Continued)

OTHER PUBLICATIONS

Supplementary European Search Report dated Jul. 8, 2020 in European Application No. 18825086.4.
(Continued)

*Primary Examiner* — Clayton E. LaBalle
*Assistant Examiner* — Diana Hancock
(74) *Attorney, Agent, or Firm* — Saliwanchik, Lloyd & Eisenschenk

(57) ABSTRACT

An embodiment comprises: a housing including a hole; a bobbin disposed in the housing; a first coil disposed in the bobbin; a magnet disposed in the housing; an upper elastic member coupled to an upper portion of the housing; a support member coupled to the upper elastic member through the hole; and a base disposed under the housing, wherein the housing comprises: a first surface to which the upper elastic member is coupled; a second surface which is disposed at a position higher than a bottom surface of the housing and lower than the first surface; and a sloped surface which is adjacent to the second surface and has a predetermined angle with respect to the second surface, and wherein
(Continued)

the hole is formed in the area of at least one of the second surface and the sloped surface.

20 Claims, 44 Drawing Sheets

(51) Int. Cl.
*G03B 17/12* (2021.01)
*G03B 5/02* (2021.01)

(56) References Cited

U.S. PATENT DOCUMENTS

| | | | | |
|---|---|---|---|---|
| 2016/0182775 | A1* | 6/2016 | Cho | H04N 5/2252 |
| | | | | 348/208.99 |
| 2016/0209621 | A1 | 7/2016 | Park et al. | |
| 2017/0052342 | A1* | 2/2017 | Shin | H04N 5/2253 |
| 2018/0364445 | A1* | 12/2018 | Osaka | G02B 7/09 |

FOREIGN PATENT DOCUMENTS

| | | | |
|---|---|---|---|
| CN | 105717726 A | 6/2016 | |
| CN | 105721746 A | 6/2016 | |
| CN | 105739051 A | 7/2016 | |
| CN | 105807538 A | 7/2016 | |
| CN | 105988262 A | 10/2016 | |
| JP | 5849830 B2 | 12/2015 | |
| JP | 6008038 B2 | 9/2016 | |
| JP | 2017-62470 A | 3/2017 | |
| JP | 2017-76135 A | 4/2017 | |
| KR | 10-2011-0008808 A | 1/2011 | |
| KR | 10-2013-0061491 A | 6/2013 | |
| KR | 10-2014-0011850 A | 1/2014 | |
| KR | 10-2015-0054719 A | 5/2015 | |
| KR | 10-2017-0006731 A | 1/2017 | |
| KR | 10-2017-0021610 A | 2/2017 | |
| KR | 10-2017-0052233 A | 5/2017 | |
| KR | 10-2017-0068085 A | 6/2017 | |
| KR | 10-2017-0068807 A | 6/2017 | |
| WO | WO-2016/103713 A1 | 6/2016 | |
| WO | WO-2017/078364 A1 | 11/2017 | |
| WO | WO-2018084584 A1 * | 5/2018 | H04N 5/247 |

OTHER PUBLICATIONS

International Search Report in International Application No. PCT/KR2018/007387, filed Jun. 29, 2018.
Office Action dated May 7, 2021 in Chinese Application No. 201880049912.4.
Office Action dated Feb. 20, 2022 in Korean Application No. 10-2017-0083121.
Office Action dated Feb. 8, 2022 in Korean Application No. 10-2017-0159338.
Notice of Allowance dated Mar. 3, 2022 in Chinese Application No. 201880049912.4.

* cited by examiner

LENS DRIVING DEVICE, AND CAMERA MODULE AND OPTICAL DEVICE COMPRISING SAME

CROSS-REFERENCE TO RELATED APPLICATIONS

This application is the U.S. national stage application of International Patent Application No. PCT/KR2018/007387, filed Jun. 29, 2018, which claims the benefit under 35 U.S.C. § 119 of Korean Application No. 10-2017-0083121, filed Jun. 30, 2017; and 10-2017-0159338, filed Nov. 27, 2017, the disclosures of each of which are incorporated herein by reference in their entirety.

TECHNICAL FIELD

Embodiments relate to a lens moving apparatus, and a camera module and an optical instrument including the same.

BACKGROUND ART

It is difficult to apply technology of a voice coil motor (VCM) used in existing general camera modules to a sub-miniature, low-power camera module, and therefore research related thereto has been actively conducted.

Demand for and production of electronic products, such as smartphones and mobile phones equipped with cameras have increased. A camera for mobile phones is on a trend of increased resolution and miniaturization. As a result, an actuator has also been miniaturized, increased in diameter, and had multifunctionality. In order to realize a high-resolution camera for mobile phones, improvement in performance of the camera for mobile phones and additional functions thereof, such as autofocus, handshake correction, and zooming, are required.

DISCLOSURE

Technical Problem

Embodiments provide a lens moving apparatus capable of inhibiting spatial interference with a housing and a supporting member and spatial interference with the housing and an upper spring and realizing an optical image stabilizer having a small height, and a camera module and an optical instrument including the same.

Technical Solution

In one embodiment, a lens moving apparatus includes a lens moving apparatus including a housing including a hole, a bobbin disposed in the housing, a first coil disposed on the bobbin, a magnet disposed on the housing, an upper elastic member coupled to an upper portion of the housing, a supporting member coupled to the upper elastic member through the hole, and a base disposed under the housing, wherein the housing includes a first surface, to which the upper elastic member is coupled, a second surface disposed higher than a bottom surface of the housing and lower than the first surface, and an inclined surface adjacent to the second surface and having a predetermined angle relative to the second surface, and the hole is formed in at least one of the second surface or the inclined surface.

The hole may be formed over the inclined surface and the second surface.

The inclined surface may extend from the second surface.

The inclined surface may be formed at an edge of the housing.

The hole may be formed in a corner of the housing.

The second surface may further include a horizontal surface connected to the inclined surface, the inclined surface may be located outside the horizontal surface based on an optical axis, and the hole may be formed over the inclined surface and the horizontal surface.

The inclined surface may be inclined downwards from the horizontal surface.

The upper elastic member may be spaced apart from the horizontal surface and the inclined surface.

The magnet may be disposed at each corner of the housing.

The lens moving apparatus may further include a damper disposed on the horizontal surface and the inclined surface.

Advantageous Effects

According to embodiments, it is possible to realize a lens moving apparatus which is capable of inhibiting spatial interference with a housing and a supporting member and spatial interference with the housing and an upper spring, which has the function of an optical image stabilizer, and which has a small height.

BEST MODE

Figure 1:
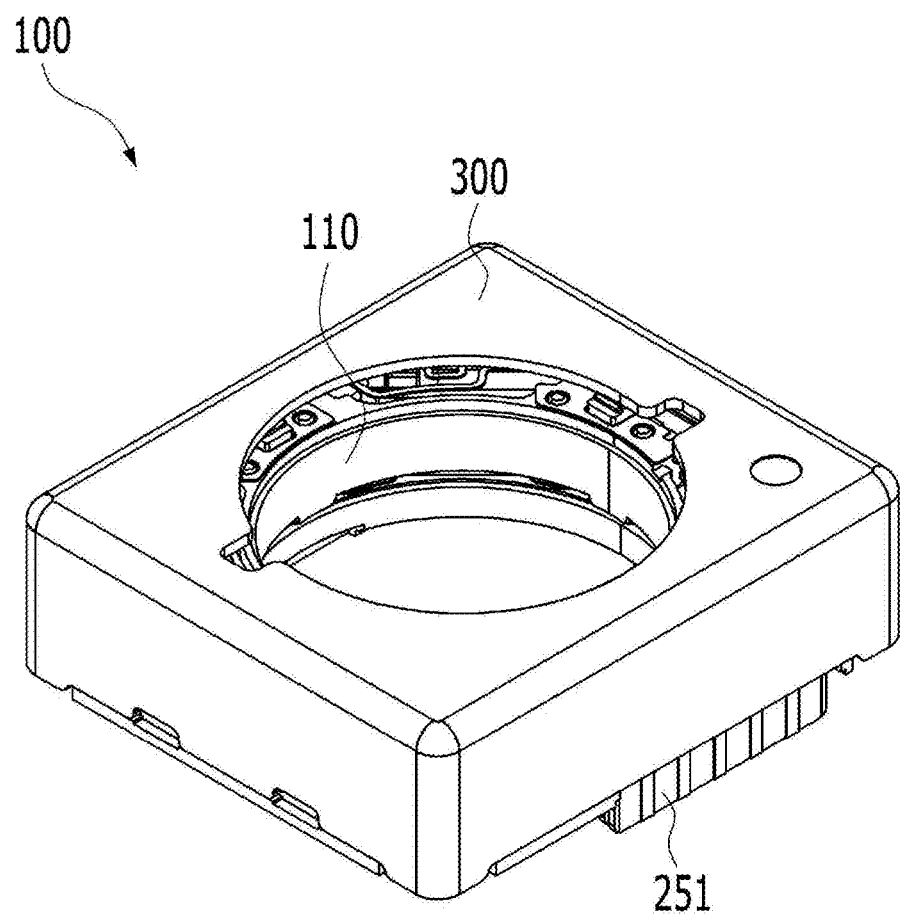
FIG. 1 is a perspective view of a lens moving apparatus according to an embodiment.

Reference will now be made in detail to embodiments, examples of which are illustrated in the accompanying drawings. In the following description of the embodiments, it will be understood that, when a layer (film), region, pattern, or structure is referred to as being "on" or "under" another layer (film), region, pattern, or structure, it can be "directly" on or under the other layer (film), region, pattern, or structure or can be "indirectly" formed such that an intervening element is also present. In addition, terms such as "on" or "under" should be understood on the basis of the drawings.

In the drawings, the sizes of respective elements are exaggerated, omitted, or schematically illustrated for convenience and clarity of description. Further, the sizes of the respective elements do not denote the actual sizes thereof. In addition, wherever possible, the same reference numbers will be used throughout the drawings to refer to the same or like parts.

Hereinafter, a lens moving apparatus according to an embodiment will be described with reference to the accompanying drawings. For convenience of description, the lens moving apparatus according to the embodiment will be described using a Cartesian coordinate system (x, y, z). However, the disclosure is not limited thereto. Other different coordinate systems may be used. In the drawings, an x axis and a y axis are directions perpendicular to a z axis, which is an optical-axis direction. The z-axis direction, which is the optical-axis direction, may be referred to as a "first direction," the x-axis direction may be referred to as a "second direction," and the y-axis direction may be referred to as a "third direction."

The lens moving apparatus according to the embodiment may perform an "autofocus function." Here, the autofocus function means a function of automatically focusing an image of a subject on the surface of an image sensor.

In addition, the lens moving apparatus according to the embodiment may perform a "handshake compensation function." Here, the handshake compensation function means a function of inhibiting the contour of a captured still image from being blurred due to vibration caused by handshake of a user when capturing the still image.

Figure 2:
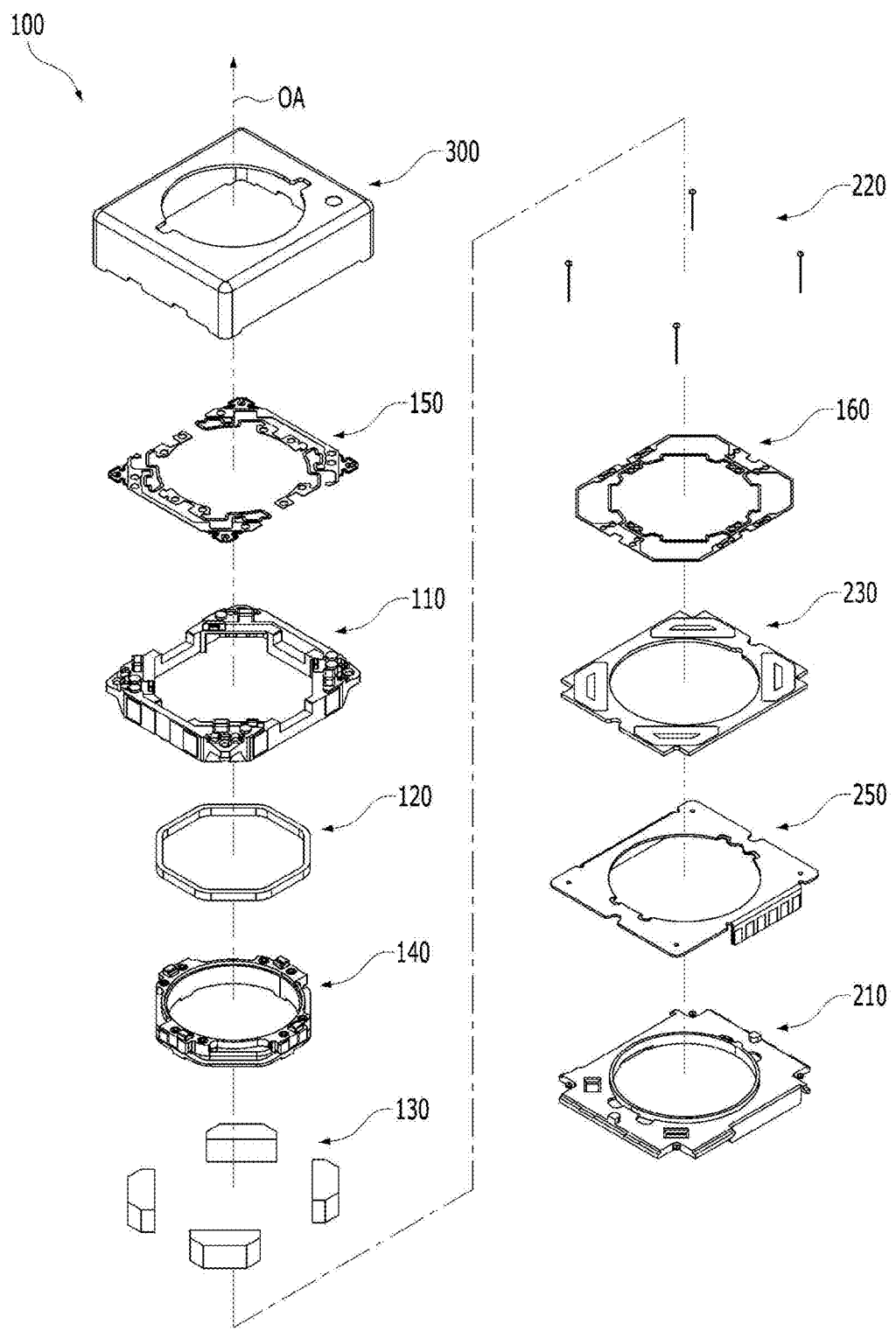
FIG. 2 is an exploded view of the lens moving apparatus of FIG. 1.
Figure 3:
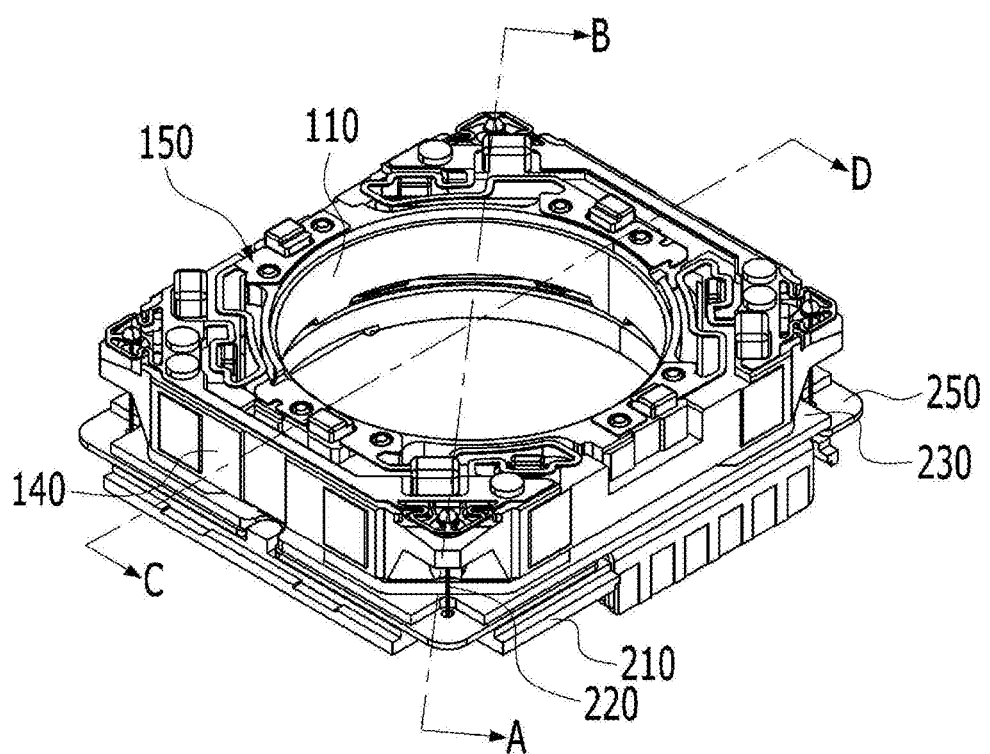
FIG. 3 is a perspective view of the lens moving apparatus of FIG. 1 with a cover member removed.

FIG. 1 is a perspective view of a lens moving apparatus 100 according to an embodiment, FIG. 2 is an exploded view of the lens moving apparatus 100 of FIG. 1, and FIG. 3 is a perspective view of the lens moving apparatus 100 of FIG. 1 with a cover member 300 removed.

Referring to FIGS. 1 to 3, the lens moving apparatus 100 includes a bobbin 110, a first coil 120, a magnet 130, a housing 140, an upper elastic member 150, and a lower elastic member 160.

In order to perform a handshake compensation function, the lens moving apparatus 100 may further include a supporting member 220, a second coil 230, and an OIS position sensor 240.

In addition, the lens moving apparatus 100 may further include a base 210, a circuit board 250, and a cover member 300.

In addition, as will be described with reference to FIG. 19, the lens moving apparatus 100 may further include an AF position sensor 170, a circuit board 190, a sensing magnet 180, and a balancing magnet 185 in order to perform AF feedback driving.

The bobbin 110 will be described.

The bobbin 110 is disposed inside the housing 140, and may be moved in an optical-axis (OA) direction or a first direction (e.g. a Z-axis direction) as the result of electromagnetic interaction between the first coil 120 and the magnet 130.

Figure 4A:
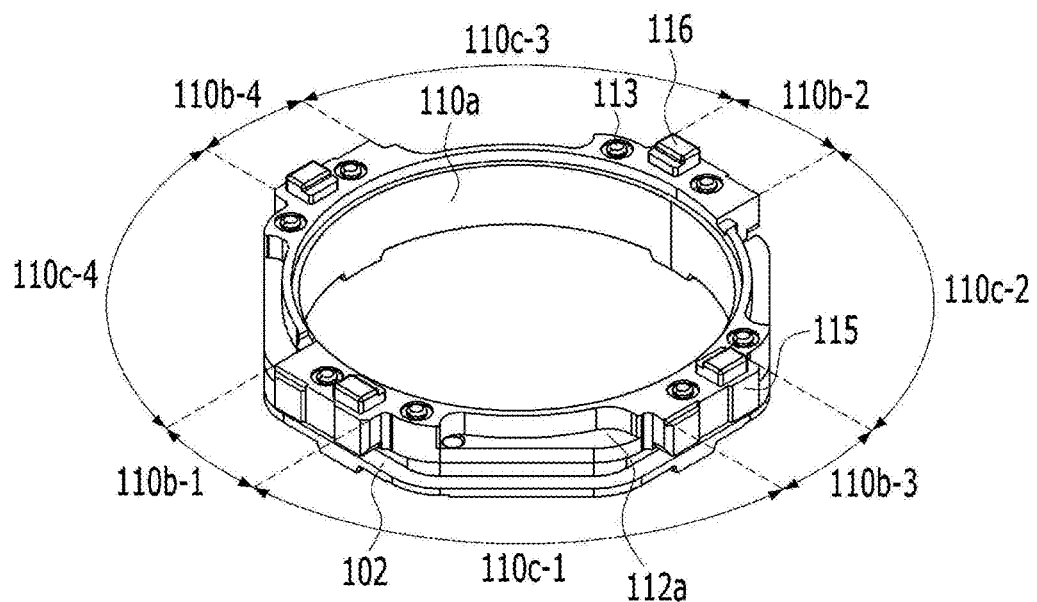
FIG. 4A is a perspective view of a bobbin shown in FIG. 1.
Figure 4B:
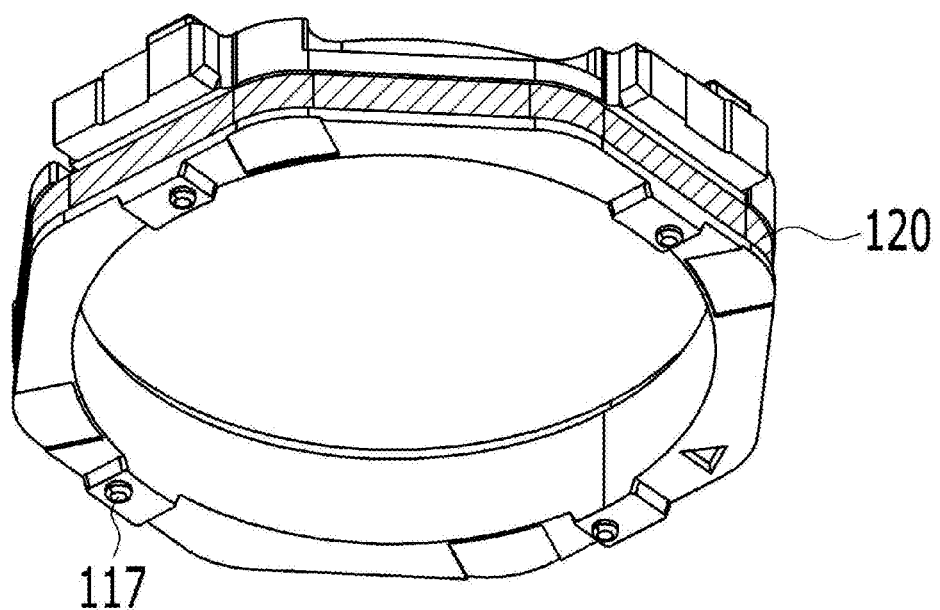
FIG. 4B is a perspective view of the bobbin at which a first coil is disposed.

FIG. 4A is a perspective view of the bobbin 110 shown in FIG. 1, and FIG. 4B is a perspective view of the bobbin 110 at which the first coil 120 is disposed.

Referring to FIGS. 4A and 4B, the bobbin 110 may have an opening, in which a lens or a lens barrel is mounted. For example, the shape of the opening of the bobbin 110 may be circular, oval, or polygonal. However, the disclosure is not limited thereto.

The lens may be directly mounted in the opening of the bobbin 110. However, the disclosure is not limited thereto. In another embodiment, a lens barrel, in which at least one lens is mounted or coupled, may be coupled or mounted in the opening of the bobbin 110. The lens or the lens barrel may be coupled to an inner circumferential surface 110a of the bobbin 110 in various manners.

The bobbin 110 may include first edges 110b-1 to 110b-4 spaced apart from each other and second edges 110c-1 to 110c-4 spaced apart from each other. Each of the second edges 110c-1 to 110c-4 may interconnect two adjacent first edges.

The first edges 110b-1 to 110b-4 of the bobbin 110 may correspond to, or may be opposite, edges 141-1 to 141-4 of the housing 140, and the second edges 110c-1 to 110c-4 of the bobbin 110 may correspond to, or may be opposite, corners 142-1 to 142-4 of the housing 140.

The bobbin 110 may include a protrusion 115 provided on the outer surface of each of the first edges 110b-1 to 110b-4. The protrusion 115 may pass through the center of the opening of the bobbin, and may protrude in a direction parallel to a straight line perpendicular to an optical axis. However, the disclosure is not limited thereto.

The protrusions 115 of the bobbin 110 may correspond to recesses 25a1 to 25a4 of the housing 140, may be inserted into or disposed in the recesses 25a1 to 25a4 of the housing 140, and may inhibit or inhibit the bobbin 110 from being rotated about the optical axis while deviating from a predetermined range.

In addition, the protrusions 115 may serve as stoppers for inhibiting and inhibiting the lower surface of the bobbin 110 from directly colliding with the base 210, the second coil 230, or the circuit board 250 even when the bobbin 110 is moved in the optical-axis direction (e.g. the direction from the upper elastic member 150 to the lower elastic member 160) while deviating from a predetermined range due to external impact.

An escape recess 112a for avoiding spatial interference with an inner frame 151 of the upper elastic member 150 may be provided in the upper surface of each of the second edges 110c-1 to 110c-4 of the bobbin 110.

The bobbin 110 may include a first stopper 116 protruding from the upper surface thereof. The stopper 116 may serve to inhibit the upper surface of the bobbin 110 from directly colliding with the inside of an upper plate of the cover member 300 even in the case in which the bobbin 110 is moved while deviating from the predetermined range due to external impact when the bobbin 110 is moved in a first direction in order to perform an autofocus function.

The bobbin 110 may include a second stopper (not shown) protruding from the lower surface thereof, and the second stopper of the bobbin 110 may prevent the lower surface of the bobbin 110 from directly colliding with the base 210, the second coil 230, or the circuit board 250 even in the case in which the bobbin 110 is moved while deviating from the predetermined range due to external impact when the bobbin 110 is moved in the first direction in order to perform the autofocus function.

A first coupling portion 113, which is coupled and fixed to the upper elastic member 150, may be provided at the upper surface of the bobbin 110. In addition, a second coupling portion 117, which is coupled and fixed to the lower elastic member 160, may be provided at the lower surface of the bobbin 110. For example, the first and second coupling portions 113 and 117 of FIGS. 4A and 4B are protrusions. However, the disclosure is not limited thereto. In another embodiment, the first and second coupling portions of the bobbin 110 may be recesses or planes.

A coil settlement recess 102, in which the first coil 120 is settled, inserted, or disposed, may be provided in the outer circumferential surface of the bobbin 110. The coil settlement recess 102 may be a recess formed inwardly from the outer surfaces of the first and second edges 110b-1 to 110b-4 and 110c-1 to 110c-4 of the bobbin 110, and may have a shape coinciding with the shape of the first coil 120 or a closed-loop shape (e.g. a ring shape).

Next, the first coil 120 will be described.

The first coil 120 is disposed on the outer surface of the bobbin 110.

The first coil 120 may be located under the protrusion 115 of the bobbin 110. However, the disclosure is not limited thereto. For example, the first coil 120 may be disposed in the coil settlement recess 102 of the bobbin 110.

The first coil 120 may wrap the outer surface of the bobbin 110 in a direction that rotates about the optical axis OA.

The first coil 120 may be directly wound around the outer surface of the bobbin 110. However, the disclosure is not limited thereto. In another embodiment, the first coil 120 may be wound around the bobbin 110 using a coil ring, or may be configured as an angular ring-shaped coil block.

When a driving signal (e.g. driving current) is supplied to the first coil 120, electromagnetic force may be formed through electromagnetic interaction between the first coil 120 and the magnet 130, and the bobbin 110 may be moved by the formed electromagnetic force in the optical-axis (OA) direction.

At an initial position of an AF operation unit, the bobbin 110 may be moved in an upward or downward direction (e.g. the Z-axis direction), which is referred to as bidirectional driving of the AF operation unit. Alternatively, at the initial position of the AF operation unit, the bobbin 110 may be moved in the upward direction, which is referred to as unidirectional driving of the AF operation unit.

At the initial position of the AF operation unit, the first coil 120 may be disposed so as to correspond to or overlap the magnet 130 disposed at the housing 140 in a direction perpendicular to the optical axis OA and parallel to a straight line passing through the optical axis.

For example, the AF operation unit may include the bobbin 110 and components coupled to the bobbin 110 (e.g. the first coil 120). The initial position of the AF operation unit may be the original position of the AF operation unit in the state in which no electric power is applied to the first coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

Next, the housing 140 will be described.

The housing 140 receives the bobbin 110 therein, and supports the magnet 130.

Figure 5:
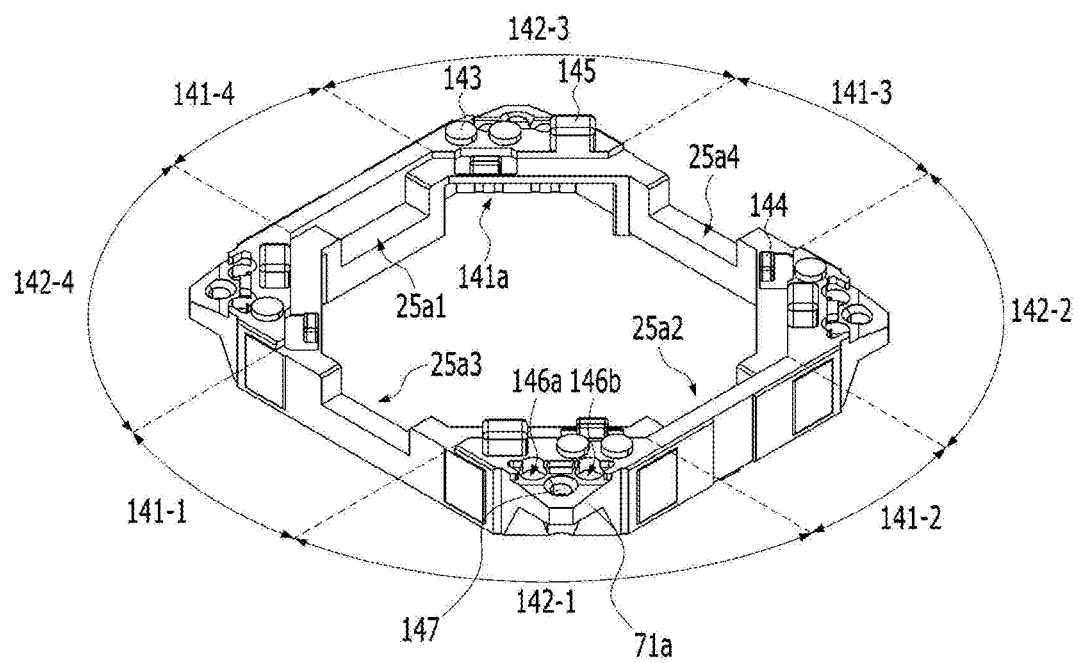
FIG. 5 is a perspective view of a housing shown in FIG. 1.
Figure 6:
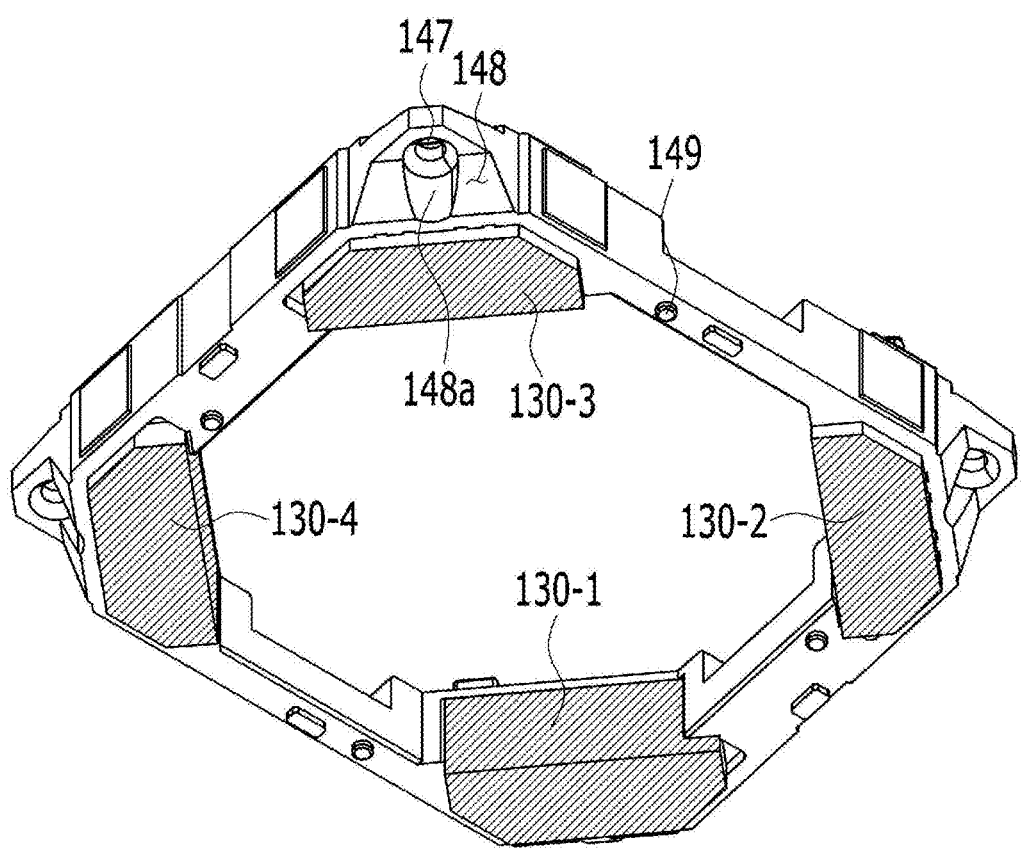
FIG. 6 is a perspective view of a magnet disposed at the housing.

FIG. 5 is a perspective view of the housing 140 shown in FIG. 1, and FIG. 6 is a perspective view of the magnet 130 disposed at the housing 140.

Referring to FIGS. 5 and 6, the housing 140 may generally have a hollow pillar shape. For example, the housing 140 may have a polygonal (e.g. quadrangular or octagonal) or circular opening.

The housing 140 may include a plurality of edges 141-1 to 141-4 and a plurality of corners 142-1 to 142-4.

For example, the housing 140 may include first to fourth edges 141-1 to 141-4 spaced apart from each other and first to fourth corners 142-1 to 142-4 spaced apart from each other.

Each of the corners 142-1 to 142-4 of the housing 140 may be disposed or located between two adjacent edges 141-1 and 141-2, 141-2 and 141-3, 141-3 and 141-4, or 141-4 and 141-1, and may interconnect the edges 141-1 to 141-4.

For example, the corners 142-1 to 142-4 may be located at the corner portions of the housing 140.

For example, the number of edges of the housing 140 may be four, and the number of corners thereof may be four. However, the disclosure is not limited thereto. In another embodiment, the number of edges or the corners of the housing may be four or more.

Each of the edges 141-1 to 141-4 of the housing 140 may be disposed parallel to a corresponding one of the side plates of the cover member 300.

The horizontal length of each of the edges 141-1 to 141-4 of the housing 140 may be larger than the horizontal length of each of the corners 142-1 to 142-4 thereof. However, the disclosure is not limited thereto.

For example, the edges 141-1 to 141-4 of the housing 140 may correspond respectively to the first edges 110b-1 to 110b-4 of the bobbin 110, and the corners 142-1 to 142-4 of the housing 140 may correspond respectively to the second edges 110c-1 to 110c-4 of the bobbin 110.

The housing 140 may be provided on the upper portion, the upper end, or the upper surface thereof with a stopper 145 in order to inhibit the housing from directly colliding with the inner surface of the upper plate of the cover member 300.

For example, the stopper 145 may be provided at the upper surface (e.g. a first surface 51a) of each of the corners 142-1 to 142-4 of the housing 140. However, the disclosure is not limited thereto.

In addition, the housing 140 may be provided on the upper portion, the upper end, or the upper surface of each of the corners 142-1 to 142-4 thereof with a guide protrusion 144 for guiding a first frame connection portion 153 of the upper elastic member 150.

The housing 140 may be provided on the upper portion, the upper end, or the upper surface thereof with at least one first coupling portion 143 coupled to an outer frame 152 of the upper elastic member 150.

The first coupling portion 143 of the housing 140 may be disposed at at least one of the edges 141-1 to 141-4 or the corners 142-1 to 142-4 of the housing 140.

The housing 140 may be provided on the lower portion, the lower end, or the lower surface thereof with at least one second coupling portion 149 coupled and fixed to an outer frame 162 of the lower elastic member 160. For example, the second coupling portion 149 of the housing 140 may be a protrusion. However, the disclosure is not limited thereto. In another embodiment, the second coupling portion may be a recess or a plane.

The first coupling portion 143 of the housing 140 may be coupled into a hole 152a of the first outer frame 152 of the upper elastic member 150 by soldering or thermal fusion, and the second coupling portion 149 of the housing 140 may be coupled into a hole 152a of the second outer frame 162 of the lower elastic member 160 by soldering or thermal fusion.

The magnet 130 may be disposed or installed at each of the corners 142-1 to 142-4 of the housing 140.

A settlement portion 141a or a receiving portion for receiving the magnet 130 may be provided in each of the corners 142-1 to 142-4 of the housing 140.

The settlement portion 141a of the housing 140 may be provided in at least one of the corners 142-1 to 142-4 of the housing 140.

For example, the settlement portion 141a of the housing 140 may be provided in each of the four corners 142-1 to 142-4.

The settlement portion 141a of the housing 140 may be a recess having a shape corresponding to the magnet 130, e.g. a concave recess. However, the disclosure is not limited thereto.

For example, a first opening may be formed in the side surface of the settlement portion 141a of the housing 140 facing the first coil 120, and a second opening may be formed in the lower surface of the settlement portion 141a of the housing 140 facing the second coil 230, for easy mounting of the magnet 130.

For example, a first surface 11a of the magnet 130 fixed or disposed in the settlement portion 141a of the housing 140 may be exposed through the first opening of the settlement portion 141a. In addition, the lower surface of the magnet 130 fixed or disposed in the settlement portion 141a of the housing 140 may be exposed through the second opening of the settlement portion 141a.

The magnet 130 may be fixed in the settlement portion 141a using an adhesive.

Supporting members 220-1 to 220-4 may be disposed at the corners 142-1 to 142-4 of the housing 140.

Holes 147 defining paths along which the supporting members 220-1 to 220-4 extend may be provided in the corners 142-1 to 142-4 of the housing 140.

For example, the housing 140 may include holes 147 formed through the upper portions of the corners 142-1 to 142-4.

In another embodiment, the holes provided in the corners 142-1 to 142-4 of the housing 140 may be depressed the outer surfaces of the corners of the housing 140, and at least a portion of each of the holes may be open toward the outer surface of a corresponding one of the corners. The number of holes 147 of the housing 140 may be equal to the number of summer members.

One end of the supporting member 220 may be connected or bonded to the upper elastic member 150 via a corresponding one of the holes 147.

The housing 140 may be provided with at least one stopper (not shown) protruding from the outer surfaces of the edges 141-1 to 141-4. The at least one stopper may inhibit the housing from colliding with the cover member 300 when moved in a direction perpendicular to the optical axis.

In order to inhibit the lower surface of the housing 140 from colliding with the base 210 and/or the circuit board 250, the housing 140 may be further provided with a stopper (not shown) protruding from the lower surface thereof.

Next, the magnet 130 will be described.

The magnet 130 may be disposed at at least one of the corners 142-1 to 142-4 of the housing 140. For example, the magnet 130 may be disposed at each of the corners of the housing 140.

At the initial position of the AF operation unit, magnets 130-1 to 130-4 may be disposed at the housing 140 such that at least a portion of each of the magnets overlaps the first coil 120 in a direction perpendicular to the optical axis OA.

For example, each of the magnets 130-1 to 130-4 may be inserted into or disposed in the settlement portion 141a of a corresponding one of the corners 142-1 to 142-4 of the housing 140.

In another embodiment, the magnets 130-1 to 130-4 may be disposed at the outer surfaces of the corners 142-1 to 142-4 of the housing 140.

The shape of each of the magnets 130-1 to 130-4 may be polyhedral such that the magnets are easily settled in the corners of the housing 140.

For example, the area of the first surface 11a (see FIG. 13) of each of the magnets 130-1 to 130-4 may be larger than the area of a second surface 11b thereof. The first surface 11a (see FIG. 13) of each of the magnets 130-1 to 130-4 may be a surface facing one surface of the first coil 120 (or the outer surface of the bobbin 110), and the second surface 11b (see FIG. 13) may be opposite the first surface 11a.

For example, the horizontal length of the second surface 11b of each of the magnets 130-1 to 130-4 may be smaller than the horizontal length of the first surface 11a thereof.

For example, the horizontal direction of the first surface 11a may be a direction of the first surface 11a perpendicular to the direction from the lower surface to the upper surface of each of the magnets 130-1 to 130-4 or a direction of the first surface 11a perpendicular to the optical-axis direction.

For example, the horizontal direction of the second surface 11b may be a direction of the second surface 11b perpendicular to the direction from the lower surface to the upper surface of each of the magnets 130-1 to 130-4 or a direction of the second surface 11b perpendicular to the optical-axis direction.

For example, each of the magnets 130-1 to 130-4 may include a portion having a horizontal length L1 (see FIG. 13) gradually decreasing from the center of the housing 140 to the corner 142-1, 142-2, 142-3, or 142-4 of the housing 140.

For example, each of the magnets 130-1 to 130-4 may include a portion having a horizontal length L1 (see FIG. 13) decreasing from the first surface 11a to the second surface 11b.

For example, the horizontal direction may be a direction parallel to the first surface 11a of each of the magnets 130-1 to 130-4.

Each of the magnets 130-1 to 130-4 may be configured in a single body, and may be disposed such that the first surface 11a facing the first coil 120 has an S pole and the second surface 11b has an N pole. However, the disclosure is not limited thereto. In another embodiment, the first surface 11a of each of the magnets 130-1 to 130-4 may have an N pole, and the second surface 11b thereof may have an S pole.

The magnets may be disposed or installed at the corners of the housing 140 such that at least two thereof face each other.

For example, two pairs of magnets 130-1 to 130-4 facing each other so as to intersect each other may be disposed at the corners 142-1 to 142-4 of the housing 140. At this time, the planar shape of each of the magnets 130-1 to 130-4 may be triangular, pentagonal, rhombic, or the like.

In another embodiment, a pair of magnets facing each other may be disposed at only two corners of the housing 140 facing each other.

Next, the upper elastic member 150, the lower elastic member 160, the supporting member 220, the second coil 230, the circuit board 250, and the base 210 will be described.

Figure 7A:
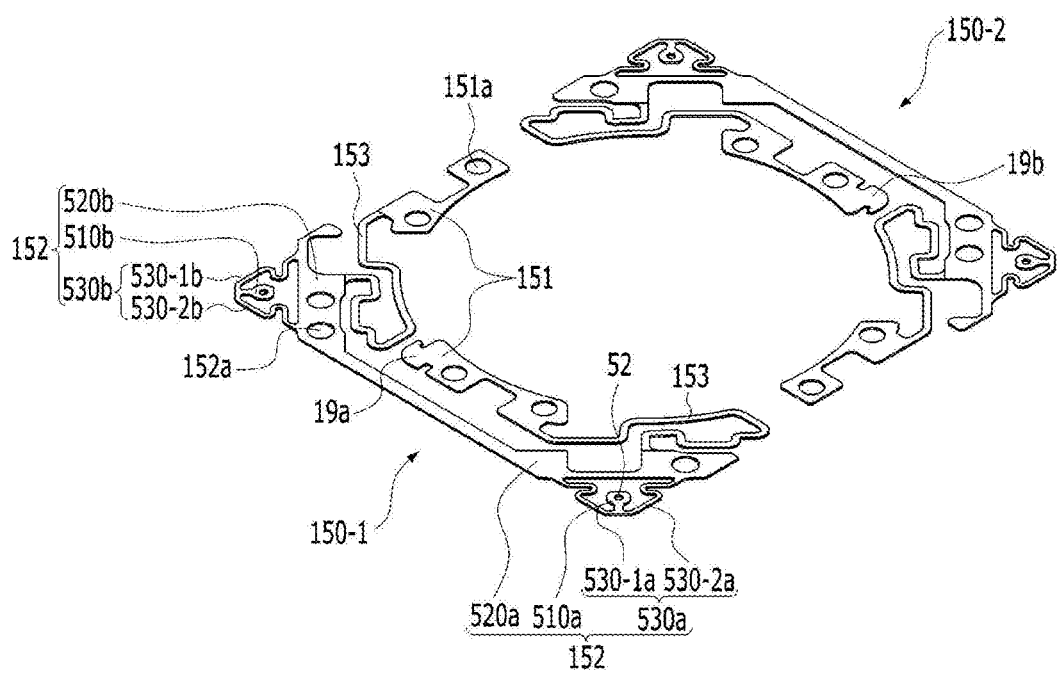
FIG. 7A is a plan view of an upper elastic member.
Figure 7B:
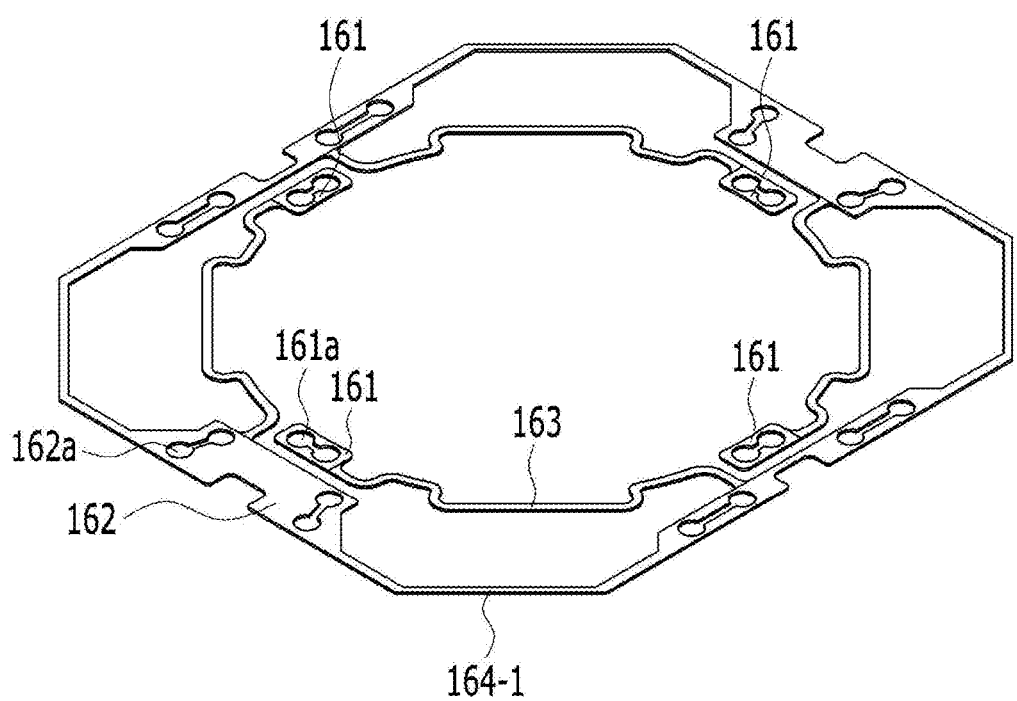
FIG. 7B is a plan view of a lower elastic member.
Figure 8:
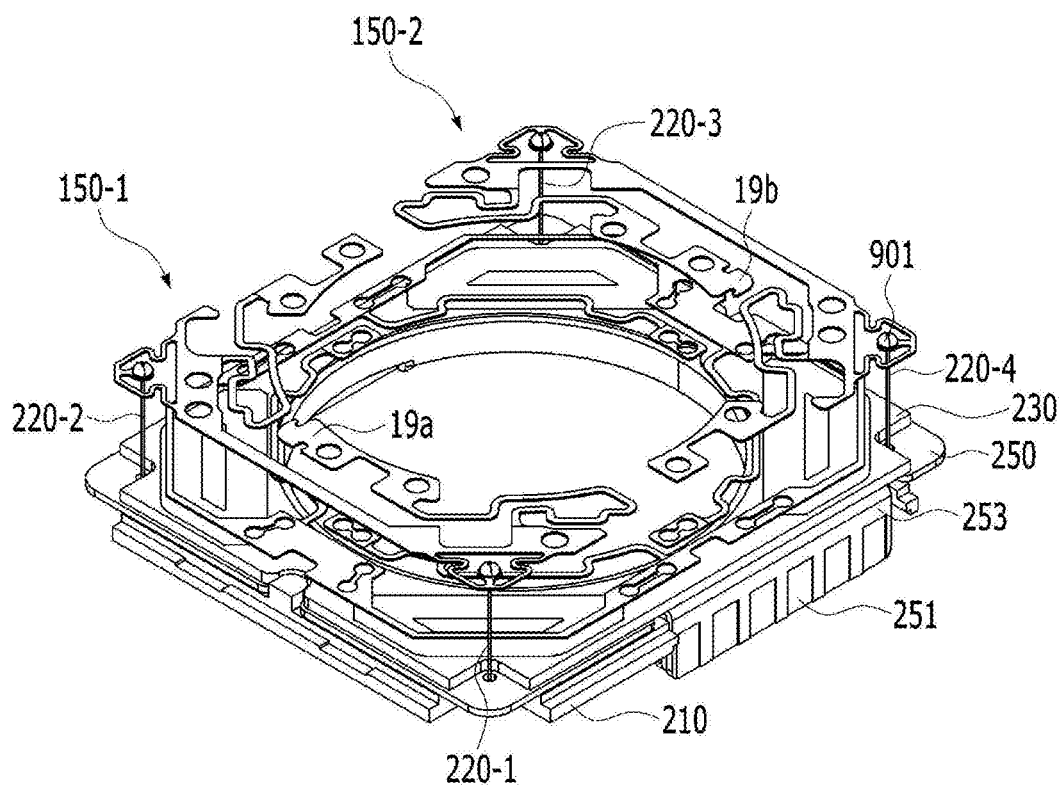
FIG. 8 is an assembled perspective view of the upper elastic member, the lower elastic member, a base, a supporting member, a second coil, and a circuit board.
Figure 9:
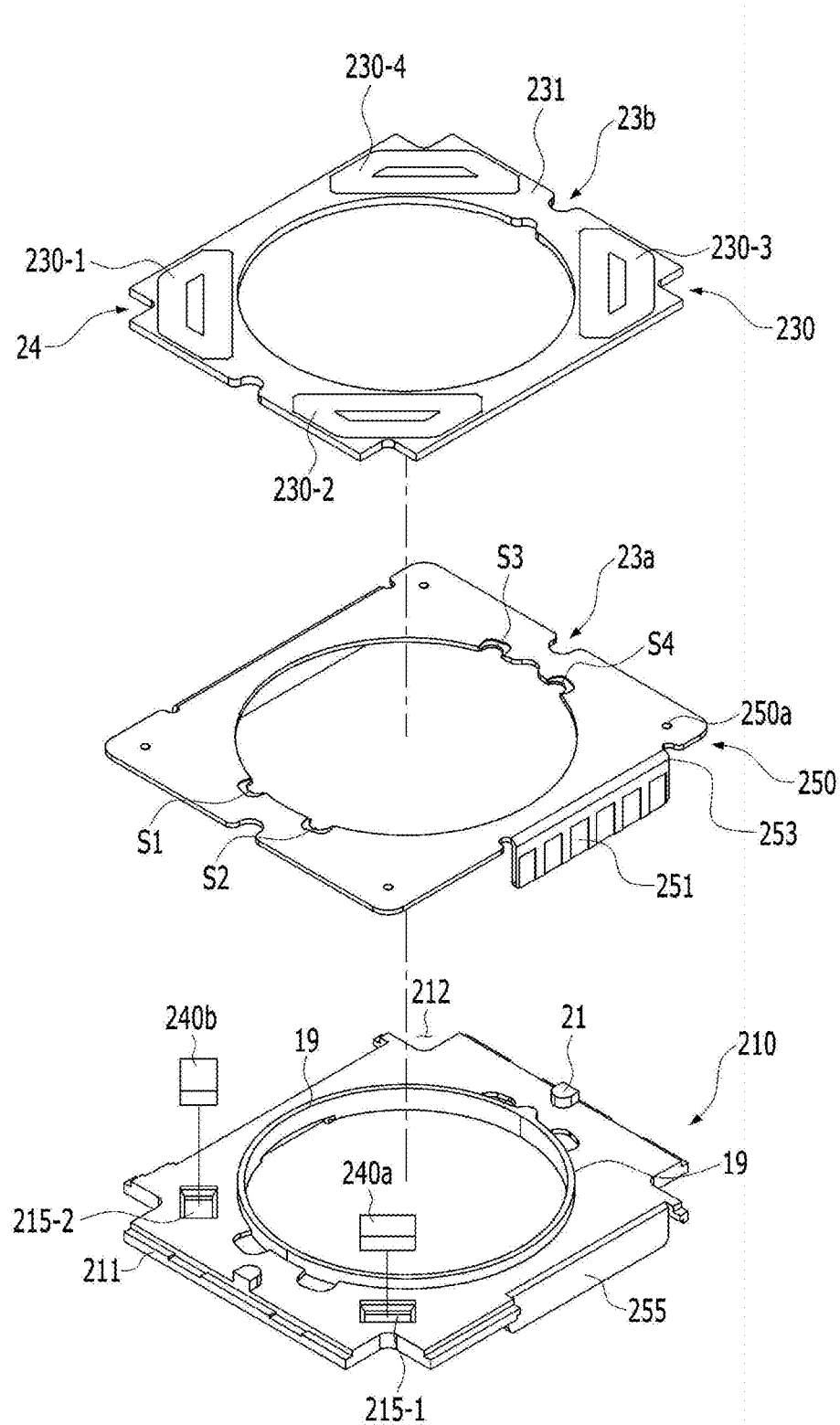
FIG. 9 is a separated perspective view of the second coil, the circuit board, the base, and an OIS position sensor.

FIG. 7A is a plan view of the upper elastic member 150, FIG. 7B is a plan view of the lower elastic member 160, FIG. 8 is an assembled perspective view of the upper elastic member 150, the lower elastic member 160, the base 210, the supporting member 220, the second coil 230, and the circuit board 250, and FIG. 9 is a separated perspective view of the second coil 230, the circuit board 250, the base 210, and the OIS position sensor 240.

Referring to FIGS. 7A to 9, the upper elastic member 150 may be coupled to the upper portion, the upper surface, or the upper end of the bobbin 110 or to the upper portion, the upper surface, or the upper end of the housing 140.

The lower elastic member 160 may be coupled to the upper portion, the upper surface, or the upper end of the bobbin 110 and to the upper portion, the upper surface, or the upper end of the housing 140.

The upper elastic member 150 and the lower elastic member 160 may elastically support the bobbin 110 relative to the housing 140.

The supporting member 220 may movably support the housing 140 relative to the base 210 in a direction perpendicular to the optical axis, and the supporting member 220 may connect at least one of the upper or lower elastic member 150 or 160 to the circuit board 250.

Referring to FIG. 7A, the upper elastic member 150 may include a plurality of upper springs 150-1 and 150-2 separated from each other. In FIG. 7A, two upper springs separated from each other are shown. However, the disclosure is not limited thereto. In another embodiment, the number of upper springs may be three or more.

For example, the first upper spring 150-1 may be disposed on the first corner 142-1, the first edge 141-1, and the fourth corner 142-4 of the housing 140.

For example, the second upper spring 150-2 may be disposed on the third corner 142-2, the third edge 141-3, and the second corner 142-2 of the housing 140.

At least one of the first or second upper spring 150-1 or 150-2 may further include a first inner frame 151 coupled to the bobbin 110, a first outer frame 152 coupled to the housing 140, and a first frame connection portion 153 interconnecting the first inner frame 151 and the first outer frame 152. In another embodiment, the first inner frame 151 may be referred to as a "first inner portion," and the first outer frame 152 may be referred to as a "first outer portion."

For example, the first inner frame 151 may be provided with a hole 151a, into which the first coupling portion 113 of the bobbin 110 is coupled. However, the disclosure is not limited thereto.

For example, the first outer frame 152 may be provided with a hole 152*a*, into which the first coupling portion 143 of the housing 140 is coupled.

The first outer frame 152 of the first upper spring 150-1 may include a first coupling portion 510*a* coupled to the first supporting member 220-1, a second coupling portion 520*a* coupled to the first corner 142-1, and a first connection portion 530*a* interconnecting the first coupling portion 510*a* and the second coupling portion 520*a*.

For example, the first connection portion 530*a* may include a first portion 530-1*a* interconnecting the first coupling portion 510*a* and a first region of the second coupling portion 520*a* and a second portion 530-2*a* interconnecting the first coupling portion 510*a* and a second region of the second coupling portion 520*a*.

In addition, the first outer frame 152 of the first upper spring 150-1 may include a third coupling portion 510*b* coupled to the second supporting member 220-2, a fourth coupling portion 520*b* coupled to the fourth corner 142-4, and a second connection portion 530*b* interconnecting the third coupling portion 510*b* and the fourth coupling portion 520*b*.

For example, the second connection portion 530*b* may include a first portion 530-1*b* interconnecting the third coupling portion 510*b* and a first region of the fourth coupling portion 520*b* and a second portion 530-2*b* interconnecting the third coupling portion 510*b* and a second region of the fourth coupling portion 520*b*.

For example, the second coupling portion 520*a* and the fourth coupling portion 520*b* may be connected to each other.

For example, one end of the first supporting member 220-1 may be coupled to the first coupling portion 510*a* of the first upper spring 150-1, and one end of the second supporting member 220-2 may be coupled to the third coupling portion 510*b* of the first upper spring 150-1, via solder or a conductive adhesive member.

The first outer frame 152 of the second upper spring 150-2 may include a fifth coupling portion coupled to a third supporting member 220-3, a sixth coupling portion coupled to the third corner 142-3, and a third connection portion interconnecting the fifth coupling portion and the sixth coupling portion.

For example, the third connection portion may include a first portion interconnecting the fifth coupling portion and a first region of the sixth coupling portion and a second portion interconnecting the fifth coupling portion and a second region of the sixth coupling portion.

In addition, the first outer frame 152 of the second upper spring 150-2 may include a seventh coupling portion coupled to a fourth supporting member 220-4, an eighth coupling portion coupled to the second corner 142-2, and a fourth connection portion interconnecting the seventh coupling portion and the eighth coupling portion.

For example, the fourth connection portion may include a first portion interconnecting the seventh coupling portion and a first region of the eighth coupling portion and a second portion interconnecting the seventh coupling portion and a second region of the eighth coupling portion.

For example, the sixth coupling portion and the eighth coupling portion may be connected to each other.

For example, one end of the third supporting member 220-2 may be coupled to the fifth coupling portion of the second upper spring 150-2, and one end of the seventh supporting member 220-4 may be coupled to the seventh coupling portion of the second upper spring 150-2, via solder or a conductive adhesive member.

The first and third coupling portions 510*a* and 510*b* of the first upper spring 150-1 and the fifth and seventh coupling portions of the second upper spring 150-2 may be provided with holes 52, through which the supporting members 220-1 to 220-4 extend.

One end of each of the supporting members 220-1 to 220-4 extending through the holes 52 may be directly coupled, and may be connected, to a corresponding one of the first, third, fifth, and seventh coupling portions, via a conductive adhesive member or solder 901 (see FIG. 8).

For example, the first, third, fifth, and seventh coupling portions are regions at which the solder 901 is disposed for coupling with the supporting members 220-1 to 220-4, and may include the holes 52 and regions around the holes 52.

Each of the first and second portions of the first to fourth connection portions may include a bent portion that is bent at least once or a curved portion that is curved at least once. However, the disclosure is not limited thereto. In another embodiment, each of the first and second portions may be straight.

For example, each of the second, fourth, sixth, and eighth coupling portions of the first and second upper springs 150-1 and 150-2 may be disposed on the upper portion, the upper surface, or the upper end of a corresponding one of the corners 142-1 to 142-4 of the housing 140.

Each of the second, fourth, sixth, and eighth coupling portions of the first and second upper springs 150-1 and 150-2 may contact the upper surface of a corresponding one of the corners 142-1 to 142-4 of the housing 140, and may be supported by a corresponding one of the corners 142-1 to 142-4 of the housing 140.

For example, the first to fourth connection portions of the first and second upper springs 150-1 and 150-2 are not supported by the upper surface of the housing 140, and may be spaced apart from the housing 140. In addition, a damper (not shown) may be disposed in an empty space between the first to fourth connection portions of the first and second upper springs and the housing 140 in order to inhibit oscillation due to vibration.

The term "upper spring" may be referred to as an "upper elastic unit" or an elastic unit, and the term "lower spring" may be referred to as a "lower elastic unit" or an elastic unit.

Referring to FIG. 7B, the lower elastic member 160 may include a single lower spring. However, the disclosure is not limited thereto. In another embodiment, the lower elastic member may include two or more lower springs.

For example, the lower elastic member 160 may include a second inner frame 161 coupled or fixed to the lower portion, the lower surface, or the lower end of the bobbin 110, second outer frames 162-1 to 162-3 coupled or fixed to the lower portion, the lower surface, or the lower end of the housing 140, and a second frame connection portion interconnecting the second inner frame 161 and the second outer frames 162-1 to 162-3.

The second inner frame 161 may be provided with a hole 161*a*, into which the second coupling portion 117 of the bobbin 110 is coupled, and each of the second outer frames 162-1 to 162-3 may be provided with a hole 162*a*, into which the second coupling portion 149 of the housing 140 is coupled.

For example, the lower elastic member may include four second outer frames coupled to the bobbin 110, four second outer frames coupled to the housing 140, and four second frame connection portions. However, the disclosure is not limited thereto.

In addition, the lower elastic member 160 may include connection frames 164-1 interconnecting four second outer frames 162. For example, the lower elastic member 160 may include four connection frames 164-1. However, the disclosure is not limited thereto.

The connection frames 164-1 may be located outside OIS coils 230-1 to 230-4 (see FIG. 9) and the magnets 130-1 to 130-4 based on the OIS coils 230-1 to 230-4 and the magnets 130-1 to 130-4 in order to avoid spatial interference with the OIS coils 230-1 to 230-4 and the magnets 130-1 to 130-4. At this time, the outside of the OIS coils 230-1 to 230-4 and the magnets 130-1 to 130-4 may be opposite a region in which the center of the bobbin 110 or the center of the housing 140 is located based on the OIS coils 230-1 to 230-4 and the magnets 130-1 to 130-4.

In addition, for example, the connection frames 164-1 may be located so as not to overlap the second coils 230-1 to 230-4 and/or the magnets 130-1 to 130-4 in the optical-axis direction. However, the disclosure is not limited thereto. In another embodiment, at least portions of the connection frames 164-1 may be aligned with or overlap the OIS coils 230-1 to 230-4 and/or the magnets 130-1 to 130-4 in the optical-axis direction.

Each of the upper springs 150-1 and 150-2 and the lower spring 160 may be realized as a leaf spring; however, the disclosure is not limited thereto. Each of the upper springs and the lower spring may be realized as a coil spring or the like.

Next, the supporting members 220-1 to 220-4 will be described.

The supporting members 220-1 to 220-4 may be disposed so as to correspond to the corners 142-1 to 142-4 of the housing 140, and may interconnect the first and second upper springs 150-1 and 150-2 and the circuit board 250.

The first and second supporting members 220-1 and 220-2 connected to the first upper spring 150-1 and the third and fourth supporting members 220-3 and 220-4 connected to the second upper spring 150-2 may be independently connected to the circuit board 250.

The first to fourth supporting members 220-1 to 220-4 may be spaced apart from the housing 140, not fixed to the housing 140, and one end of each of the first to fourth supporting members 220-1 to 220-4 may be directly connected or coupled to a corresponding one of the first coupling portion 510a, the third coupling portion 510b, the fifth coupling portion, and the seventh coupling portion of the upper elastic member 150.

In addition, the other end of each of the first to fourth supporting members 220-1 to 220-4 may be directly connected or coupled to the circuit board 250.

For example, each of the first to fourth supporting members 220-1 to 220-4 may extend through a hole 147 formed in a corresponding one of the corners 142-1 to 142-4 of the housing 140. However, the disclosure is not limited thereto. In another embodiment, the supporting members may be disposed adjacent to boundary lines between the first edges 141-1 to 141-4 and the corners 142 of the housing 140, and may not extend through the corners 142-1 to 142-4 of the housing 140.

The first coil 120 may be directly connected or coupled to a corresponding one of the first inner frames of the first and second upper springs 150-1 and 150-2.

For example, one end of the first coil 120 may be connected to a first bonding portion 19a provided at one end of the first inner frame of the first upper spring 150-1, and the other end of the first coil 120 may be connected to a second bonding portion 19b provided at one end of the first inner frame of the second upper spring 150-2.

For example, a driving signal may be provided from the circuit board 250 to the first coil 120 through the first and second upper springs 150-1 and 150-2, one of the first and second supporting members 220-1 and 220-2, and one of the third and fourth supporting members 220-3 and 220-4.

The supporting member 220 may be realized as an elastic supporting member, such as a suspension wire, a leaf spring, or a coil spring. In addition, in another embodiment, the supporting member 220 may be integrally formed with the upper elastic member 150.

Next, the base 210, the circuit board 250, and the second coil 230 will be described.

Referring to FIG. 9, the base 210 may have an opening corresponding to the opening of the bobbin 110 and/or the opening of the housing 140, and may be configured in a shape coinciding with or corresponding to the shape of the cover member 300, such as a quadrangular shape.

The base 210 may be provided with a stair 211, to which an adhesive may be coated when fixing the cover member 300 by adhesion. At this time, the stair 211 may guide the side plate of the cover member 300 coupled to the upper side thereof, and the lower end of the side plate of the cover member 300 may contact the stair 211. The stair 211 of the base 210 may be fixed to the lower end of the side plate of the cover member 300 by adhesion using an adhesive.

A support portion 255 or a supporting portion may be provided at a region of the base 210 facing a terminal 251 of the circuit board 250. The support portion 255 may support a terminal surface 253 of the circuit board 250 at which the terminal 251 is formed.

The base 210 may be provided in each corner thereof with a concave recess 212 in order to avoid spatial interference with the other end of a corresponding one of the supporting members 220-1 to 220-4 coupled to the circuit board 250.

In addition, the base 210 may be provided in the upper surface thereof with settlement recesses 215-1 and 215-2, in which first and second OIS position sensors 240a and 240b are disposed. A settlement portion (not shown), in which a filter 610 of a camera module 200 is installed, may be formed in the lower surface of the base 210.

In addition, the base 210 may be provided in the upper surface thereof with protrusions 21, which are coupled into a recess 23a provided in a side surface of the circuit board 250 and a recess 23b provided in a side surface of a circuit member 231.

In addition, the base 210 may be provided on the upper surface thereof around the opening thereof with protrusions 19, which are coupled into the opening of the circuit board 250 and an opening of the circuit member 231.

The second coil 230 may be disposed at the upper portion of the circuit board 250, and the OIS position sensor 240 may be disposed in the settlement recesses 215-1 and 215-2 of the base 210 located under the circuit board 250.

The OIS position sensor 240 may include first and second OIS position sensors 240a and 240b, and the first and second OIS position sensors 240a and 240b may sense displacement of an OIS operation unit in a direction perpendicular to the optical axis. Here, the OIS operation unit may include the AF operation unit and components mounted at the housing 140.

For example, the OIS operation unit may include the AF operation unit and the housing 140. In some embodiments, the magnets 130-1 to 130-4 may be further included. For example, the AF operation unit may include the bobbin 110 and components mounted at the bobbin 110 so as to be movable with the bobbin 110. For example, the AF operation unit may include the bobbin 110 and the lens (not shown) and the first coil 120 mounted at the bobbin 110.

The circuit board 250 is disposed on the upper surface of the base 210, and may have an opening corresponding to the opening of the bobbin 110, the opening of the housing 140, and/or the opening of the base 210. The circuit board 250 may be configured in a shape coinciding with or corresponding to the shape of the upper surface of the base 210, such as a quadrangular shape.

The circuit board 250 may be provided with at least one terminal surface 253 at which a plurality of terminals 251 or pins for receiving electrical signals from outside is provided.

For example, the second coil 230 may be disposed under the bobbin 110 and/or the housing 140.

The second coil 230 is disposed at the upper portion of the circuit board 250 so as to correspond to the magnets 130-1 to 130-4 disposed at the housing 140.

The second coil 230 may be disposed so as to correspond to or overlap the magnets 130-1 to 130-4 disposed at the corners 142-1 to 142-4 of the housing 140 in the optical-axis direction.

For example, the second coil 230 may include four OIS coils 230-1 to 230-4 disposed or formed at four corners of the quadrangular circuit member 231. Here, the OIS coils 230-1 to 230-4 may be referred to as "coil units."

For example, the second coil 230 may include two OIS coils 230-1 and 230-3 for a second direction and two OIS coils 230-2 and 230-4 for a third direction. However, the disclosure is not limited thereto. In another embodiment, the second coil 230 may include a single OIS coil for the second direction and a single OIS coil for the third direction, and may include four or more OIS coils.

Each of the OIS coils 230-1 to 230-4 may be connected to the circuit board 250, for example, to a corresponding one of the terminals of the circuit board 250.

The circuit board 250 may include bonding portions or pads S1 to S4 (see FIG. 9) connected to the OIS coils 230-1 to 230-4.

The housing 140 may be moved in a direction perpendicular to the optical axis, for example, in the x-axis direction and/or the y-axis direction, due to interaction between the magnets 130-1 to 130-4 and the OIS coils 230-1 to 230-4, whereby handshake compensation may be performed.

In FIG. 9, the OIS coils 230-1 to 230-4 may be provided at the circuit member 231, rather than the circuit board 250. However, the disclosure is not limited thereto. In another embodiment, each of the OIS coils 230-1 to 230-4 may be configured in the form of a ring-shaped coil block or an FP coil. In a further embodiment, each of the OIS coils may be configured in the form of a circuit pattern formed on the circuit board 250. The circuit member 231 may be referred to as a "board" or a "coil board."

The circuit board 250 and the circuit member 231 are separate components, which are referred to individually. However, the disclosure is not limited thereto. In another embodiment, the circuit board 250 and the circuit member 231 may be commonly referred to as a "circuit member" or a "board." In this case, the other end of each of the supporting members may be coupled to the "circuit member" (e.g. the lower surface of the circuit member).

In order to avoid spatial interference with the supporting members 220-1 to 220-4, recesses 24 may be provided in the corners of the circuit member 231, and the supporting members 220-1 to 220-4 may extend through the recesses 24 of the circuit member 231. In another embodiment, the circuit member may be provided with holes formed through the circuit member instead of the recesses.

Each of the first and second OIS position sensors 240a and 240b may be a Hall sensor. Any sensor may be used as long as the sensor is capable of sensing the intensity of a magnetic field. For example, each of the first and second OIS position sensors 240a and 240b may be configured in the form of a driver including a Hall sensor, or may be realized as a position sensor, such as a Hall sensor, alone.

Each of the first and second OIS position sensors 240a and 240b may be connected to the circuit board 250, and may receive a driving signal through the circuit board 250. In addition, output signals of the first and second OIS position sensors 240a and 240b may be transmitted to the circuit board 250.

Terminals 251 may be provided at the terminal surface 253 of the circuit board 250.

A driving signal may be provided to the first coil 120 through a plurality of terminals 251 provided at the terminal surface 253 of the circuit board 250.

According to the embodiment, the circuit board 250 may be an FPCB. However, the disclosure is not limited thereto. The terminals of the circuit board 250 may be directly formed on the surface of the base 210 using a surface electrode scheme or the like.

The circuit board 250 may include holes 250a through which the supporting members 220-1 to 220-4 extend. The position and number of holes 250a may correspond to or coincide with the position and number of supporting members 220-1 to 220-4. In another embodiment, the circuit board 250 may be provided in the corners thereof with escape recesses instead of the holes 250a.

One end of each of the supporting members 220-1 to 220-4 may be coupled to the first outer frame of the upper elastic member 140 via solder, and the other end of each of the supporting members 220-1 to 220-4 may be coupled to the lower surface of the circuit board 250.

For example, the supporting members 220-1 to 220-4 may extend through the holes 250a of the circuit board 250 and may be connected to circuit patterns disposed on the lower surface of the circuit board 250 via solder. However, the disclosure is not limited thereto.

In another embodiment, the circuit board 250 may have no holes, and the supporting members 220-1 to 220-4 may be connected to circuit patterns or pads formed on the upper surface of the circuit board 250.

In a further embodiment, the supporting members 220-1 to 220-4 may be connected to the circuit member 231, and the circuit member 231 may connect the supporting members 220-1 to 220-4 to the circuit board.

Next, the cover member 300 will be described.

The cover member 300 may receive the bobbin 110, the first coil 120, the magnet 130, the housing 140, the upper elastic member 150, the lower elastic member 160, the supporting member 220, the second coil 230, the OIS position sensor 240, and the circuit board 250 in a receiving space formed together with the base 210.

The cover member 300 may be formed in the shape of a box, the lower portion of which is open and which includes an upper plate and side plates. The lower portion of the cover member 300 may be coupled to the upper portion of the base 210. The shape of the upper plate of the cover member 300 may be polygonal, for example, quadrangular or octagonal.

The cover member 300 may be provided in the upper plate thereof with an opening, through which the lens (not shown) coupled to the bobbin 110 is exposed to external light. The cover member 300 may be made of a nonmagnetic material, such as SUS in order to inhibit a phenomenon in which the magnet 130 attracts the cover member. Alternatively, the cover member may be made of a magnetic material so as to perform the function of a yoke that increases electromagnetic force between the first coil 120 and the magnet 130.

Figure 10A:
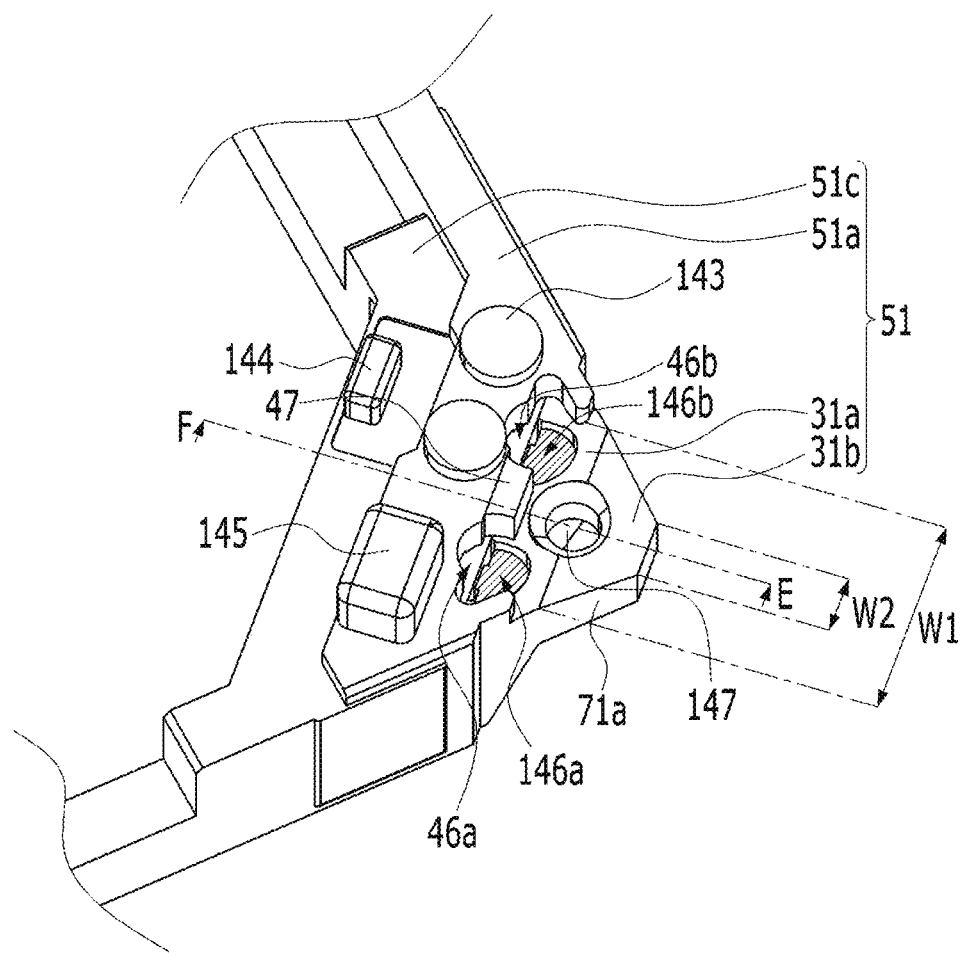
FIG. 10A is a first perspective view of a first corner of the housing.
Figure 10B:
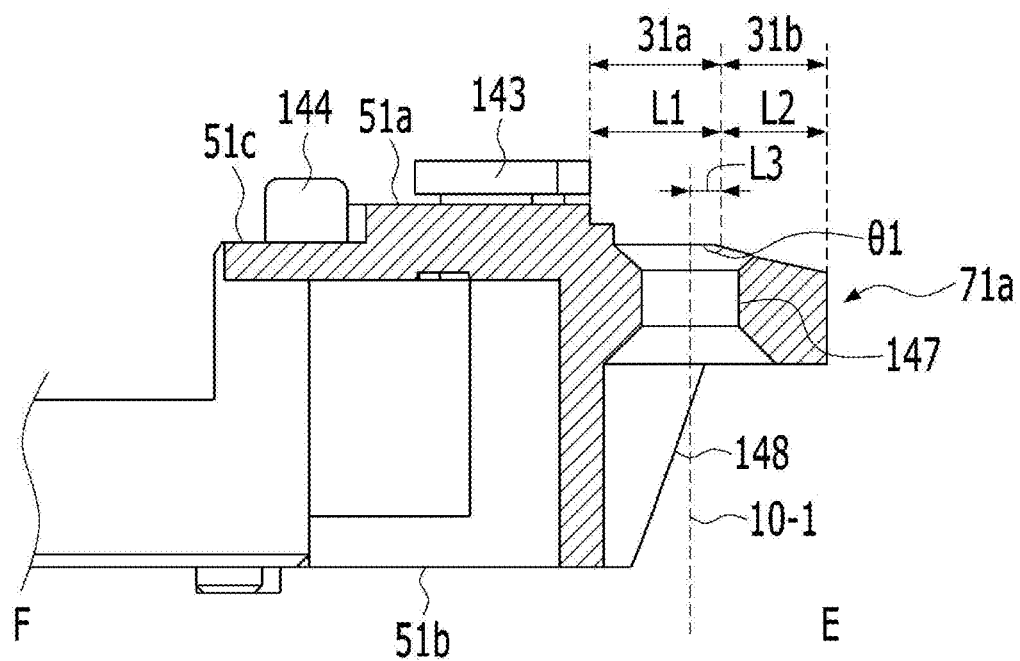
FIG. 10B is an EF sectional view of the first corner of the housing of FIG. 10A.
Figure 11:
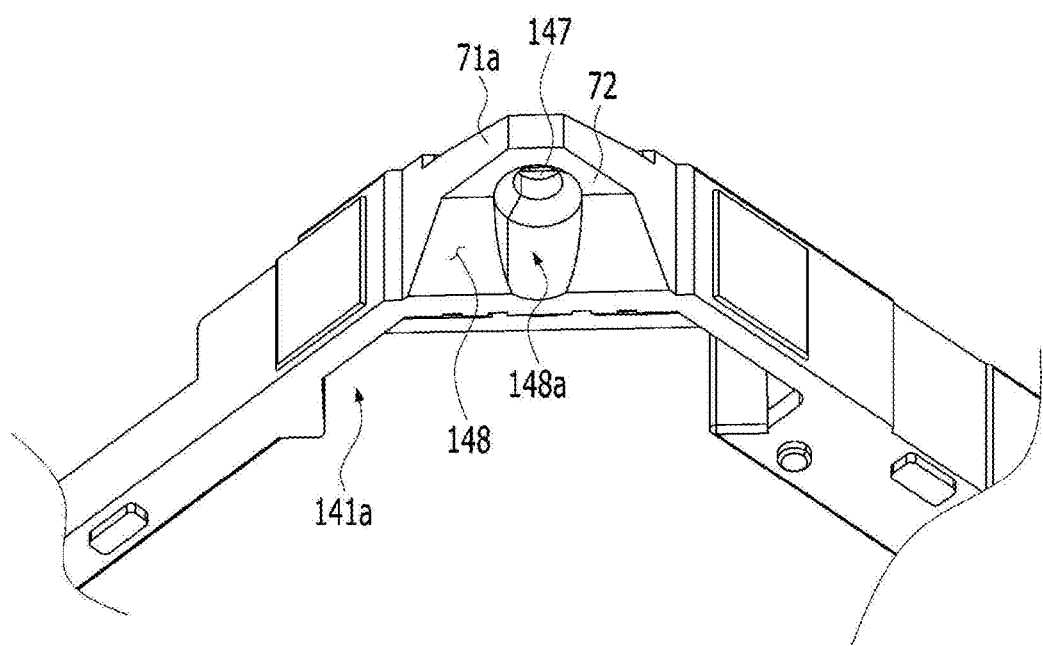
FIG. 11 is a second perspective view of the first corner of the housing shown in FIGS. 10A and 10B.

FIG. 10A is a first perspective view of the first corner 142-1 of the housing 140, FIG. 10B is an EF sectional view of the first corner of the housing of FIG. 10A, and FIG. 11 is a second perspective view of the first corner 142-1 of the housing 140 shown in FIGS. 10A and 10B. Hereinafter, the description of the first corner 142-1 may be equally applied to the other corners 142-2 to 142-4.

Referring to FIGS. 10A to 11, each of the corners 142-1 to 142-4 of the housing 140 may have an upper surface including at least one stair surface in the optical-axis direction.

The housing 140 includes a first surface 51a, to which the upper elastic member 150 (e.g. the first outer frame 152) is coupled, a second surface 31a disposed higher than the bottom surface 51b of the housing 140 and lower than the first surface 51a thereof, and an inclined surface 31b adjacent to the second surface 31a (or the hole 147) and having a predetermined angle θ1 relative to the second surface 31a.

For example, the upper surface 51 of each of the corners 142-1 to 142-4 may include a first surface 51a, to which the upper elastic member 150 (e.g. the first outer frame 152) is coupled, a second surface 31a having a first stair relative to the first surface 51a in the optical-axis direction, and an inclined surface 31b having a predetermined angle relative to the first surface 51a or the second surface 31a.

For example, the inclined surface 31b may be formed at each corner of the housing 140. In addition, the inclined surface 31b may abut the second surface 31a, and may extend from the second surface 31a.

In addition, the housing 140 may further include a third surface 51c having a second stair relative to the first surface 51a in the optical-axis direction. For example, the first stair and the second stair may be identical to each other. However, the disclosure is not limited thereto. In another embodiment, the first stair and the second stair may be different from each other.

For example, the second surface 31a may be a horizontal surface parallel to the first surface 51a, and the third surface 51c may be parallel to the first surface 51a. However, the disclosure is not limited thereto. In another embodiment, both may not be parallel to each other.

For example, the inclined surface 31b may be spaced apart from the first surface 51a, and may be inclined downwards from the second surface 31a, which is a horizontal surface.

For example, the second surface 31a may be located outside the first surface 51a, and the third surface 51c may be located inside the first surface 51a.

The width of the inclined surface 31b may gradually decrease from a boundary line between the second surface 31a and the inclined surface 31b to the tip end of the inclined surface 31b. This serves to avoid spatial interference with the cover member 300.

For example, the width of the inclined surface 31b (or the maximum value of the width of the inclined surface 31b) may be smaller than or equal to the width of the second surface 31a (or the minimum value of the width of the second surface 31a).

For example, the ratio W2:W1 of the width W2 of the distal end of the inclined surface 31b to the first width W1 of the inclined surface 31b abutting the second surface 31a (or the maximum value of the width of the inclined surface 31b) may be 1:2 to 1:5. In addition, for example, the ratio W2:W1 may be 1:3 to 1:4.

In the case in which the value W1/W2 obtained by dividing the first width W1 by the second width S2 is less than 2, it is difficult to secure a sufficient space to provide the hole 147 in the inclined surface 31b. In the case in which the value W1/W2 exceeds 5, spatial interference between the cover member 300 and the housing 140 may occur.

The length L2 of the inclined surface 31b may be smaller than or equal to the length L1 of the second surface 31a (L2≤L1). This serves to secure a space necessary to form the hole 147 in the second surface 31a and to inhibit spatial interference between the inclined surface 31b and the cover member 300.

For example, the ratio L2:L1 of the length L2 of the inclined surface 31b to the length L1 of the second surface 31a may be 1:1.03 to 1:1.5. In the case in which the value L1/L2 is less than 1.03, it is not possible to secure a sufficient space to form the hole 147 in the second surface 31a. In the case in which value L1/L2 exceeds 1.5, spatial interference may occur between the cover member 300 and the housing 140.

In another embodiment, however, the length L2 of the inclined surface 31b may be larger than the length L1 of the second surface 31a.

For example, the first surface 51a of each of the corners 142-1 to 142-4 may be located higher than the second surface 31a and the third surface 51c. This serves to inhibit an adhesive or a damper from flowing to the third surface 51c when the adhesive is injected into adhesive injection recesses 146a and 146b or when the damper is coated on the second surface 31a.

For example, the guide protrusion 144 of the housing 140 may be disposed at the third surface 51c of each of the corners 142-1 to 142-4. However, the disclosure is not limited thereto.

For example, the first coupling portion 143 of the housing 140 may be disposed at the first surface 51a of each of the corners 142-1 to 142-4 of the housing 140, and may be a protrusion. However, the disclosure is not limited thereto. In another embodiment, the first coupling portion may be a recess or a plane.

At least one adhesive injection recess 146a and 146b may be provided in each of the corners 142-1 to 142-4 of the housing 140. The at least one adhesive injection recess 146a and 146b may be depressed the upper surface 51 of each of the corners 142-1 to 142-4.

For example, the at least one adhesive injection recess 146a and 146b may be disposed in the second surface 31a of each of the corners 142-1 to 142-4 of the housing 140. For example, the at least one adhesive injection recess 146a and 146b may abut the first surface 51a of each of the corners 142-1 to 142-4 of the housing 140. However, the disclosure is not limited thereto. In another embodiment, both may be spaced apart from each other.

The at least one adhesive injection recess 146a and 146b may include through holes 46a and 46b formed through each of the corners 142-1 to 142-4. The through holes 46a and 46b may expose at least a portion of the magnet 130 (e.g. at least a portion of the upper surface of the magnet 130).

As the through holes 46a and 46b expose at least a portion of the magnet 130 (e.g. at least a portion of the upper surface of the magnet 130), the adhesive may be sufficiently coated on the magnet 130, whereby force of fixing between the magnet 130 and the housing 140 may be increased.

For example, the diameter of each of the adhesive injection recesses 146a and 146b may be 0.3 mm to 0.8 mm. In addition, for example, the diameter of each of the adhesive injection recesses 146a and 146b may be 0.4 mm to 0.6 mm.

In the case in which the diameter of each of the adhesive injection recesses 146a and 146b is less than 0.3 mm, the size thereof is too small, whereby the adhesive may not be smoothly injected thereinto. In the case in which the diameter of each of the adhesive injection recesses 146a and 146b exceeds 0.8 mm, the size thereof is too large, whereby it is not possible to secure a sufficient space to form the hole 147 of the housing 140.

For example, the through holes 46a and 46b may be provided in a portion of the bottom and a portion of the side surface of the at least one adhesive injection recess 146a and 146b. In this case, the adhesive injected into the adhesive injection recesses 146a and 146b is slowly supplied to the settlement portion 141a through the through holes 46a and 46b, whereby the adhesive is uniformly coated on the settlement portion 141a.

Two adhesive injection recesses 146a and 146b, which are spaced apart from each other, may be disposed in each of the corners 142-1 to 142-4 of the housing 140, and a stair, a projection, or a protrusion 47 protruding from the second surface 31a in the optical-axis direction may be disposed between the two adhesive injection recesses 146a and 146b. The protrusion 47 may serve to uniformly inject the adhesive into the two adhesive injection recesses 146a and 146b.

The upper surface of the protrusion 47 may form a stair with the first surface 51a in the optical-axis direction, and may be disposed lower than the first surface 51a and higher than the second surface 31a. However, the disclosure is not limited thereto. In another embodiment, the upper surface of the protrusion 47 may be the same level as the first surface 51a.

The protrusion 47 may be located between a side surface 33a and the hole 147, and may be spaced apart from the hole 147. However, the disclosure is not limited thereto. In another embodiment, both may abut each other.

For example, the diameter of the hole 147 of the housing may gradually increase in the direction from the lower surface to the upper surface of the housing 140 for easy application of the damper. However, the disclosure is not limited thereto. In another embodiment, the diameter of the hole 147 of the housing may be uniform.

For example, in order to avoid spatial interference with each of the supporting members 220-1 to 220-4, the diameter of the uppermost end of the hole 147 of the housing 140 may be 0.4 mm to 0.6 mm, and the diameter of the lowermost end of the hole 147 of the housing 140 may be 0.3 mm to 0.4 mm.

For example, the hole 147 of the housing 140 may be disposed so as to be located outside the adhesive injection recesses 146a and 146b.

The hole 147 of the housing 140 may be formed in at least one of the second surface 31a or the inclined surface 31b.

For example, the hole 147 of the housing 140 may be formed over the second surface 31a and the inclined surface 31b of the housing 140.

For example, a portion of the hole 147 of the housing 140 may be formed in the second surface 31a, and the remaining portion thereof may be formed in the inclined surface 31b.

For example, the hole 147 of the housing 140 may be located between the corner of the upper surface 51 of each of the corners 142-1 to 142-4 and the stopper 145.

The corners 142-1 to 142-4 of the housing 140 may correspond to corners of the cover member 300.

The housing 140 may include a body and a protrusion 71a protruding from a side surface of the body. For example, the body of the housing 140 may include edges 141-1 to 141-4 and corners 142-1 to 142-4.

The protrusion 71a may be disposed at each corner or corner portion of the housing 140, and may include an inclined surface 31b formed on the upper surface of the protrusion 71a and a hole 147, at least a portion of which is disposed in the inclined surface 31b. The supporting member 220 may be disposed at each corner of the housing 140.

For example, the protrusion 71a may protrude from a side surface 148 (or the outer surface) of each of the corners 142-1 to 142-4 in a diagonal direction.

For example, the diagonal direction may be a direction from the center of the housing 140 to each corner of the housing 140. For example, the diagonal direction may be a direction from the center of the housing 140 to a corresponding one of the corners 142-1 to 142-4 of the housing 140.

For example, the hole 147 of the housing 140 may be formed through the protrusion 71a.

The protrusion 71a of the housing 140 may be chamfered. The inclined surface 31b of the housing 140 may be formed at the upper surface of the protrusion 71a.

Alternatively, the housing 140 may include an upper plate and a side plate extending downwards from the upper plate. The supporting member 220 may be disposed at each corner of the upper plate of the housing 140, and may be coupled to the upper elastic member 150.

The upper plate of the housing 140 may include a hole 147 which is formed in each corner of the upper plate and through which the supporting member 220 extends. A portion of the upper plate of the housing 140 may include a protrusion 71a protruding from the side plate of the housing 140. The protrusion 71a may be formed at each corner of the upper plate of the housing 140. The protrusion 71a may include an inclined surface 31b formed at the upper surface of the protrusion 71a.

In general, the thickness of the protrusion 71a of the housing 140 (the length thereof in the optical-axis direction) is decreased in order to realize a lens moving apparatus having a small height, whereby strength of the protrusion 71a may be reduced.

However, the thickness of the protrusion 71a according to the embodiment (the length thereof in the optical-axis direction) may be decreased in the direction from the center of the housing 140 to each of the corners 142-1 to 142-4 of the housing 140. That is, the upper surface of the protrusion 71a may have both a second surface 31a and an inclined surface 31b.

As the protrusion 71a has the above form, the embodiment is capable of securing rigidity of the protrusion 71a of the housing 140 and realizing a lens moving apparatus having a small height.

A lower surface 72 of the protrusion 71a and the outer surface 148 of each of the corners 142-1 to 142-4 may be a concave recess.

In order to define a path along which the supporting member 220 extends and to avoid spatial interference between the supporting member 220 and the each of the corners 142-1 to 142-4 of the housing 140, an escape recess 148a may be provided in the outer surface 148 of each of the corners 142-1 to 142-4. The escape recess 148a may be connected to the hole 147 of the housing 140, and may be hemispherical or semi-oval. However, the disclosure is not limited thereto. The lower portion or the lower end of the escape recess 148a may be connected to the lower surface of the housing 140.

For example, the diameter of the escape recess 148a may gradually decrease in the direction from the upper portion to the lower portion thereof. However, the disclosure is not limited thereto.

Figure 12:
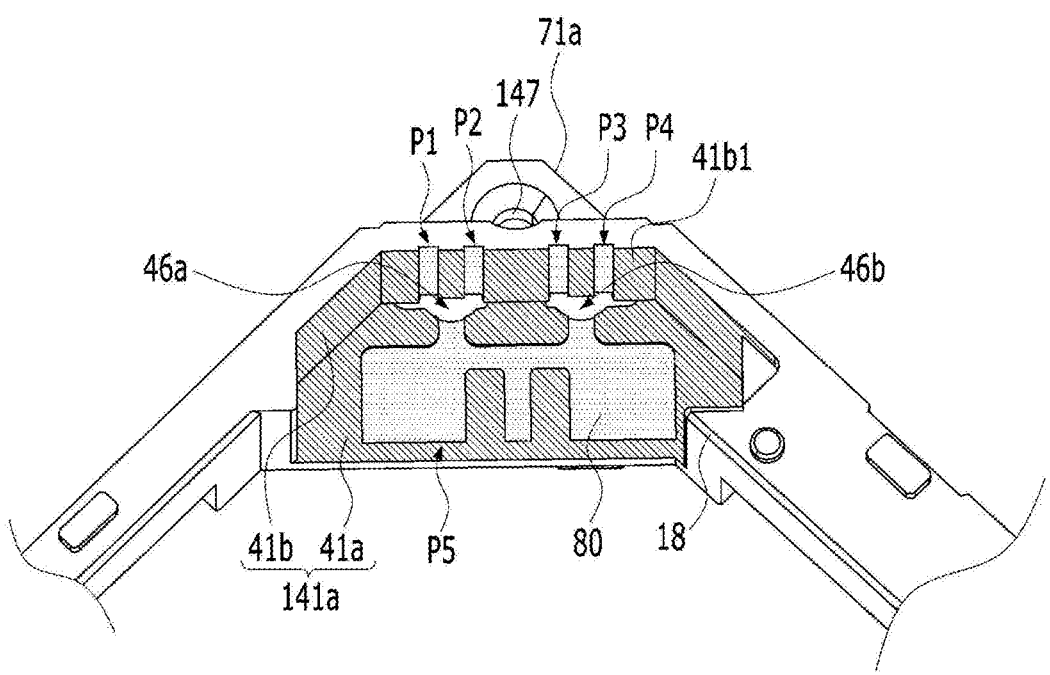
FIG. 12 is a perspective view of a settlement portion when viewed from the lower side of the housing.
Figure 13:
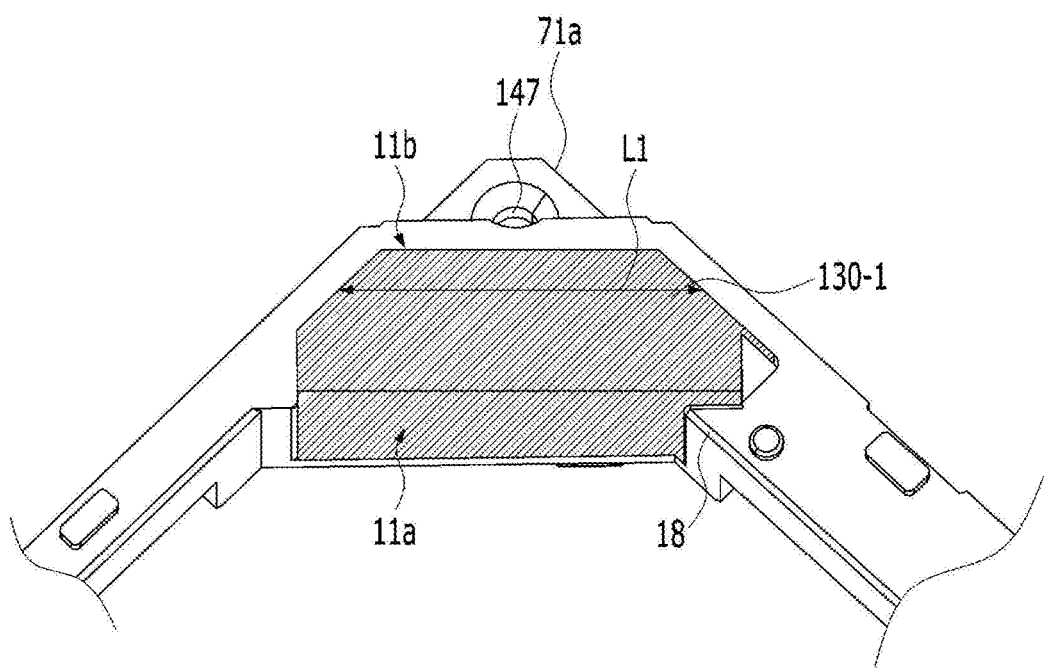
FIG. 13 shows a magnet disposed in the settlement portion of FIG. 12.

FIG. 12 is a perspective view of the settlement portion when viewed from the lower side of the housing 140, and FIG. 13 shows the magnet 130-1 disposed in the settlement portion 141a of FIG. 12.

Referring to FIGS. 12 and 13, the settlement portion 141a may include an upper surface 41a and a side surface 41b.

At least one guide recess P1 to P5 may be provided in at least one of the upper surface 41a or the side surface 41b of the settlement portion 141a. The at least one guide recess P1 to P5 may guide flow of an adhesive injected through the adhesive injection recesses 146a and 146b such that the adhesive is uniformly coated on the settlement portion 141a.

Particularly, in the case in which the adhesive injection recesses 146a and 146b are disposed in the corners, the diameter of the adhesive injection recesses 146a and 146b may decrease. The guide recesses P1 to P5 may enable the adhesive to sufficiently flow into the settlement portion 141a of the housing 140 through the adhesive injection recesses 146a and 146b having the small diameter.

For example, at least one first guide recess P1 to P4 may be provided in a side surface 41b1 of the settlement portion 141a abutting or adjacent to the adhesive injection recesses 146a and 146b. For example, a plurality of first guide recesses P1 to P4 may be provided.

The first guide recesses P1 to P4 may be connected to the adhesive injection recesses 146a and 146b in order to guide the adhesive. For example, the first guide recesses P1 to P4 may be connected to the through holes 46a and 46b of the adhesive injection recesses 146a and 146b.

In addition, at least one second guide recess P5 may be provided in the upper surface 41a of the settlement portion 141a. For example, the second guide recess P5 may be connected to the through holes 46a and 46b of the adhesive injection recesses 146a and 146b.

An adhesive 80 injected through the adhesive injection recesses 146a and 146b in order to fix the magnet 130 in the settlement portion 141a of the housing 140 may be disposed in the guide recesses P1 to P5.

A catching protrusion 18 protruding toward the center of a first opening of the settlement portion 141a may be provided on one end and/or the other end of the first opening of the settlement portion 141a.

The catching protrusion 18 may serve to inhibit each of the magnets 130-1 to 130-4 from being separated from the settlement portion 141a due to external force or external impact.

Figure 14:
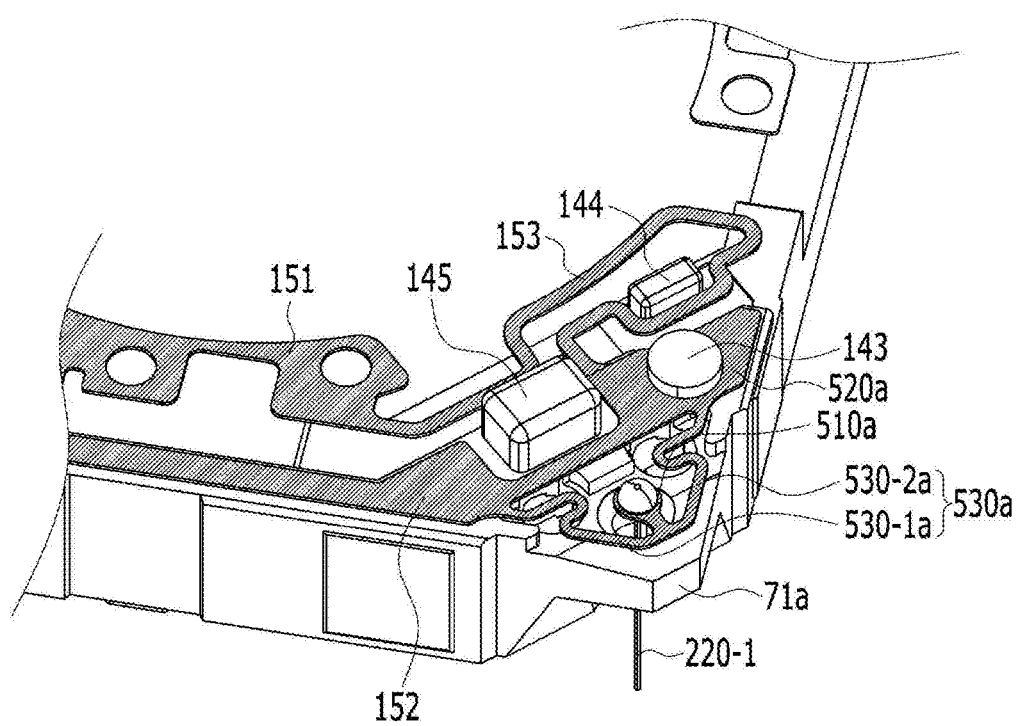
FIG. 14 shows a first upper spring and a first supporting member disposed at the first corner.
Figure 15A:
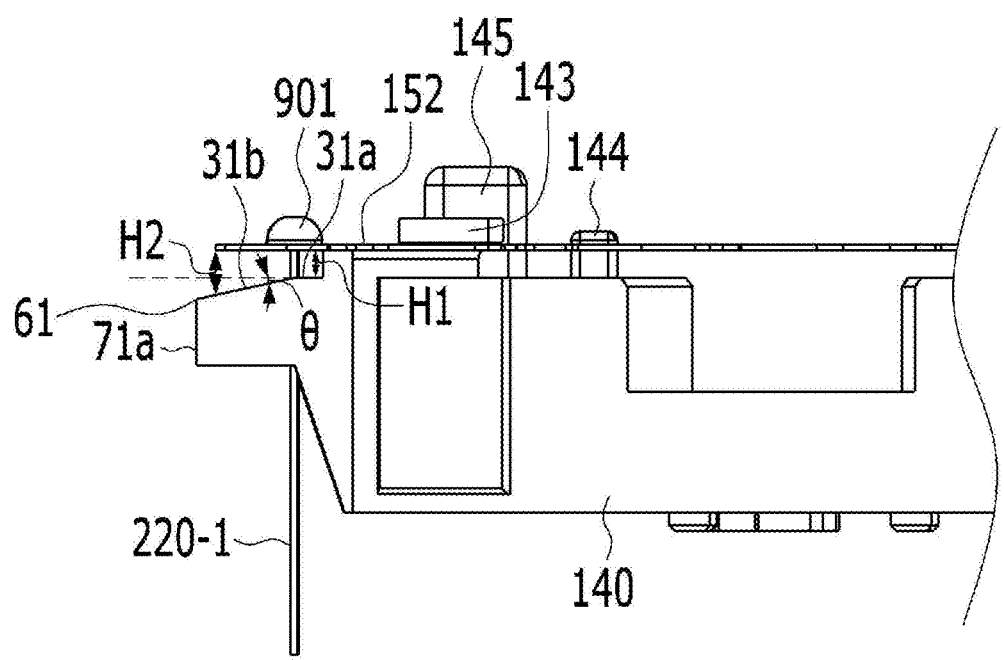
FIG. 15A is a side perspective view of the first corner of FIG. 14.
Figure 15B:
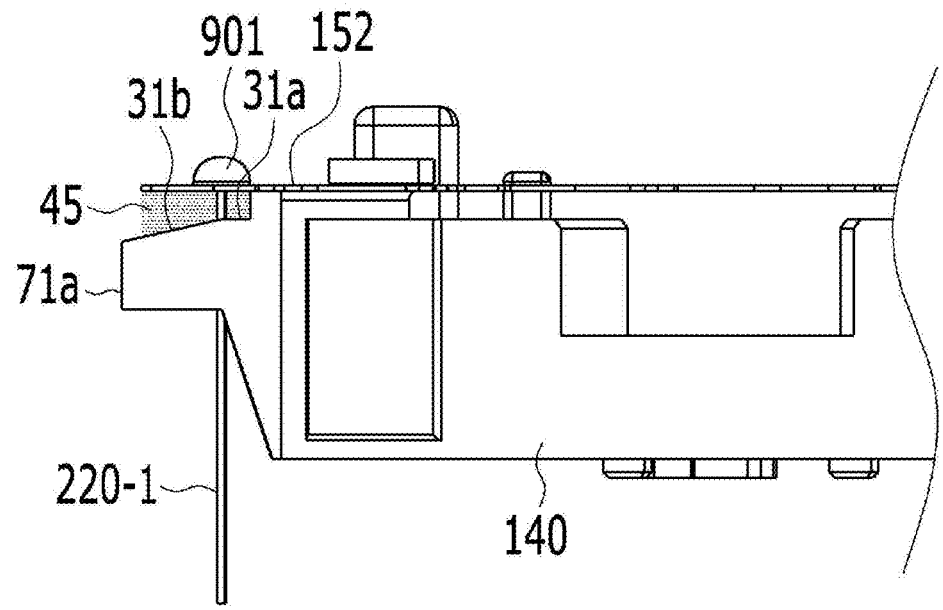
FIG. 15B shows a damper disposed between a first outer frame and the first corner of the housing shown in FIGS. 14 and 15A.
Figure 17:
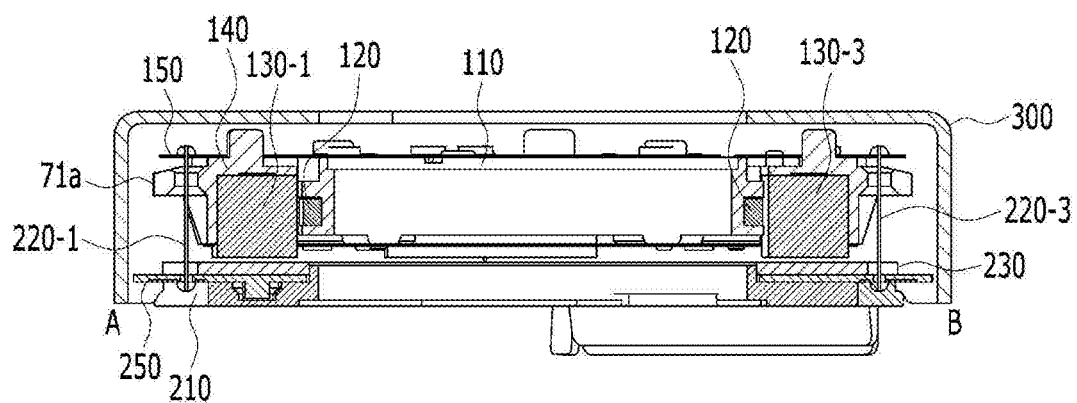
FIG. 17 is a sectional view of the lens moving apparatus shown in FIG. 3 when viewed in an AB direction.
Figure 18:
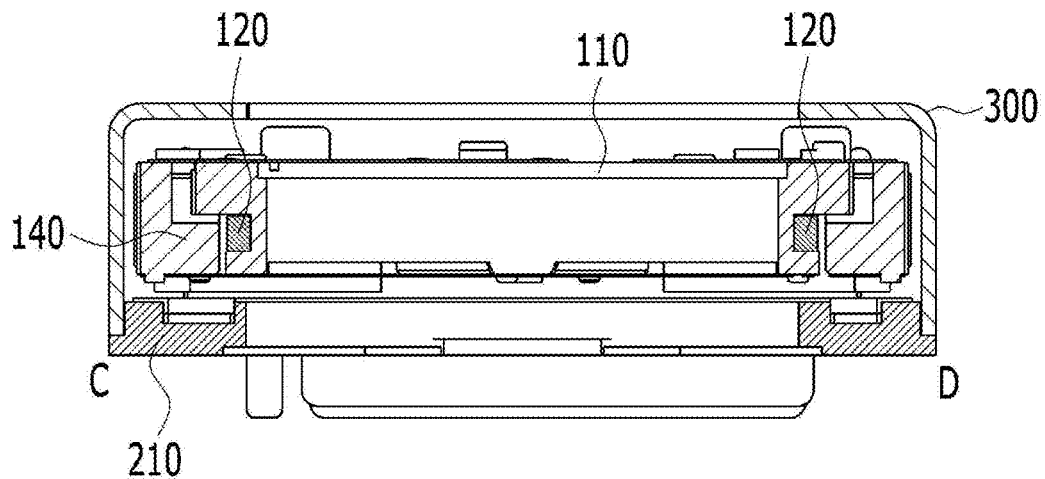
FIG. 18 is a sectional view of the lens moving apparatus shown in FIG. 3 when viewed in a CD direction.

FIG. 14 shows the first upper spring 150-1 and the first supporting member 220-1 disposed at the first corner 142-1, FIG. 15A is a side perspective view of the first corner 142-1 of FIG. 14, FIG. 15B shows a damper 45 disposed between the first outer frame 152 and the first corner 142-1 of the housing 140 shown in FIGS. 14 and 15A, FIG. 17 is a sectional view of the lens moving apparatus 100 shown in FIG. 3 when viewed in an AB direction, and FIG. 18 is a sectional view of the lens moving apparatus 100 shown in FIG. 3 when viewed in a CD direction.

The description of the first corner 142-1 of FIGS. 14, 15A and 15B may be equally applied to the second to fourth corners 142-2 to 142-4, and the description of the first supporting member 220-1 of FIGS. 14, 15A and 15B may be equally applied to the second to fourth supporting members 220-2 to 220-4.

Referring to FIGS. 14, 15A, 15B, 17, and 18, the first corner 142-1 of the housing 140 may include a first surface 51a, a second surface 31a, and an inclined surface 31b. In addition, the first corner 142-1 of the housing 140 may further include a third surface 51c.

The second surface 31a may be a plane perpendicular to the optical axis, and the second surface 31a and the inclined surface 31b may be connected to each other or may abut each other.

For example, at least one of the first to fourth corners 142-1 to 142-4 may include a first surface 51a, a second surface 31a, and an inclined surface 31b.

For example, a center line 10-1 of the hole 147 of the housing 140 may be located closer to the first surface 51a based on a boundary line between the second surface 31a and the inclined surface 31b. However, the disclosure is not limited thereto.

For example, the distance from a center line 190-1 of the hole 147 to the boundary line between the second surface 31a and the inclined surface 31b may be a predetermined value or less. Here, the predetermined value may be 0.1 mm to 0.3 mm. However, the disclosure is not limited thereto.

In another embodiment, the center of the hole 147 of the housing 140 may overlap or may be aligned with the boundary line between the second surface 31a and the inclined surface 31b. As a result, it is possible to improve the effect of avoiding spatial interference between the supporting member and the housing, whereby the damper 45 may be uniformly coated along the inclined surface 31b.

The hole 147 of the housing 140 may not overlap the magnet 130 in the optical-axis direction.

An angle $\theta$ at which the inclined surface 31b is inclined downwards from the second surface 31a may be 10 degrees to 30 degrees. For example, the angle $\theta$ may be 12 degrees to 25 degrees. For example, the angle $\theta$ may be 12.8 degrees. For example, the angle $\theta$ may be a value obtained by subtracting the angle $\theta 1$ of FIG. 10B from 180 degrees.

In the case in which the angle $\theta$ is less than 10 degrees, spatial interference may occur between the upper springs 150-1 and 150-2 and the corners 142-1 to 142-4 of the housing 140 and/or spatial interference may occur between the supporting members 220-1 to 220-4 and the corners 142-1 to 142-4 of the housing 140, whereby the lens moving apparatus may malfunction or may be damaged.

In the case in which the angle $\theta$ exceeds 30 degrees, the thickness of the protrusion 71a may be decreased, whereby strength of the protrusion 71a may be reduced. In another embodiment, the thickness of the lower end of the protrusion 71a (the length thereof in the optical-axis direction) may be increased so as to be larger than the thickness of the upper end of the protrusion 71a (the length thereof in the optical-axis direction) in order to increase the strength of the protrusion 71a.

Also, in the case in which the angle $\theta$ exceeds 30 degrees, the thickness of the damper 45 (see FIG. 15B) located between each of the upper springs 150-1 and 150-2 and the inclined surface may be increased, whereby shock-absorbing force of the damper may vary and thus AF operation and/or OIS operation may be abnormally performed.

The second surface 31a and the inclined surface 31b may have a stair formed from the upper surface 51a of the first corner 142-1 in the optical-axis direction.

The housing 140 may further include a side surface connected between the first surface 51a and the second surface 31a, e.g. a stair surface.

The upper elastic member 150 (e.g. the first outer frame 152) may be spaced apart from the second surface 31a and the inclined surface 31b of the first corner 142-1.

At the initial position of the operation unit (e.g. the bobbin 110), a first distance H1 from the lower surface of the first outer frame 152 of each of the upper springs 150-1 and 150-2 to the second surface 31a of each of the corners 142-1 to 142-4 in the optical-axis direction may be smaller than a second distance H2 from the lower surface of the first outer frame 152 of each of the upper springs 150-1 and 150-2 to the inclined surface 31b of each of the corners 142-1 to 142-4 in the optical-axis direction (H1<H2).

For example, the first distance H1 may be 0.01 mm to 0.02 mm.

For example, the second distance H2 may be 0.25 mm to 0.3 mm. For example, the second distance H2 may be 0.27 mm.

The embodiment is capable of inhibiting spatial interference between the upper springs 150-1 and 150-2 and the corners 142-1 to 142-4 of the housing 140 and/or spatial interference between the supporting members 220-1 to 220-4 and the corners 142-1 to 142-4 of the housing 140 due to the inclined surface 31b provided at each of corners 142-1 to 142-4.

The damper 45 may be disposed on the second surface 31a and the inclined surface 31b of the housing 140 (e.g. each of the corners 142-1 to 142-4).

For example, the damper 45 may be disposed between the lower surface of the first outer frame 152 of each of the upper springs 150-1 and 150-2 and the second surface 31a of each of corners 142-1 to 142-4 and between the lower surface of the first outer frame 152 and the inclined surface 31b of each of corners 142-1 to 142-4.

The damper 45 may serve to absorb or alleviate vibration of each of the upper elastic members 150-1 and 150-2. In addition, a portion of the damper 45 may be disposed on a portion of the upper surface of the first outer frame 152 of each of the upper elastic members 150-1 and 150-2.

A portion of the damper 45 may be disposed in the hole 147 of the housing 140, whereby vibration of each of the supporting members 220-1 to 220-4 may be absorbed or alleviated.

The thickness of the damper 45 (the length thereof in the optical-axis direction) may increase in the direction from the second surface 31a to the inclined surface 31b.

A portion of the damper 45 may be disposed in the adhesive injection recesses 146a and 146b of the housing 140.

After the adhesive 80 is injected into the settlement portion 141a of the housing 140 through the adhesive injection recesses 146a and 146b, the damper 45 may be injected between the first outer frame 152 of each of the upper springs 150-1 and 150-2 and the horizontal surface of each of the corners 142-1 to 142-4 and between the first outer frame 152 and the inclined surface 31b.

When the damper 45 is coated on the adhesive injection recesses 146a and 146b, the second surface 31a, and the inclined surface 31b, the damper 45 may be uniformly coated on the opposite side of the adhesive injection recesses 146a and 146b along the inclined surface 31b.

A portion of the damper 45 may be disposed on the adhesive injection recesses 146a and 146b.

For example, the damper 45 may fill the through holes 46a and 46b of the adhesive injection recesses 146a and 146b in order to cover the same, whereby it is possible to reduce or minimize the amount of foreign matter discharged from the adhesive (e.g. bonding resin).

Figure 16A:
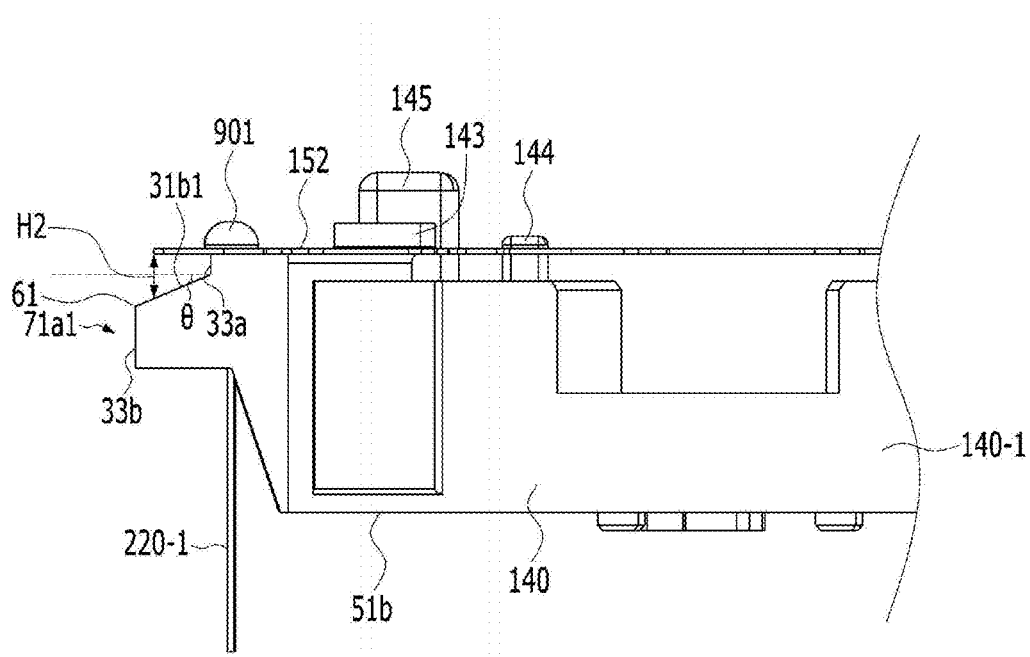
FIG. 16A shows a first upper spring and a first supporting member disposed at a housing according to another embodiment.

FIG. 16A shows a first upper spring 150-1 and a first supporting member 220-1 disposed at a housing 140-1 according to another embodiment.

Referring to FIG. 16A, the housing 140-1 may include a first surface 51a, to which an upper elastic member 150 (e.g. a first outer frame 152) is coupled, and an inclined surface 31b1 disposed higher than a bottom surface 51b of the housing 140-1 and lower than the first surface 51a thereof.

For example, the housing 140-1 may include a protrusion 71a1 including a first surface 51a and an inclined surface 31b1. The protrusion 71a1 may further include a first side surface 33a.

A first hole 147 may be formed in the inclined surface 31b1. The inclined surface 31b1 may be inclined downwards from the first surface 51a of the housing 140-1 at a predetermined angle.

For example, the inclined surface 31b1 may be spaced apart from the first surface 51a, and may have a stair formed from the first surface 51a in the optical-axis direction. A damper may be disposed between the inclined surface 31b1 and the lower surface of the upper elastic member 150.

The housing 140-1 may further include a first side surface 33a connected between the first surface 51a and the inclined surface 31b1 and a second side surface 33b connected to the inclined surface 31b1, and the inclined surface 31b1 may be disposed between the first side surface 33a and the second side surface 33b.

Figure 16B:
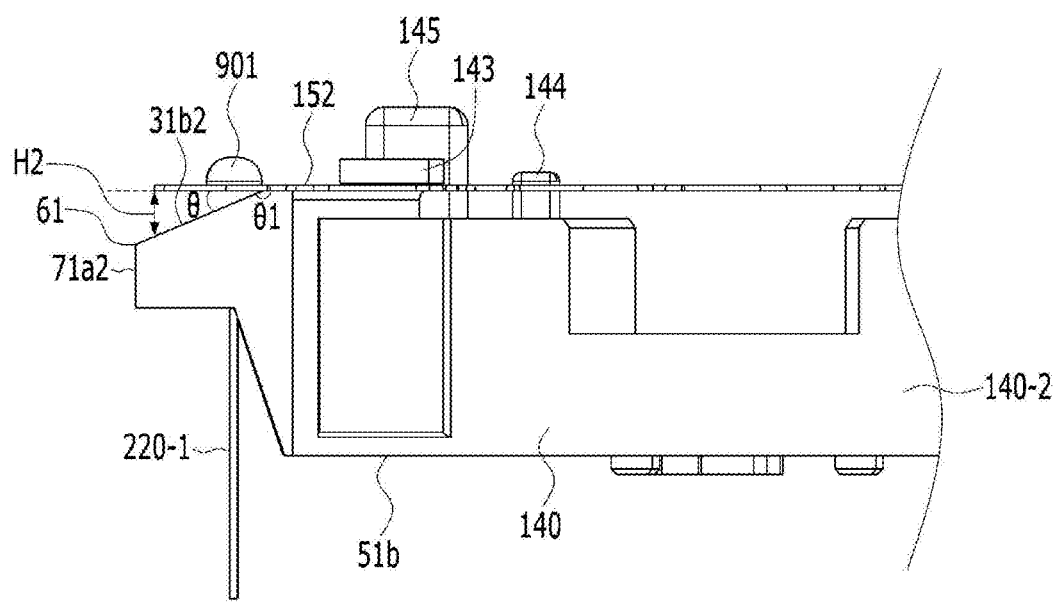
FIG. 16B shows a first upper spring and a first supporting member disposed at a housing according to another embodiment.

FIG. 16B shows a first upper spring 150-1 and a first supporting member 220-1 disposed at a housing 140-2 according to another embodiment.

Referring to FIG. 16B, the housing 140-2 may include a first surface 51a, to which an upper elastic member 150 (e.g. a first outer frame 152) is coupled, and an inclined surface 31b2 extending from the first surface 51a and inclined downwards from the first surface 51a at a predetermined angle θ.

For example, the housing 140-2 may include a protrusion 71a2 including a first surface 51a and an inclined surface 31b2.

For example, the inclined surface 31b2 may abut the first surface 51a, and a damper may be disposed between the inclined surface 31b2 and the lower surface of the upper elastic member 150.

A first hole 147 may be formed in the inclined surface 31b2. The inclined surface 31b2 may be inclined downwards from the first surface 51a of the housing 140-2 at the predetermined angle θ.

Figure 16C:
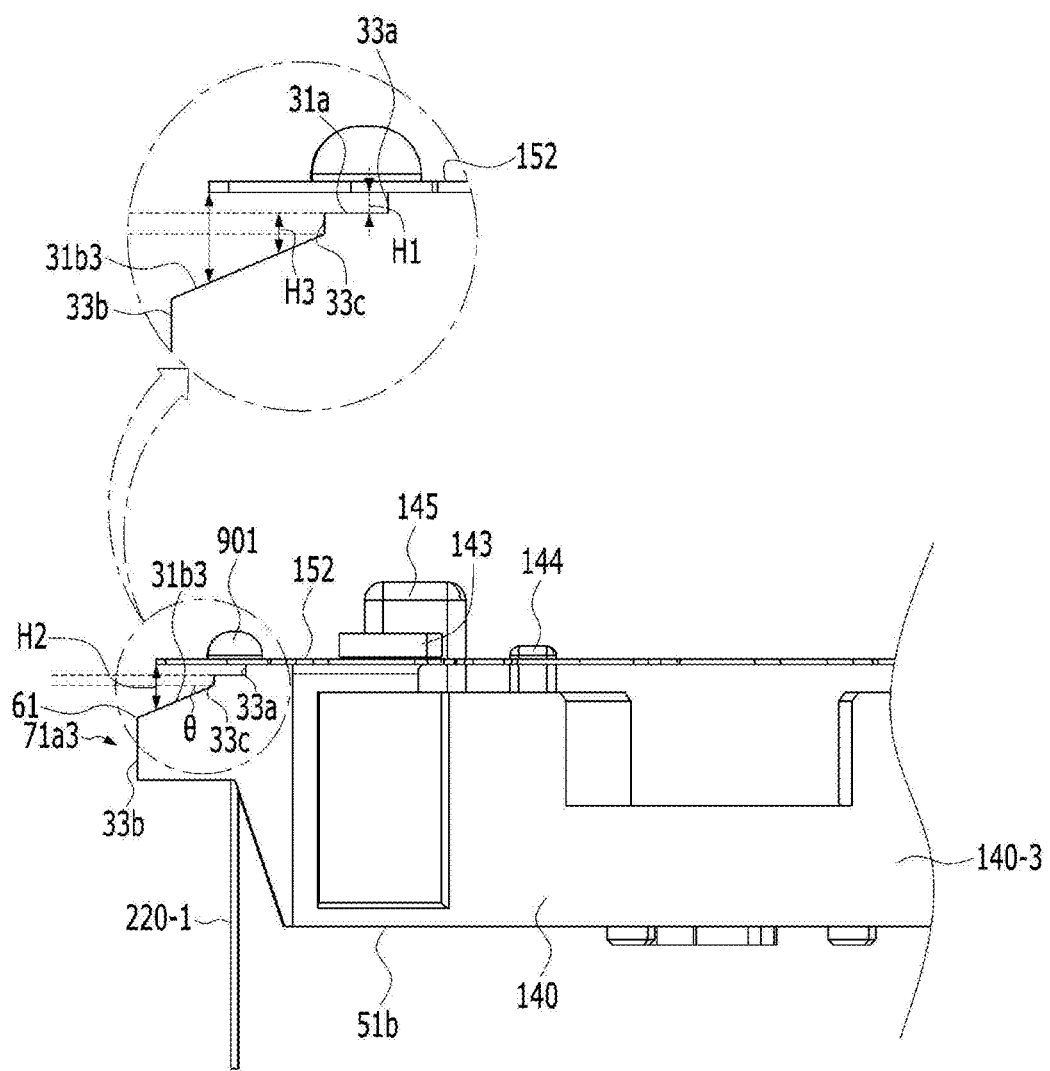
FIG. 16C shows a first upper spring and a first supporting member disposed at a housing according to a further embodiment.

FIG. 16C shows a first upper spring 150-1 and a first supporting member 220-1 disposed at a housing 140-3 according to a further embodiment.

Referring to FIG. 16C, the housing 140-3 may include a first surface 51a, to which an upper elastic member 150 (e.g. a first outer frame 152) is coupled, a second surface 31a disposed higher than a bottom surface 51b of the housing 140-3 and lower than the first surface 51a thereof, and an inclined surface 31b3 spaced apart from the second surface 31a and inclined by a predetermined angle.

For example, the housing 140-3 may include a protrusion 71a2 including a first surface 51a, a second surface 31a, and an inclined surface 31b3. The protrusion 71a2 may further include first to third side surfaces 33a to 33c, a description of which will follow.

For example, the inclined surface 31b3 may be inclined downwards from the first surface 51a or the second surface 31*a* by the predetermined angle. The inclined surface 31*b*3 may have a stair H3 formed from the second surface 31*a* in the optical-axis direction. The description of the angle θ of FIGS. 16A and 16B may be equally applied to the angle of the inclined surface 31*b*3.

A first hole 147 may be formed in at least one of the second surface 31*a* or the inclined surface 31*b*3.

The housing 140-3 may further include a first side surface 33*a* connected between the first surface 51*a* and the second surface 31*a*, a second side surface 33*b* connected to the inclined surface 31*b*1, and a third side surface 33*c* connected between the second surface 31*a* and the inclined surface 31*b*3, and the inclined surface 31*b*3 may be disposed between the second side surface 33*b* and the third side surface 33*c*. For example of each of the first side surface 33*a* and the third side surface 33*c* may be a stair surface in the optical-axis direction.

In FIGS. 16A to 16C, each of the housings 140-1 to 140-3 may further include a third surface 51*c* of FIG. 10A.

The description of the first corner 142-1 of each of the housings 140-1 to 140-3 of FIGS. 16A to 16C may be equally applied to the second to fourth corners 142-2 to 142-4 of each of the housings 140-1 to 140-3, and the description of the first supporting member 220-1 of FIGS. 16A to 16C may be equally applied to the second to fourth supporting members 220-2 to 220-4.

The lens moving apparatus 100 according to the embodiment may further include a sensing magnet for feedback AF driving, an AF position sensor, a circuit board connected to the AF position sensor, and a balancing magnet.

Figure 19:
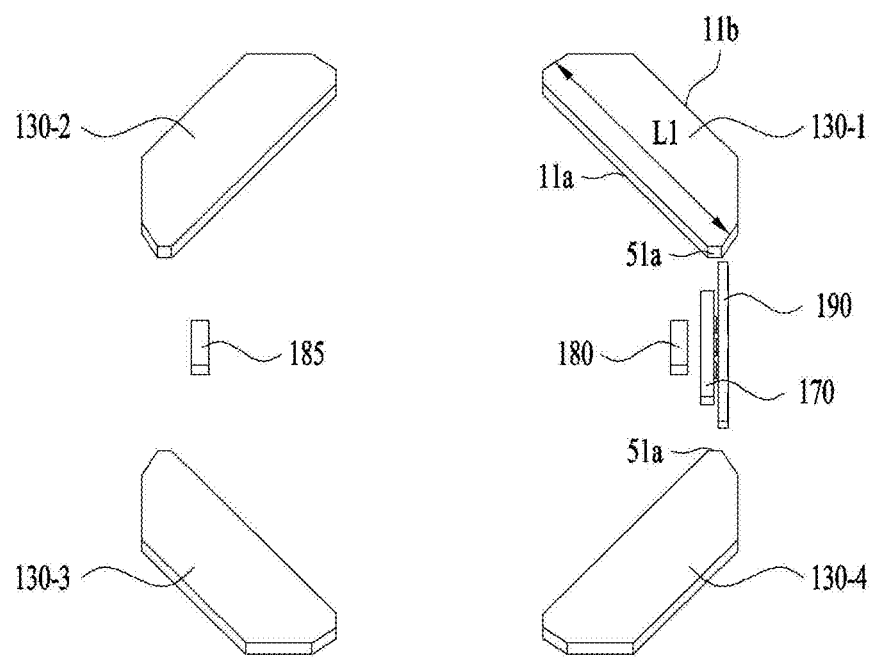
FIG. 19 shows a magnet, a sensing magnet, an AF position sensor, a circuit board, and a balancing magnet of the lens moving apparatus according to the embodiment.

FIG. 19 shows magnets 130-1 to 130-4, a sensing magnet 180, an AF position sensor 170, a circuit board 190, and a balancing magnet 185 of the lens moving apparatus according to the embodiment.

Referring to FIG. 19, the sensing magnet 180 and the balancing magnet 185 may be disposed at the bobbin 110. The bobbin 110 may be provided with settlement recesses, in which the sensing magnet 180 and the balancing magnet 185 are disposed.

For example, the interface between an N pole and an S pole of each of the sensing magnet 180 and the balancing magnet 185 disposed at the bobbin 110 may be parallel to a direction perpendicular to the optical axis OA. For example, surfaces of each of the sensing magnet 180 facing the AF position sensor 170 and the balancing magnet 185 may be divided into an N pole and an S pole. However, the disclosure is not limited thereto.

For example, in another embodiment, the interface between an N pole and an S pole of each of the sensing magnet 180 and the balancing magnet 185 disposed at the bobbin 110 may be parallel to the optical axis OA.

For example, each of the sensing magnet 180 and the balancing magnet 185 may be a monopolar magnetized magnet or a bipolar magnetized magnet.

The AF position sensor 170 and the circuit board 190 may be disposed at the housing 140.

For example, the AF position sensor 170 may be disposed or mounted on the circuit board 190 disposed at the housing 140, and may be connected to the circuit board 190

The AF position sensor 170 may be realized as a Hall sensor alone, or may be configured in the form of a driver IC including a Hall sensor.

The sensing magnet 180 may be moved together with the bobbin 110 in the optical-axis direction as the result of electromagnetic interaction between the first coil 120 and the magnets 130-1 to 130-4, and the AF position sensor 170 may sense the intensity of a magnetic field of the sensing magnet 180 moved in the optical-axis direction. Since the intensity of the magnetic field sensed by the AF position sensor 170 varies depending on the displacement of the bobbin 110 in the optical-axis direction, the displacement of the bobbin 110 in the optical-axis direction may be sensed based on the intensity of the magnetic field sensed by the AF position sensor 170.

For example, the AF position sensor 170 and the circuit board 190 may be disposed at one edge 141-1 of the housing 140.

For example, the AF position sensor 170 may be located between two magnets 130-1 and 130-4 disposed at two corners 142-1 and 142-4 of the housing 140.

In addition, the sensing magnet 180 may be located between the magnet 130-1 disposed at the first corner 142-1 and the fourth magnet 130-4 disposed at the fourth corner 142-4.

The sensing magnet 180 may overlap the first surface 11*a* of each of the first and fourth magnets 130-1 and 130-4 in a direction parallel to the direction from the first corner 142-1 to the fourth corner 142-4 of the housing 140.

In addition, the balancing magnet 185 may be located between the second magnet 130-2 disposed at the second corner 142-2 and the third magnet 130-3 disposed at the third corner 142-3.

The balancing magnet 185 may overlap the first surface 11*a* of the second and third magnets 130-2 and 130-3 in a direction parallel to the direction from the first corner 142-1 to the fourth corner 142-4 of the housing 140.

For example, the AF position sensor 170 may overlap the corner 51*a* of each of the first and fourth magnets 130-1 and 130-4 in a direction parallel to the direction from the first corner 142-1 to the fourth corner 142-4 of the housing 140.

Since the length L1 of each of magnets 130-1 to 130-4 decreases in the direction from the center of the housing 140 to a corresponding one of the corners 142-2 to 142-4 of the housing 140, magnetic field interference between the sensing magnet 180 and the magnets 130-1 and 130-4 and magnetic field interference between the balancing magnet 185 and the magnets 130-1 and 130-4 may be reduced.

The sensing magnet 180 and the balancing magnet 185 may be disposed or aligned at the bobbin 110 so as to face the AF position sensor 170. As a result, the sensing magnet 180 and the balancing magnet 185 may be balanced in weight, the influence on the first coil 120 may be offset, and accuracy in autofocus (AF) driving may be improved.

The circuit board 190 may be connected to at least one of the upper elastic member 150 or the lower elastic member 160, and may be connected to a plurality of terminals of the circuit board 250.

For example, the upper elastic member 150 may include a plurality of upper springs, and the lower elastic member 160 may include a plurality of lower springs. In addition, the lens moving apparatus may include supporting members corresponding to the upper springs.

In the case in which the AF position sensor 170 is a single Hall sensor, the AF position sensor 170 may include two input terminals and two output terminals, which is referred to as "Case 1."

In Case 1, the first coil 120 may be connected to two of the upper springs, and may be connected to two of the terminals of the circuit board 250 through two supporting members connected to the two upper springs.

In Case 1, the two input terminals and the two output terminals of the AF position sensor 170 may be connected to four of the upper springs, and may be connected to four of the terminals of the circuit board 250 through four supporting members connected to the four upper springs.

In the case in which the AF position sensor 170 is configured in the form of a driver IC including a Hall sensor, the AF position sensor 170 may include four communication terminals for transmitting a clock signal LCLK, electric power signals VCC and GND, and data in order to perform I2C communication and two electric power provision terminals for providing a driving signal to the first coil, which is referred to as "Case 2."

In Case 2, the first coil 120 may be connected to two of the lower springs.

In Case 2, the four communication terminals of the AF position sensor may be connected to four of the upper springs, and may be connected to four of the terminals of the circuit board 250 through supporting members connected to the four upper springs.

In Case 2, the two electric power provision terminals of the AF position sensor may be connected to the two lower springs, and the AF position sensor may directly provide a driving signal to the first coil 120.

Figure 20:
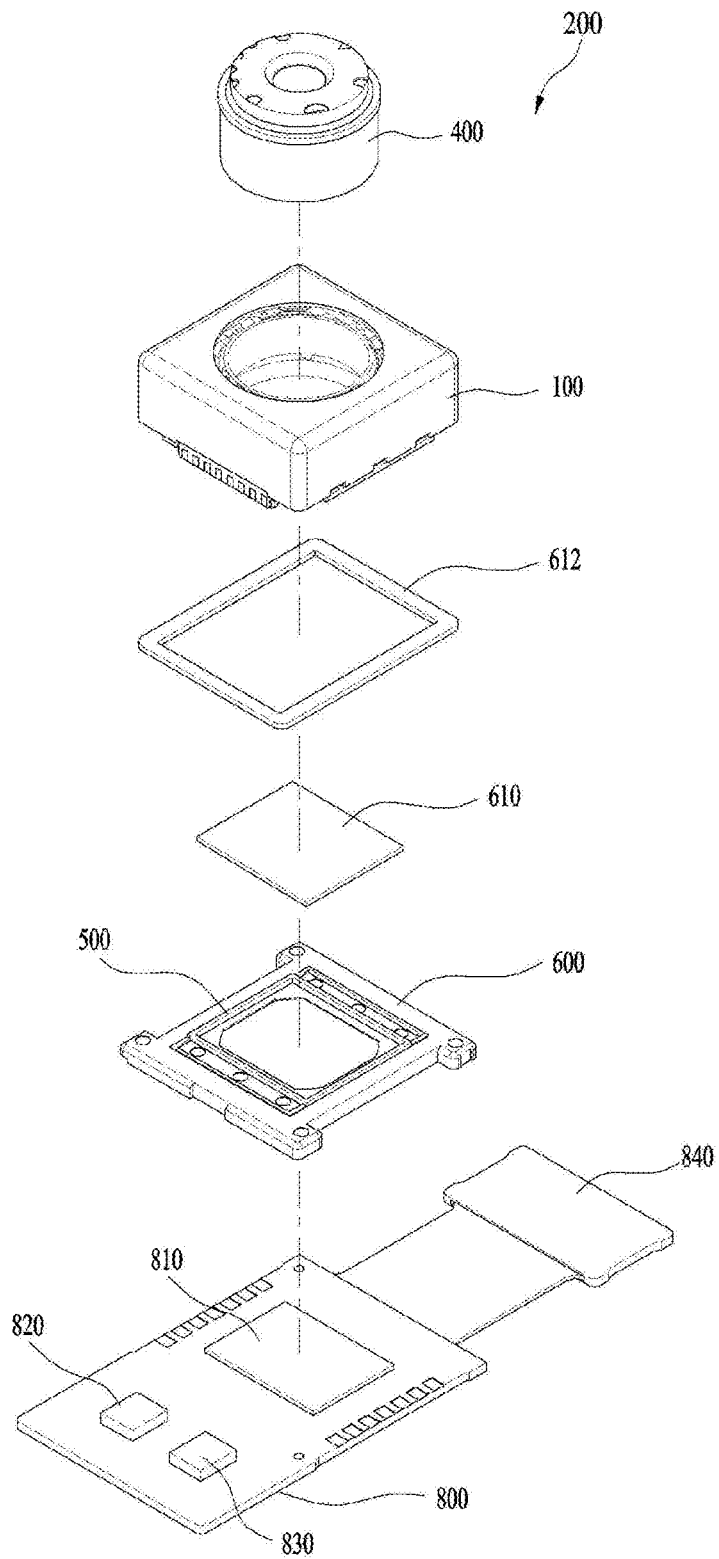
FIG. 20 is an exploded perspective view of a camera module according to an embodiment.

FIG. 20 is an exploded perspective view of a camera module 200 according to an embodiment.

Referring to FIG. 20, the camera module may include a lens unit 400, a lens moving apparatus 100, an adhesive member 710, a filter 610, a first holder 600, a second holder 800, an image sensor 810, a motion sensor 820, a controller 830, and a connector 840.

The lens unit 400 may be mounted to the bobbin 110 of the lens moving apparatus 100. The lens unit 400 may include a lens and/or a lens barrel.

The first holder 600 may be disposed under the base 210 of the lens moving apparatus 100. The filter 610 may be mounted to the first holder 600, and the first holder 600 may be provided with a protrusion 500, on which the filter 610 is settled.

The adhesive member 612 may couple or adhere the base 210 of the lens moving apparatus 100 to the first holder 600. The adhesive member 710 may serve to inhibit foreign matter from being introduced into the lens moving apparatus 100, in addition to the adhesive function thereof.

For example, the adhesive member 612 may be an epoxy, a thermo-hardening adhesive, or an ultraviolet-hardening adhesive.

The filter 610 may function to inhibit a specific-frequency-band component of light passing through the lens unit 400 from being incident on the image sensor 810. The filter 610 may be an infrared cutoff filter; however, the disclosure is not limited thereto. At this time, the filter 610 may be disposed parallel to the x-y plane.

An opening, through which light passing through the filter 610 is incident on the image sensor 810, may be formed in the region of the first holder 600 on which the filter 610 is mounted.

The second holder 800 may be disposed under the first holder 600, and the image sensor 810 may be mounted on the second holder 600. The image sensor 810 is a region on which light passing through the filter 610 is incident in order to form an image including the light.

The second holder 800 may be provided with various circuits, elements, and a controller in order to convert an image formed on the image sensor 810 into an electrical signal and transfer the electrical signal to an external apparatus.

The second holder 800 may be realized as a circuit board, on which the image sensor may be mounted, on which a circuit pattern may be formed, and on which various elements are coupled to each other. The first holder 600 may also be referred to as a "holder" or a "sensor base," and the second holder 800 may also be referred to as a "board" or a "circuit board."

The image sensor 810 may receive an image included in light incident through the lens moving apparatus 100, and may convert the received image into an electrical signal.

The filter 610 and the image sensor 810 may be disposed so as to be spaced apart from each other in the state of being opposite each other in the first direction.

The motion sensor 820 may be mounted on the second holder 800, and may be connected to the controller 830 via the circuit pattern provided on the second holder 800.

The motion sensor 820 outputs information about rotational angular velocity based on movement of the camera module 200. The motion sensor 820 may be realized as a two-axis or three-axis gyro sensor or an angular velocity sensor.

The controller 830 is mounted on the second holder 800, and may be connected to the OIS position sensor 240 and the second coil 230 of the lens moving apparatus 100. For example, the second holder 800 may be connected to the circuit board 250 of the lens moving apparatus 100, and the controller 830 mounted on the second holder 800 may be connected to the first coil 120, the second coil 230, and the OIS position sensor 240 via the circuit board 250.

The controller 830 may provide a driving signal to the first coil 120 for AF driving, and may provide a driving signal to the second coil 230 for OIS driving.

In addition, the controller 830 may provide a driving signal to the OIS position sensor 240 for OIS feedback driving, and may receive an output signal output from the OIS position sensor 240.

In the case in which the lens moving apparatus 100 includes an AF position sensor 170, the controller 830 may provide a driving signal to the AF position sensor 170, and may receive an output signal output from the AF position sensor 170.

The connector 840 may be connected to the second holder 800, and may have a port for connection with an external apparatus.

Figure 21:
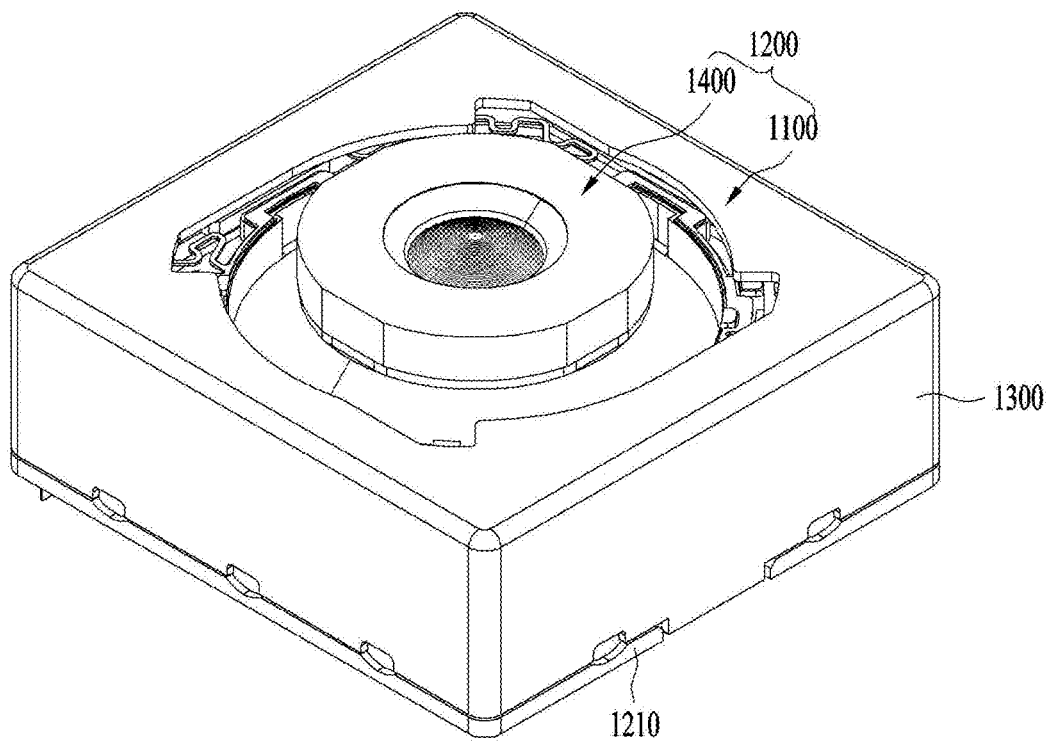
FIG. 21 is a perspective view of a camera module according to another embodiment.
Figure 22:
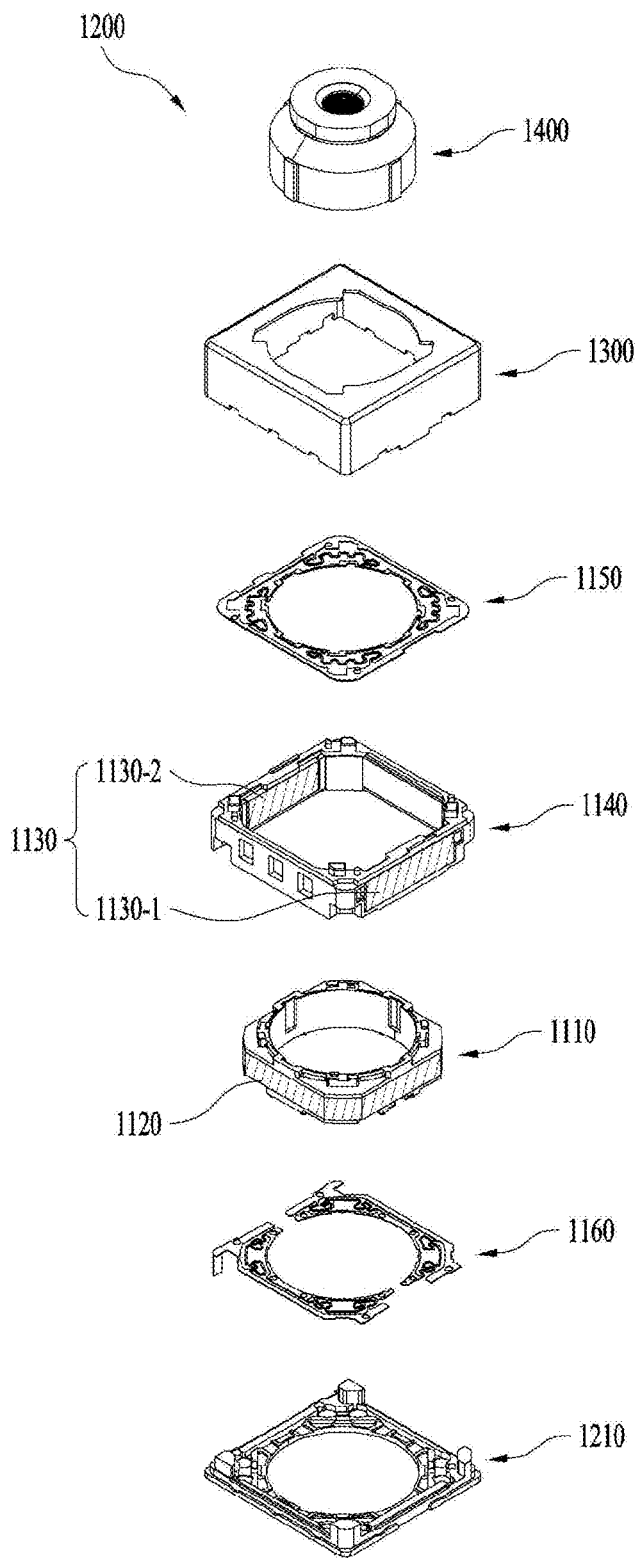
FIG. 22 is a separated perspective view of the camera module of FIG. 21.
Figure 23:
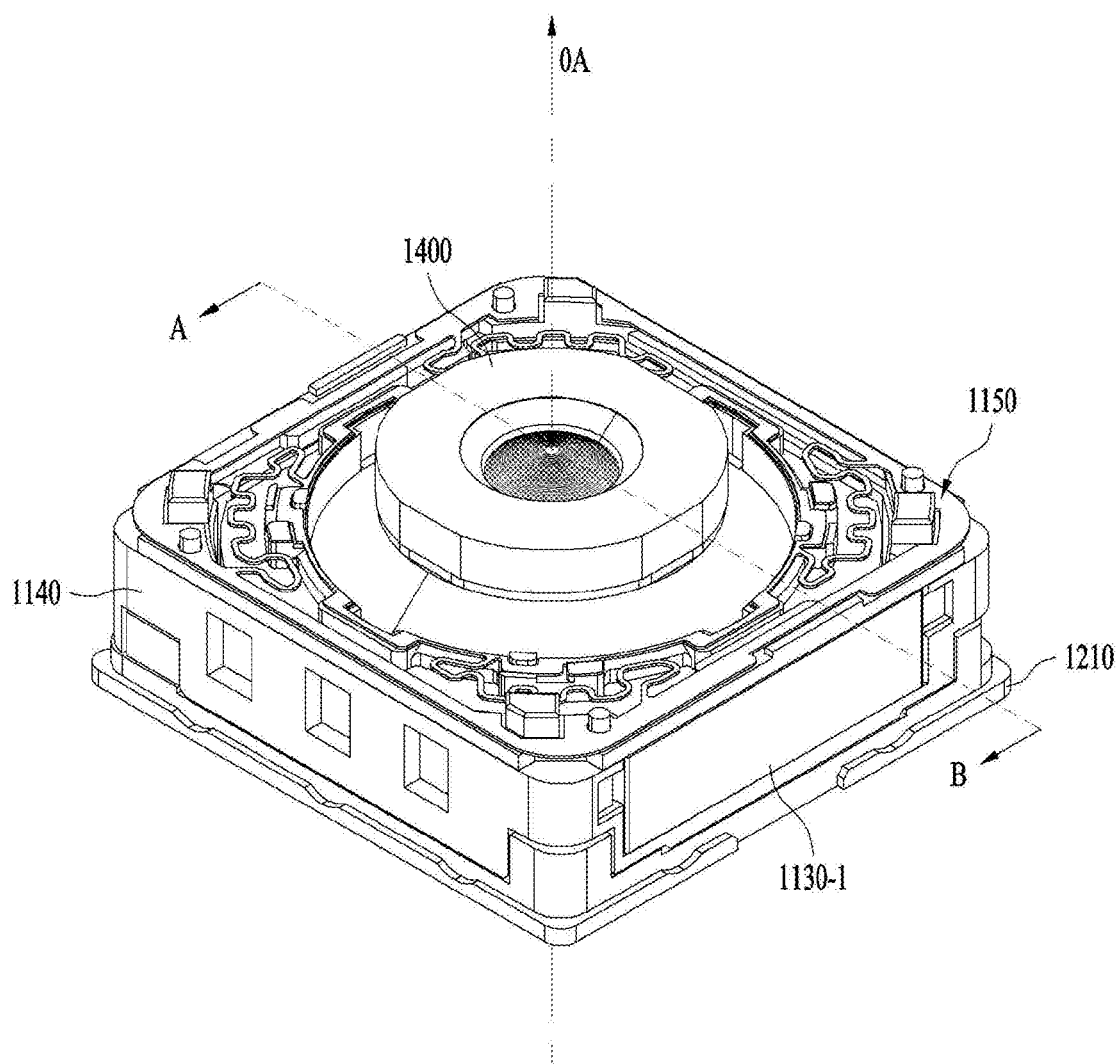
FIG. 23 is a perspective view of the camera module of FIG. 21 with a cover member removed.
Figure 24A:
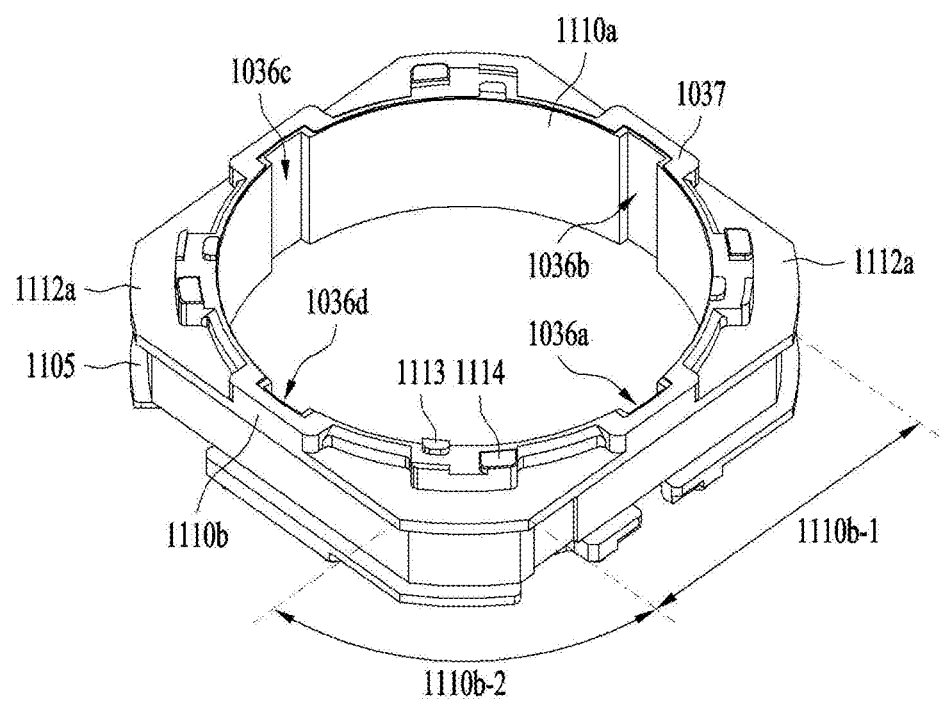
FIG. 24A is a first perspective view of a bobbin shown in FIG. 23.
Figure 24B:
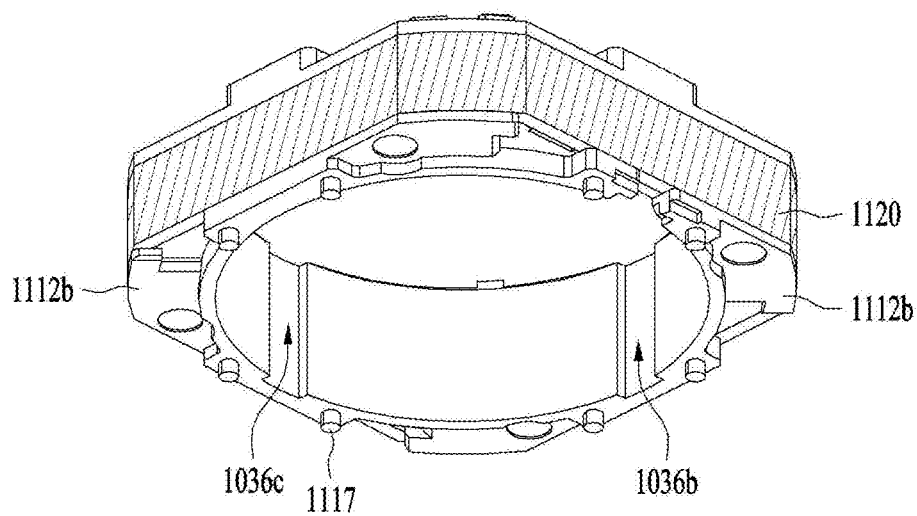
FIG. 24B is a coupled perspective view of the bobbin and a coil.
Figure 25A:
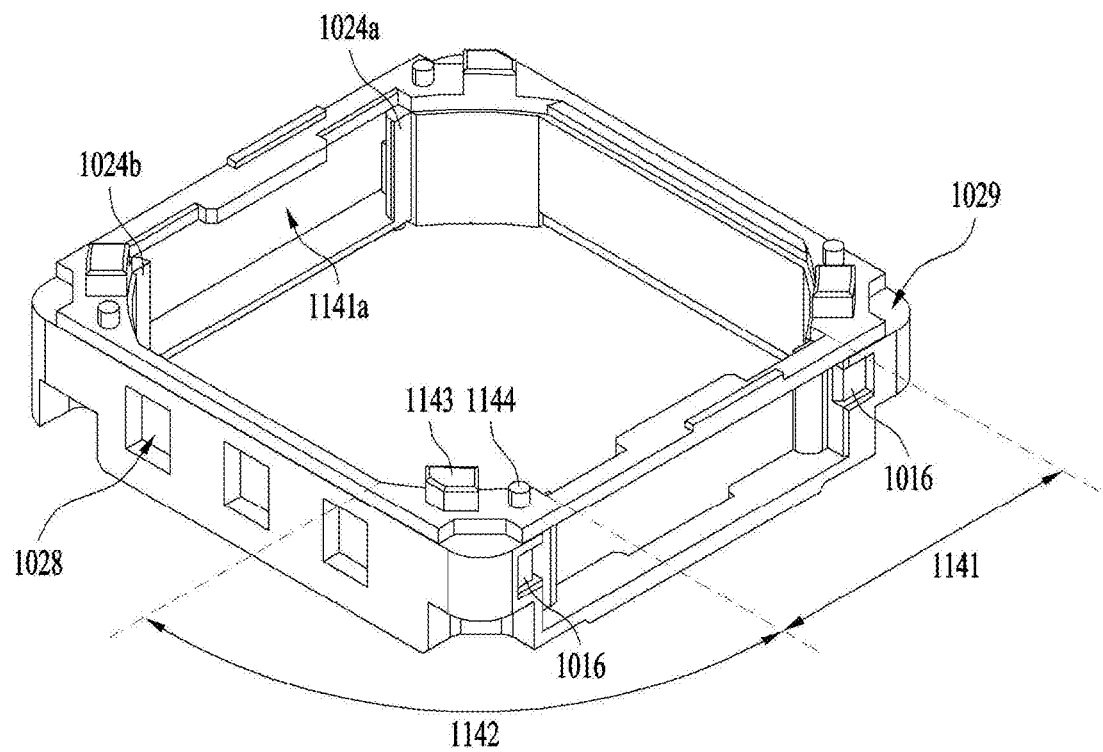
FIG. 25A is a perspective view of a housing of FIG. 23.
Figure 25B:
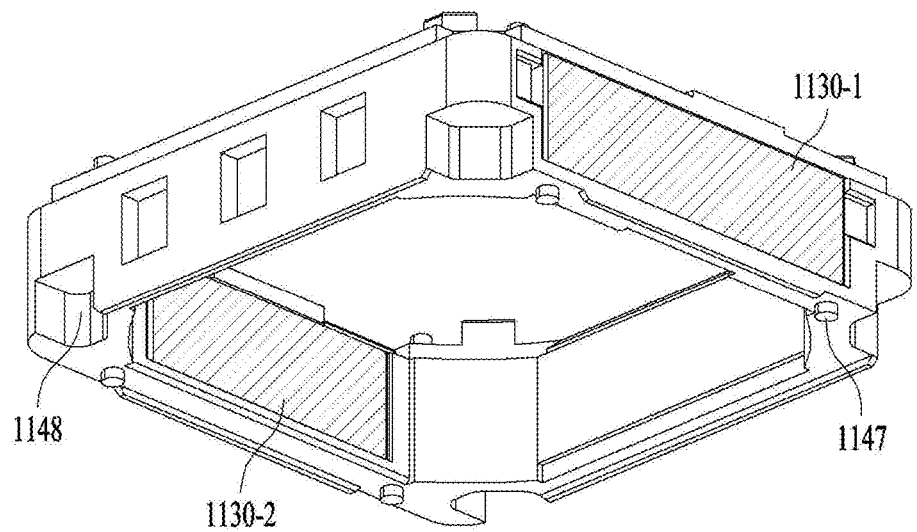
FIG. 25B is a coupled perspective view of the housing and a magnet of FIG. 23.
Figure 26:
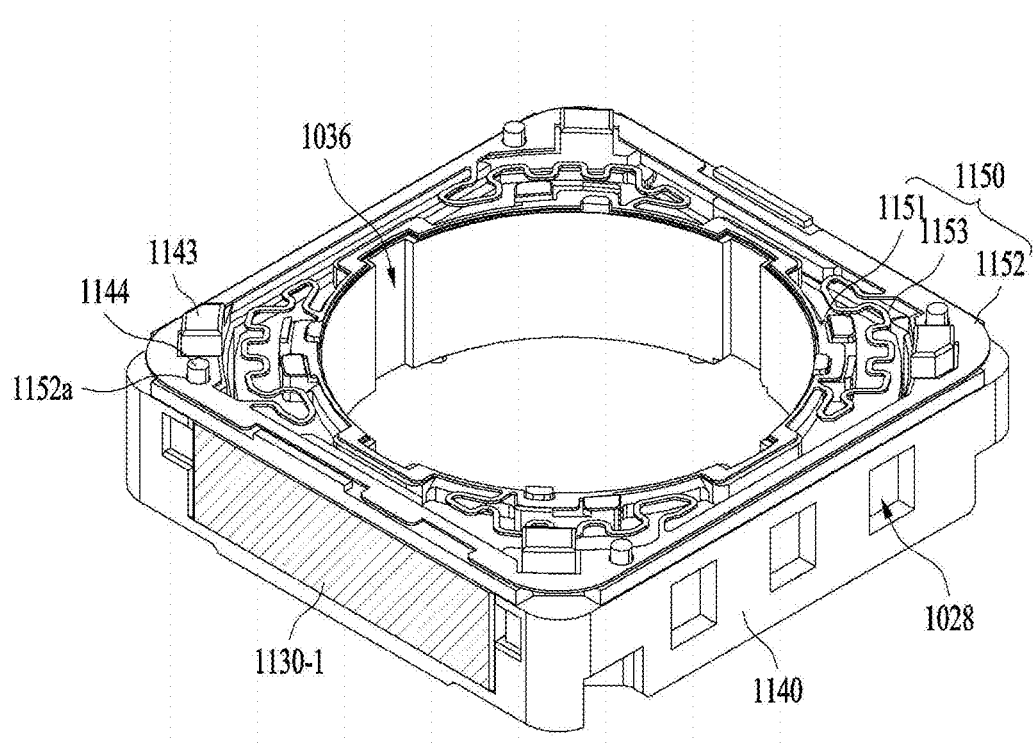
FIG. 26 is a perspective view of the housing, the magnet, and an upper elastic member.
Figure 27:
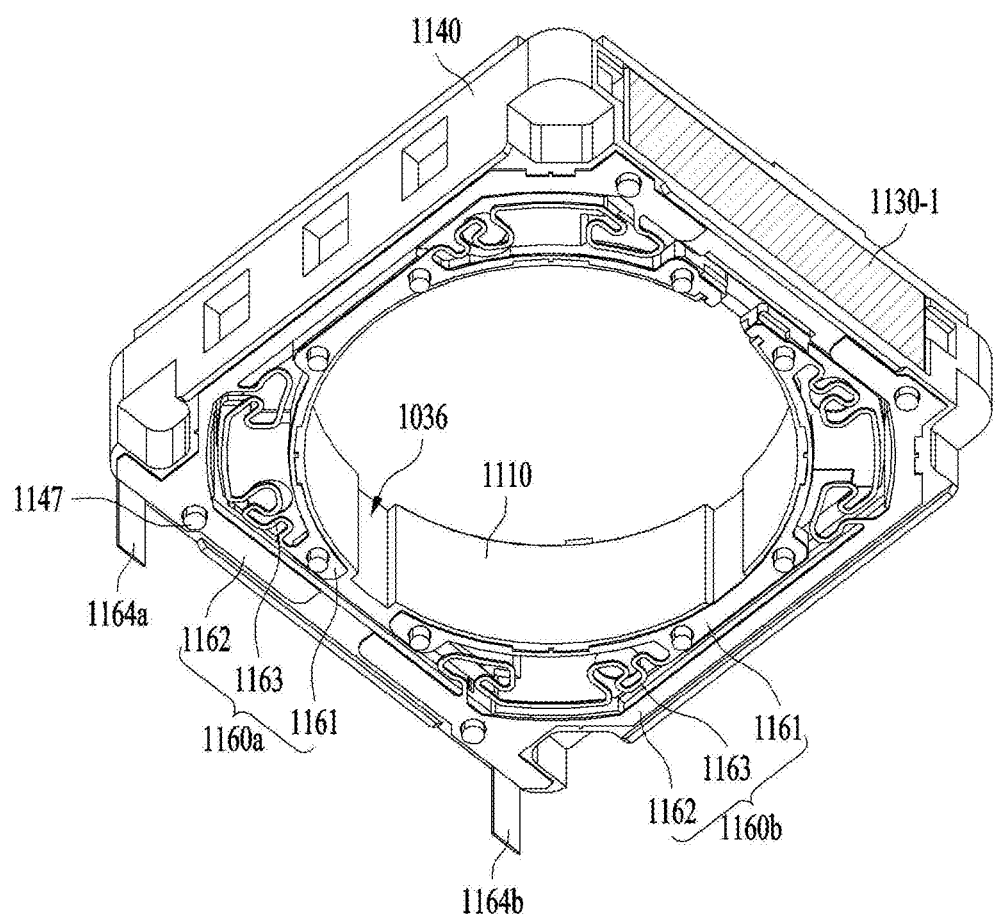
FIG. 27 is a perspective view of the housing, the magnet, and a lower elastic member.
Figure 28A:
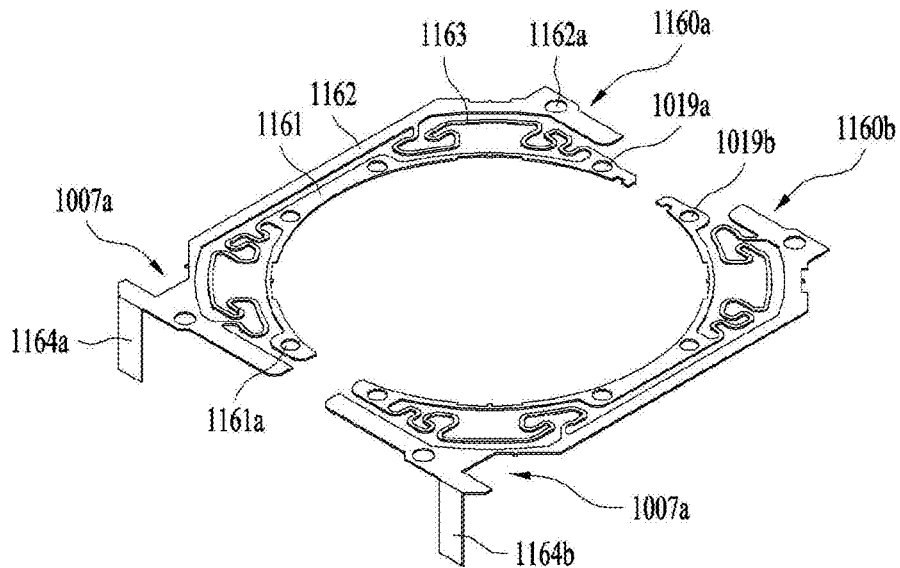
FIG. 28A is a first perspective view of a base and the lower elastic member.
Figure 28A:
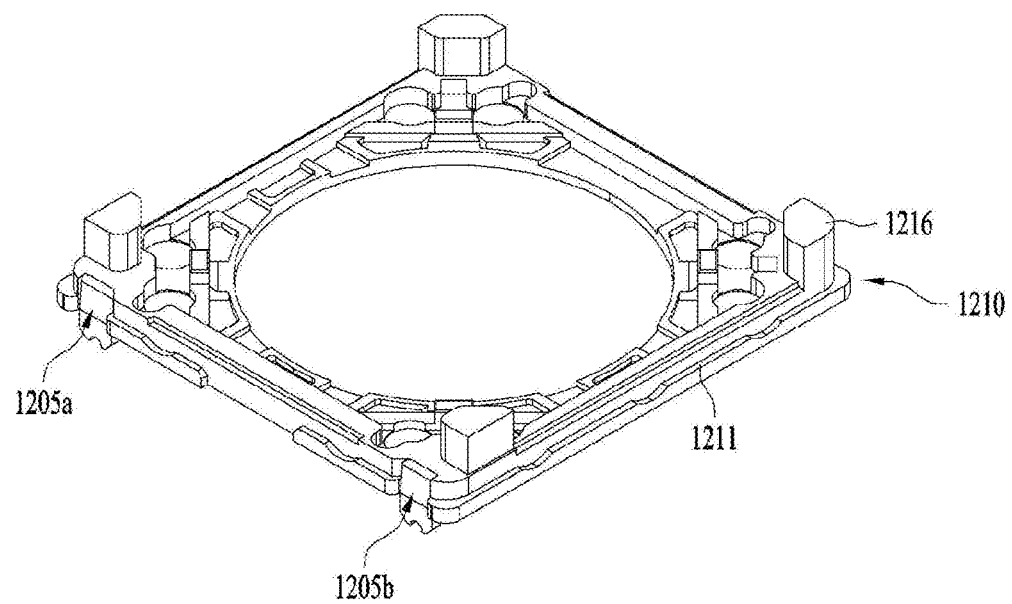
Figure 28B:
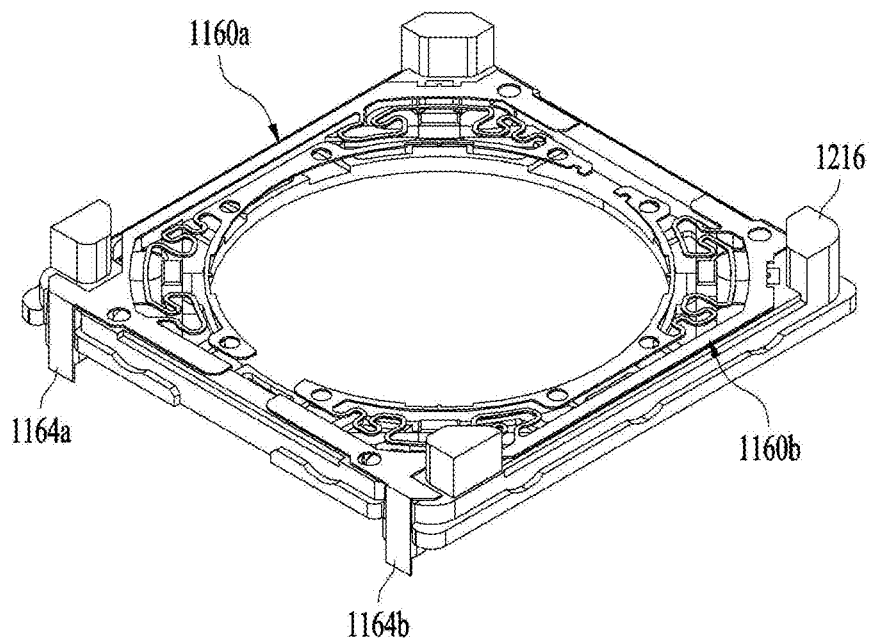
FIG. 28B is a second perspective view of the base and the lower elastic member.

FIG. 21 is a perspective view of a camera module 1200 according to another embodiment, FIG. 22 is a separated perspective view of the camera module 1200 of FIG. 21, FIG. 23 is a perspective view of the camera module 1200 of FIG. 21 with a cover member 1300 removed, FIG. 24A is a first perspective view of a bobbin 1110 shown in FIG. 23, FIG. 24B is a coupled perspective view of the bobbin 1110 and a coil 1120, FIG. 25A is a perspective view of a housing 1140 of FIG. 23, FIG. 25B is a coupled perspective view of the housing 1140 and a magnet 1130 of FIG. 23, FIG. 26 is a perspective view of the housing 1140, the magnet 1130, and an upper elastic member 1150, FIG. 27 is a perspective view of the housing 1140, the magnet 1130, and a lower elastic member 1160, FIG. 28A is a first perspective view of a base 1210 and the lower elastic member 1160, and FIG. 28B is a second perspective view of the base 1210 and the lower elastic member 1160.

Referring to FIGS. 21 to 28B, the camera module 1200 may include a lens unit 1400 and a lens moving apparatus 1100.

The lens unit 1400 may include at least one lens, and is mounted to the lens moving apparatus 1100.

The lens moving apparatus 100 includes a bobbin 1110, a coil 1120, a magnet 1130, a housing 1140, an upper elastic member 1150, a lower elastic member 1160, a cover member 1300, and a base 1210.

Next, the cover member 1300 will be described.

The cover member 1300 receives the other components 1110, 1120, 1130, 1140, 1150, 1160, and 1400 in a receiving space formed together with the base 1210.

The cover member 1300 may be formed in the shape of a box, the lower portion of which is open and which includes an upper plate and side plates. The lower ends of the side plates of the cover member 1300 may be coupled to the upper portion of the base 1210. The shape of the upper plate of the cover member 1300 may be polygonal, for example, quadrangular or octagonal.

The cover member 1300 may be provided in the upper plate thereof with an opening, through which the lens unit 1400 coupled to the bobbin 1110 is exposed to external light.

For example, the cover member 1300 may be made of a nonmagnetic material, such as SUS, aluminum (Al), copper (Cu), tin (Sn), or platinum. As the cover member 1300 made of the nonmagnetic material is used, the embodiment is capable of inhibiting a phenomenon in which the magnet 1130 attracts the cover member 1300. In another embodiment, the cover member 1300 may be made of a magnetic material or a plastic material.

Next, the bobbin 110 will be described.

Referring to FIGS. 24A and 24B, the bobbin 1110 may be disposed in the housing 1140, and may be moved in the first direction (e.g. the Z-axis direction) due to electromagnetic interaction between the coil 1120 and the magnet 1130.

The bobbin 1110 may have an opening in which the lens unit 1400 is mounted. The shape of the opening of the bobbin 1110 may coincide with the shape of the lens unit 1400 mounted in the bobbin. For example, the shape of the opening may be circular, oval, or polygonal. However, the disclosure is not limited thereto.

The bobbin 1110 may be provided in an inner surface 1110a thereof with at least one first recess 1036a to 1036d, into which at least one protrusion 1081a to 1081d of the lens unit 1400 is coupled.

The bobbin 1110 may include at least one first upper protrusion 1113, disposed at the upper surface thereof and coupled and fixed to an inner frame 1151 of the upper elastic member 1150, and at least one first lower protrusion 1117, disposed at the lower surface thereof and coupled and fixed to an inner frame 1161 of the lower elastic member 1160.

The bobbin 1110 may include a stopper 1114 protruding upwards from the upper surface thereof.

The bobbin 1110 may have an upper escape recess 1112a, which is provided in a region of the upper surface thereof that corresponds to or is aligned with a first frame connection portion 1153 of the upper elastic member 1150.

In addition, the bobbin 1110 may have a lower escape recess 1112b, which is provided in a region of the lower surface thereof that corresponds to or is aligned with a second frame connection portion 1163 of the lower elastic member 1160.

When the bobbin 110 is moved in the first direction, spatial interference between the first frame connection portion 1153 and the bobbin 1110 and between the second frame connection portion 1163 and the bobbin 110 may be avoided by the upper escape recess 1112a and the lower escape recess 1112b of the bobbin 1110, whereby the first frame connection portion 1153 of the upper elastic member 1150 and the second frame connection portion 1163 of the lower elastic member 1160 may be easily elastically deformed.

The bobbin 1110 may be provided in the outer surface 1110b thereof with at least one settlement recess 1105, and the coil 1120 may be disposed or settled in the settlement recess 1105 of the bobbin 1110. For example, as shown in FIG. 24A, the settlement recess 1105 may have the shape of a ring rotated about the optical axis OA; however, the disclosure is not limited thereto.

The shape and number of settlement recesses 1105 may correspond to the shape and number of coils disposed around the outer surface 1110b of the bobbin 1110. In another embodiment, the bobbin 1110 may have no recess for coil settlement.

The outer surface 1110b of the bobbin 1110 may include a first edge 1110b-1 corresponding to a first edge 11141 of the housing 1140 and a second edge 1110b-2 corresponding to a second edge 11142 of the housing 140.

A rim 1037 protruding upwards from the upper escape recess 1112a may be provided around each of the first recesses 1036a to 1036d of the bobbin 1110. The rim 1037 is provided to supplement durability of the first edge 1110b-1 of the bobbin 1110 due to formation of the first recesses 1036a to 1036d.

In another embodiment, the description of the first recesses 1036a to 1036d and the rim 1037 of the bobbin 1110 may be equally applied to the bobbin 110 shown in FIG. 1.

Next, the coil 1120 will be described.

The coil 1120 is disposed around the outer surface 1110b of the bobbin 1110, and electromagnetically interacts with the magnet 1130, which is disposed at the housing 1140.

In order to generate electromagnetic force due to electromagnetic interaction with the magnet 1130, a driving signal may be applied to the coil 1120. At this time, the driving signal may be a direct-current signal, or may have a voltage or current form.

An AF operation unit, which is elastically supported by the upper elastic member 1150 and the lower elastic member 1160, may be moved in the first direction by electromagnetic force due to electromagnetic interaction between the coil 1120 and the magnet 1130. The electromagnetic force may be adjusted to control movement of the bobbin 1110 in the first direction, whereby an autofocus function may be performed.

The AF operation unit may include the bobbin 1110, which is elastically supported by the upper elastic member 1150 and the lower elastic member 1160, and components mounted to the bobbin 110 so as to be movable together with the bobbin 1110. For example, the AF operation unit may include the bobbin 1110, the coil 1120, and the lens unit 1400.

Referring to FIG. 24B, the coil 1120 may be wound so as to wrap the outer surface 1110b of the bobbin 1110 in order to be rotated about the optical axis OA in the clockwise direction or in the counterclockwise direction.

For example, the coil 1120 may be disposed or wound in the settlement recess 1105 provided in the outer surface 1110b of the bobbin 1110.

For example, the coil 1120 may have the shape of a ring that wraps the outer surface 1110b of the bobbin 1110 about the optical axis OA in the clockwise direction or in the counterclockwise direction. In FIG. 23, the coil 1120 may have the shape of a single ring; however, the disclosure is not limited thereto. Two or more coil rings may be included.

In another embodiment, the coil 1120 may be realized as a coil ring wound about an axis perpendicular to the optical axis OA in the clockwise direction or in the counterclockwise direction. The number of coil rings may be equal to the number of magnets 1130; however, the disclosure is not limited thereto.

The coil 1120 may be connected to at least one of the upper elastic member 1150 or the lower elastic member 1160. For example, the coil 1120 may be connected to lower springs 1160a and 1160b, and a driving signal may be applied to the coil 1120 through the lower springs 1160a and 1160b.

Next, the housing 1140 will be described.

Referring to FIGS. 25A and 25B, the housing 1140 supports the magnet 1130, and receives the bobbin 1110 therein such that the AF operation unit is movable in the first direction.

The housing 1140 may generally have a pillar shape including an opening, and may include a plurality of edges 1141 and 1142 that define the opening.

For example, the housing 1140 may have a plurality of edges 1141 and 1142 that define a polygonal (e.g. quadrangular or octagonal) or circular opening. The upper surfaces of the edges 1141 and 1142 may define the upper surface of the housing 1140.

For example, the housing 1140 may include first edges 1141 spaced apart from each other and second edges 1142 spaced apart from each other. Each of the second edges 1142 may be disposed between two adjacent first edges.

For example, the length of each of the first edges 1141 of the housing 1140 may be longer than the length of each of the second edges 1142. For example, the first edges 1141 of the housing 1140 may be portions corresponding to the sides of the housing 1140, and the second edges 1142 of the housing 1140 may be portions corresponding to the corners of the housing 1140. The second edges 1142 of the housing 1140 may be referred to as "corners."

The magnet 1130 may be disposed or installed at each of the first edges 1141 of the housing 1140. For example, a recess 1141a, in which the magnet 1130 is settled, disposed, or fixed, may be provided in each of the first edges 1141 of the housing 1140. In FIG. 25A, the recesses 1141a are through holes formed through the first edges 1141 of the housing 1140; however, the disclosure is not limited thereto. The recesses may be concave recesses.

The housing 1140 may have adhesive injection recesses 1016, which are provided in the first edges 1141, in which magnets 1130-1 and 1130-2 are disposed, and which are located adjacent to the recesses 1141a. Adhesive for adhering the magnets 1130-1 and 1130-2 to the recesses 1141a may be injected through the adhesive injection recesses 1016.

In addition, the housing 1140 may have stoppers 1024a and 1024b disposed adjacent to the recesses 1141a in order to support the first magnet 1130-1 and the second magnet 1130-2 inserted into the recesses 1141a. The stoppers 1024a and 1024b may protrude from the inner surface of the first edge 1141 of the housing 1140 in which the recesses 1141a are provided.

In addition, a stair portion 1029 forming a stair with the upper surface of the housing 1140 in the optical-axis direction may be provided at each of the corners 1142 of the housing 1140. The stair portion 1029 is a portion that corresponds to an injection gate for injection molding of the housing, and is provided in order to avoid spatial interference with burrs generated as the result of injection molding.

The housing 1140 may have a first stopper 1143, which protrudes from the upper portion or the upper surface thereof.

The first stopper 1143 of the housing 1140 inhibits collision between the cover member 1130 and the housing 1140. When external impact occurs, it is possible to inhibit the upper surface of the housing 1140 from directly colliding with the inner surface of the upper plate of the cover member 1300.

In addition, a second upper protrusion 1144, to which an outer frame 1152 of the upper elastic member 1150 is coupled, may be provided on the upper portion or the upper surface of the housing 1140. For example, the second upper protrusion 1144 may be disposed on the upper surface of each of the second edges 1142 of the housing 1140; however, the disclosure is not limited thereto. In another embodiment, the second upper protrusion may be disposed on the upper surface of each of the first edges 1141 of the housing 1140.

The housing 1140 may be provided on the lower portion or the lower surface thereof with a second lower protrusion 1147, to which an outer frame 1162 of the lower elastic member 1160 is coupled. For example, the second lower protrusion 1147 may be disposed on the lower portion or the lower surface of at least one of the first edges 1141 or the second edges 1142 of the housing 1140.

In addition, a guide recess 1148, into which a guide member 1216 of the base 1210 is inserted, fastened, or coupled, may be provided in the lower portion or the lower surface of each of the second edges 1142 of the housing 1140. The guide recess 1148 of the housing 1140 and the guide member 1216 of the base 1210 may be coupled to each other via an adhesive member (not shown), and the housing 1140 may be coupled to the base 1210.

Next, the magnet 1130 will be described.

Referring to FIG. 25B, the magnet 1130 may be disposed at each of the first edges 1141 of the housing 1140. For example, the magnet 1130 may be disposed in the recess 1141a provided in each of two facing first edges of the housing 1140.

For example, the magnet 1130 may include a first magnet 1130-1 disposed at one of the two facing first edges of the housing 1140 and a second magnet 1130-2 disposed at the other of the two facing first edges of the housing 1140. In another embodiment, magnets may be disposed at the second edges of the housing 1140.

At an initial position of the AF operation unit, e.g. the bobbin 1110, the magnet 1130 disposed at the housing 1140 may overlap at least a portion of the coil 1120 in a direction perpendicular to the optical axis. Here, the initial position of the AF operation unit, e.g. the bobbin 1110, may be the original position of the AF operation unit in the state in which no electric power is applied to the coil 1120 or the position at which the AF operation unit is located as the result of the upper and lower elastic members 1150 and 1160 being elastically deformed due only to the weight of the AF operation unit.

In addition, the initial position of the AF operation unit may be the position at which the AF operation unit is located when gravity acts in the direction from the bobbin 1110 to the base 1210 or when gravity acts in the direction from the base 1210 to the bobbin 1110.

For example, the magnet 1130 may be disposed in the recess 1141a of each of the first edges 1141 of the housing 1140 so as to overlap the coil 1120 in the second direction or the third direction.

In another embodiment, no recess 1141a or hole may be formed in each of the first edges 1141 of the housing 1140, or the magnet 1130 may be disposed in one of the outer surface and the inner surface of each of the first edges 1141 of the housing 1140.

Disposition of the magnet 1130 at each of the first edges of the housing 1140 will be described below.

The magnet 1130 may have a shape corresponding to each of the first edges 1141 of the housing 1140, for example, a rectangular parallelepiped shape; however, the disclosure is not limited thereto.

The magnet 1130 may be a monopolar magnetized magnet disposed such that a first surface thereof facing the coil 1120 has an S pole and a second surface opposite the first surface has an N pole.

In addition, for example, the magnet 1130 may be a bipolar magnetized magnet divided into two parts in a direction perpendicular to the optical axis. At this time, the magnet 1130 may be realized by a ferrite, alnico, or rare-earth magnet.

The magnet 1130 having a bipolar magnetized structure may include a first magnet portion including an N pole and an S pole, a second magnet portion including an N pole and an S pole, and a nonmagnetic partition. The first magnet portion and the second magnet portion may be spaced apart from each other, and the nonmagnetic partition may be located between the first magnet portion and the second magnet portion. The nonmagnetic partition may be a portion having substantially no magnetism, may include a section having little polarity, and may be filled with air or may be made of a nonmagnetic material.

The number of magnets 1130 may be plural. For example, the magnet 1130 may include a first magnet 1130-1 and a second magnet 1130-2.

In an embodiment, the number of magnets 1130 is two; however, the disclosure is not limited thereto. In another embodiment, the number of magnets 130 may be at least two. The surface of each of the magnets 1130 that face the coil 1120 may be planar; however, the disclosure is not limited thereto. The surface of each magnet may be curved.

Next, the upper elastic member 1150 and the lower elastic member 1160 will be described.

Referring to FIGS. 26 and 27, the upper elastic member 1150 and the lower elastic member 1160 are coupled to the bobbin 1110 and to the housing 1140, and flexibly support the bobbin 1110.

For example, the upper elastic member 1150 may be coupled to the upper portion, the upper surface, or the upper end of the bobbin 1110 and to the upper portion, the upper surface, or the upper end of the housing 1140.

The lower elastic member 1160 may be coupled to the lower portion, the lower surface, or the lower end of the bobbin 1110 and to the lower portion, the lower surface, or the lower end of the housing 1140.

The upper elastic member 1150 shown in FIG. 26 is constituted by an upper spring having a single structure; however, the disclosure is not limited thereto. In another embodiment, the upper elastic member may include a plurality of upper springs that are spaced apart or separated from each other.

Each of the upper elastic member 1150 and the lower elastic member 1160 may be realized as a leaf spring; however, the disclosure is not limited thereto. Each of the upper elastic member and the lower elastic member may be realized as a coil spring or a suspension wire.

The upper elastic member 1150 may include a first inner frame 1151 coupled to the first upper protrusion 1113 of the bobbin 1110, a first outer frame 1152 coupled to the second upper protrusion 1144 of the housing 1140, and a first frame connection portion 1153 connecting the first inner frame 1151 and the first outer frame 1152 to each other.

In FIG. 26, the upper elastic member 1150 is realized as a single upper spring; however, the disclosure is not limited thereto. In another embodiment, the upper elastic member may include two or more upper springs.

For example, a through hole 1151a or recess, which is coupled to the first upper protrusion 1113 of the bobbin 1110, may be provided in the first inner frame 1151 of the upper elastic member 1150, and a through hole 1152a or recess, which is coupled to the upper protrusion 1144 of the housing 1140, may be provided in the first outer frame 1152 thereof.

The lower elastic member 1160 may include first and second lower springs 1160a and 1160b that are spaced apart from each other. The first and second lower springs 1160a and 1160b may be spaced apart from each other, and may be separated from each other.

Each of the first and second lower springs 1160a and 1160b may include a second inner frame 1161 coupled to the first lower protrusion 1117 of the bobbin 1110, a second outer frame 1162 coupled to the second lower protrusion 1147 of the housing 1140, and a second frame connection portion 1163 connecting the second inner frame 1161 and the second outer frame 1162 to each other.

For example, a through hole 1161a or recess, which is coupled to the first lower protrusion 1117 of the bobbin 1110, may be provided in the second inner frame 1161 of each of the first and second lower springs 1160a and 1160b, and a through hole 1162a or recess, which is coupled to the second lower protrusion 1147 of the housing 1140, may be provided in the second outer frame 1162 thereof.

The first upper protrusion 1113 of the bobbin 1110 and the through hole 1151a of the first inner frame, the first lower protrusion 1117 of the bobbin 1110 and the through hole 1161a of the second inner frame, the second upper protrusion 1144 of the housing 1140 and the through hole 1161a of the first outer frame, the second lower protrusion 1147 of the housing 1140 and the through hole 1162a of the second outer frame, and the protrusions 1015a and 1015b of the housing 1140 and the through holes 1025a and 1025b of the first outer frame may be adhered to each other by an adhesive member or through thermal fusion.

Each of the first and second frame connection portions 1153 and 1163 may be formed so as to be bent or curved (or crooked) at least once in order to form a predetermined pattern. The upward and/or downward movement of the bobbin 1110 in the first direction may be flexibly (or elastically) supported through positional change and minute deformation of the first and second frame connection portions 1153 and 1163.

The coil 1120 may be coupled to the second inner frames 1161 of the first and second lower springs 1160a and 1160b, and may be connected to the first and second lower springs 1160a and 1160b.

Referring to FIG. 28A, a first bonding portion 1019a, to which one end of the coil 1120 is bonded, may be provided at the upper surface of one end of the second inner frame 1161 of the first lower spring 1160a, and a second bonding portion 1019b, to which the other end of the coil 1120 is bonded, may be provided at the upper surface of one end of the second inner frame 1161 of the second lower spring 1160b.

A recess for guiding the coil 1120 may be formed in each of the first bonding portion 1019a and the second bonding portion 1019b.

The coil 1120 may be bonded to the first and second bonding portions 1019a and 1019b by a conductive adhesive member, such as solder. In the case of the first and second bonding portions 1019a and 1019b, the "bonding portions" may also be referred to as pad portions, connection terminals, solder portions, or electrode portions.

In order to avoid spatial interference between the base 1210 and the guide member 1216, recesses 1007a and 1007b may be provided in the second outer frame 1162 of each of the first and second lower springs 1160a and 1160b.

In order to inhibit an oscillation phenomenon when the bobbin 1110 is moved, a damper may be disposed between the first frame connection portion 1153 of the upper elastic member 1150 and the upper surface of the bobbin 1110 (e.g. the upper escape recess 1112*a*. Alternatively, a damper (not shown) may also be disposed between the second frame connection portion 1163 of the lower elastic member 1160 and the lower surface of the bobbin 1110, e.g. the lower escape recess 1112*b*.

Alternatively, a damper may be coated on a portion between the upper elastic member 1150 and each of the bobbin 1110 and/or the housing 1140 or on a portion between the lower elastic member 1160 and each of the bobbin 1110 and/or the housing 1140. For example, the damper may be gel-type silicone; however, the disclosure is not limited thereto.

Each of the first and second lower springs 1160*a* and 1160*b* may be disposed at the upper surface of the base 1210.

Each of the first and second lower springs 1160*a* and 1160*b* may include first and second connection terminals 1164*a* and 1164*b* for connection with the outside. In the case of the first and second connection terminals 1164*a* and 1164*b*, the "connection terminals" may also be referred to as pad portions, bonding portions, solder portions, or electrode portions.

For example, each of the first and second connection terminals 1164*a* and 1164*b* may be connected to the outer surface of the second outer frame 1162 of a corresponding one of the first and second lower springs 1160*a* and 1160*b*, and may be bent and extend toward the base 1210.

The first and second connection terminals 1164*a* and 1164*b* of the first and second lower springs 1160*a* and 1160*b* may be disposed at a first outer surface of the base 1210 so as to be spaced apart from each other, and may abut the first outer surface of the base 1210.

For example, the first and second connection terminals 1164*a* and 1164*b* may be disposed at one of the outer surfaces of the base 1210. In this case, soldering for connection with the outside is easily performed. However, the disclosure is not limited thereto. In another embodiment, the first and second connection terminals of the first and second lower springs may be disposed at two different outer surfaces of the base 1210.

The base 1210 may be disposed under the housing 1140, and may be coupled to the housing 1140.

For example, the base 1210 may be disposed under the lower elastic member, and may define a space for receiving the bobbin 1110 and the housing 1140 together with the cover member 1300. The base 1210 may have an opening corresponding to the opening of the bobbin 1110 and/or the opening of the housing 1140. The base may have a shape coinciding with or corresponding to the shape of the cover member 1300, for example, a quadrangular shape.

The base 1210 may include a guide member 1216 protruding upwards from each of the four corners thereof by a predetermined height.

For example, the guide member 1216 may have a polygonal prismatic shape protruding from the upper surface of the base 1210 so as to be perpendicular to the upper surface of the base 1210; however, the disclosure is not limited thereto.

The guide member 1216 may be inserted into the guide recess 1148 of the housing 1140, and may be fastened or coupled to the guide recess 1148 by an adhesive member (not shown), such as a UV bonding agent.

First and second concave portions 1205*a* and 1205*b*, which correspond to the first and second connection terminals 1164*a* and 1164*b* of the first and second lower springs 1160*a* and 1160*b*, may be provided in the outer surface of the base 1210.

For example, the first and second concave portions 1205*a* and 1205*b* may be disposed at the outer surface of one of the edges of the base 1210 so as to be spaced apart from each other.

For example, each of the first and second concave portions 1205*a* and 1205*b* may include an upper opening that is open to the upper surface of the base 1210 and a lower opening that is open to the lower surface of the base 1210.

For example, the inner surface of each of the first and second connection terminals 1164*a* and 1164*b* may abut one surface (e.g. the bottom surface) of a corresponding one of the first and second concave portions 1205*a* and 1205*b*.

The outer surface of each of the first and second connection terminals 1164*a* and 1164*b*, which are disposed in the first and second concave portions 1205*a* and 1205*b*, may be exposed from the outer surface of the base 1210.

In addition, the lower end of each of the first and second connection terminals 1164*a* and 1164*b* may be exposed from the lower surface of the base 1210; however, the disclosure is not limited thereto. In another embodiment, the lower end of each of the first and second connection terminals may not be exposed from the lower surface of the base 1210.

Each of the first and second connection terminals 1164*a* and 1164*b* may be connected to external wires or external elements by a conductive material, such as solder, in order to supply electric power or a signal from the outside.

In addition, stairs 1211 may be provided at the lower end of the outer surface of the base 1210, and the stairs 1211 may contact the lower ends of the side plates of the cover member 1300 and may guide the cover member 1300. At this time, the stairs 1211 of the base 1210 and the lower ends of the side plates of the cover member 1300 may be adhered, fixed, and sealed by an adhesive.

Each of the first and second connection terminals 1164*a* and 1164*b* of the first and second lower springs 1160*a* and 1160*b* shown in FIGS. 28A and 28B is integrally formed with the second inner frame 1161, the second outer frame 1162, and the second frame connection portion 1163; however, the disclosure is not limited thereto.

In another embodiment, each of the first and second lower springs may include only the second inner frame 1161, the second outer frame 1162, and the second frame connection portion 1163, and each of the first and second connection terminals may be separately disposed at the outer surface of the base 1210.

In this case, one end of each of the first and second connection terminals disposed at the outer surface of the base 1210 may be coupled or bonded to the second outer frame of a corresponding one of the first and second lower springs by a conductive material, such as solder.

Figure 29A:
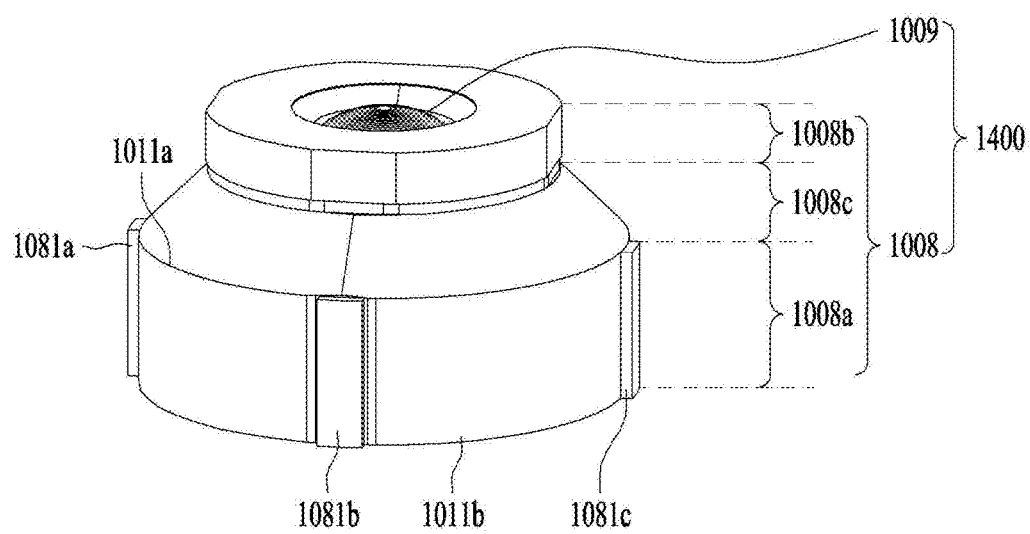
FIG. 29A is a perspective view of a lens unit shown in FIG. 21.
Figure 29B:
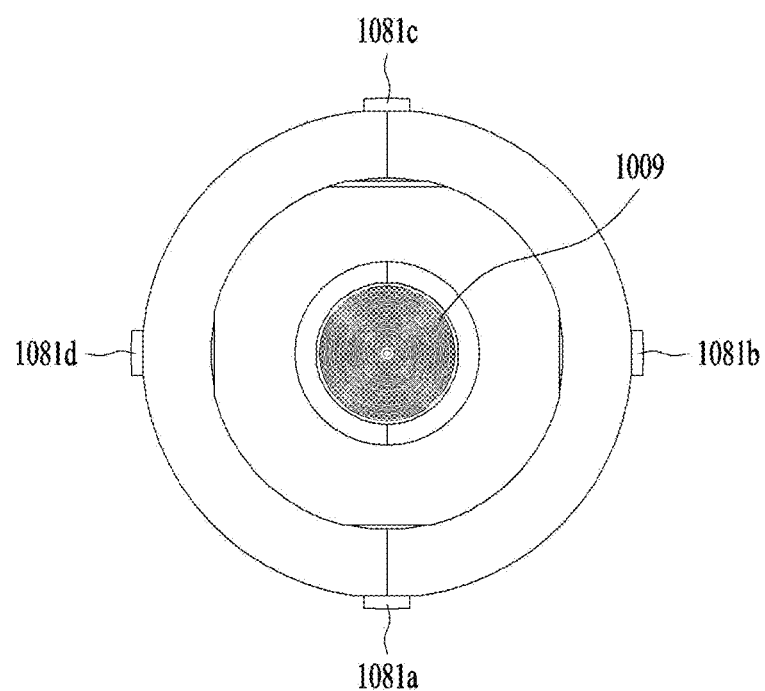
FIG. 29B is a plan view of the lens unit of FIG. 29A.

FIG. 29A is a perspective view of the lens unit 1400 shown in FIG. 21, and FIG. 29B is a plan view of the lens unit 1400 of FIG. 29A.

Referring to FIGS. 29A and 29B, the lens unit 1400 may include a lens barrel 1008 and at least one lens 1009 or a lens array mounted in the lens barrel 1008. In addition, lens unit 1400 may include a protrusion 1081*a* to 1081*d* disposed at the outer surface of the lens barrel 1008.

The lens barrel 1008 may include an upper portion 1008*b*, a lower portion 1008*a* having a larger diameter than the upper portion 1008*b*, and a middle portion 1008*c* interconnecting the lower portion 1008*a* and the upper portion 1008*b*.

Here, the upper portion 1008b may be referred to as a "first portion," the lower portion 1008a may be referred to as a "second portion," and the middle portion 1008c may be referred to as a "third portion."

The lower portion 1008a is a portion coupled to the bobbin 1110, and may have a cylindrical or polyhedral structure. The section of the lower portion in a direction perpendicular to the optical axis may be circular, oval, or polygonal. In addition, the lower portion 1008a may include a first opening, through which the at least one lens 1009 or a portion of the lens array is exposed.

The diameter of the lower portion 1008a may be smaller than the diameter of the opening of the bobbin 1110.

The upper portion 1008b is located at the upper side of the lower portion 1008a, and may have a cylindrical or polyhedral structure. The section of the upper portion in a direction perpendicular to the direction from the lower portion 1008a to the upper portion 1008b may be circular, oval, or polygonal. In addition, the upper portion 1008b may include a second opening, through which the at least one lens 1009 or another portion of the lens array is exposed. The diameter of the upper portion 1008b may be smaller than the diameter of the lower portion 1008a.

The middle portion 1008c is located between the lower portion 1008a and the upper portion 1008b, and the outer surface of the middle portion 1008c may be an inclined surface that is inclined relative to the upper surface of the upper portion 1008b or the lower surface of the lower portion 1008a.

The diameter of the middle portion 1008c may gradually decrease in the direction from the lower portion 1008a to the upper portion 1008b, and the diameter of the middle portion 1008c may be larger than or equal to the diameter of the upper portion 1008b and may be smaller than or equal to the diameter of the lower portion 1008a. At this time, each of the diameter of the lower portion 1008a, the diameter of the upper portion 1008b, and the diameter of the middle portion 1008c may be the length of each of the portions 1008a, 1008b, and 1008c in a direction perpendicular to the direction from the lower portion 1008a to the upper portion 1008b.

At least one of the length of the lower portion 1008a, the length of the upper portion 1008b, or the length of the middle portion 1008c in the direction from the lower portion 1008a to the upper portion 1008b may be different from each other.

For example, the length of the lower portion 1008a may be longer than the length of the middle portion 1008c, and the length of the middle portion 1008c may be longer than the length of the upper portion 1008b.

The lens barrel 1008 may include at least one protrusion protruding from the outer surface of the lower portion 1008a in a direction perpendicular to the optical axis.

For example, the lens barrel 1008 may include a plurality of protrusions 1081a to 1081d protruding from the outer surface of the lower portion 1008a.

The protrusions 1081a to 1081d may be disposed at the same interval or at the same angle. Here, the angle may be an interior angle between planes, and each of the planes may be an imaginary plane passing through the central axis of the lens barrel 1008 and the center of each of the protrusions 1081a to 1081d.

For example, the lens barrel 1008 may include four protrusions 1081a to 1081d disposed at the outer surface thereof at an angle of 90 degrees; however, the number of protrusions is not limited thereto.

The outer surface of each of the protrusions 1081a to 1081d may have a quadrangular shape, e.g. a rectangular shape. However, the disclosure is not limited thereto. The outer surface of each of the protrusions may have a shape coinciding with the shape of a corresponding one of the first recesses 1036a to 1036d provided in the inner surface of the bobbin 1110.

At least one protrusion may be disposed between a first boundary line 1011a and a second boundary line 1011b. For example, the first boundary line 1011a may be a boundary line at which the outer surface of the lower portion 1008a and the outer surface of the middle portion 1008c join each other, and the second boundary line 1011b may be a boundary line at which the outer surface of the lower portion 1008a and the lower surface of the lower portion 1008a join each other.

Each of the protrusions 1081a to 1081d may extend from the upper end of the lower portion 1008a to the lower end of the lower portion 1008a.

The protrusions 1081a to 1081d may extend in the direction from the inner surface to the outer surface of the lens barrel 1008, and may extend in the direction from the first boundary line 1011a to the second boundary line 1011b.

For example, each of the protrusions 1081a to 1081d may extend from the first boundary line 1011a to the second boundary line 1011b.

For example, the protrusions 1081a to 1081d may directly contact the first boundary line 1011a and the second boundary line 1011b. This serves to increase the area of coupling between the protrusions 1081a to 1081d and the first recesses 1036a to 1036d of the bobbin 1110, whereby it is possible to improve the effect of inhibiting separation of the lens unit 1400 due to impact.

In another embodiment, each of the protrusions 1081a to 1081d may be located spaced apart from at least one of the first boundary line 1011a or the second boundary line 1011b.

As shown in FIG. 29A, the diameter of the middle portion 1008c of the lens barrel 1008 gradually decreases in order to easily inject an adhesive member into a gap between the lower portion 1008a and the inner surface of the bobbin 1110 using an adhesive application apparatus (e.g. an adhesive injection needle).

Figure 30A:
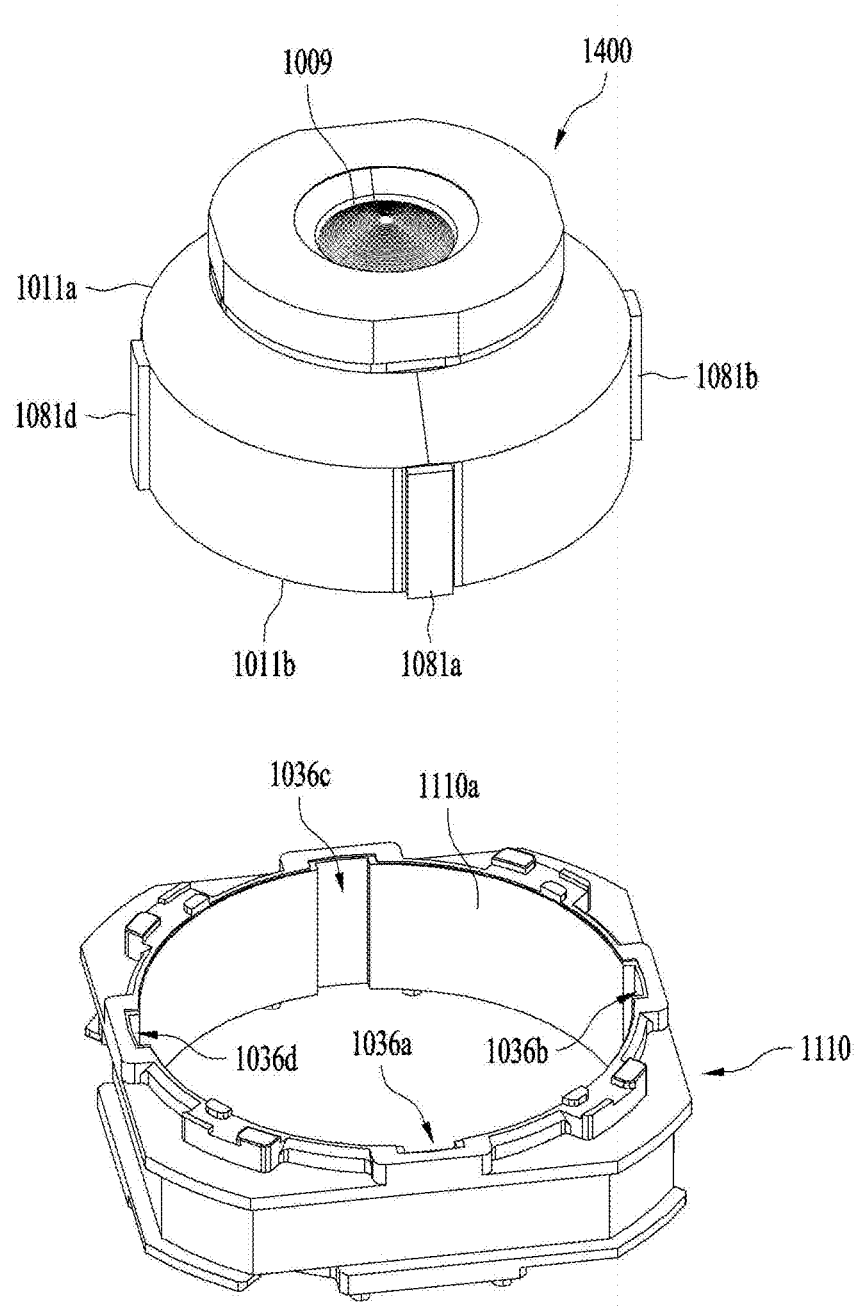
FIG. 30A is a perspective view of an embodiment of a lens unit and a bobbin.
Figure 31:
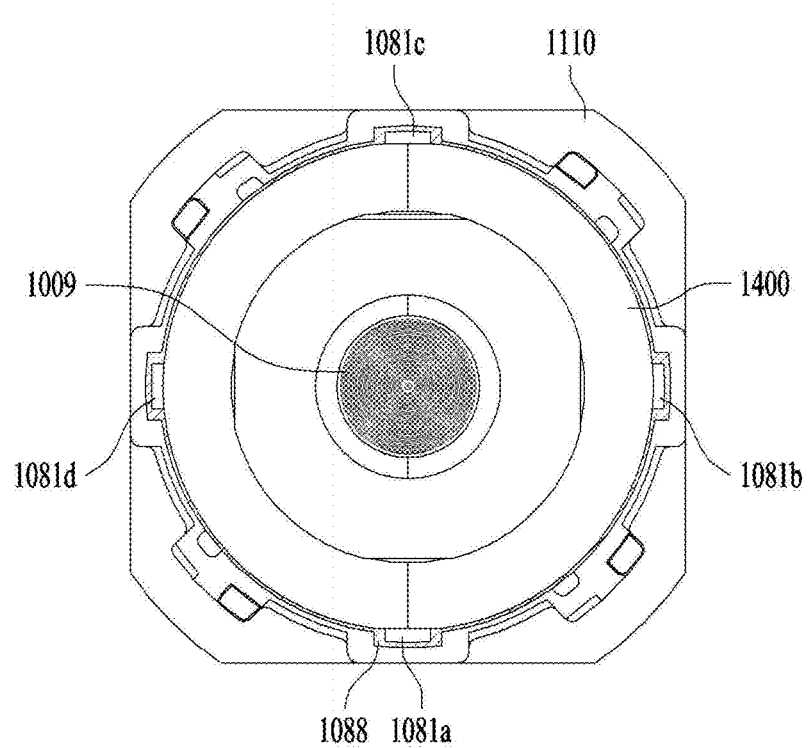
FIG. 31 is a coupled plan view of the lens unit and the bobbin of FIG. 30A.
Figure 32:
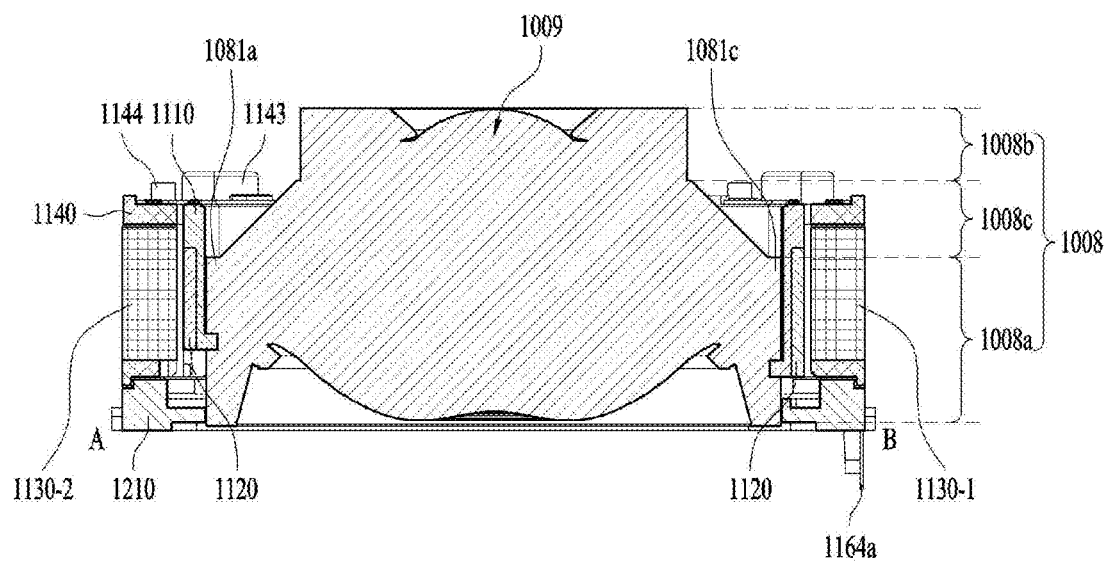
FIG. 32 is a sectional view of a camera module including the lens unit and the bobbin shown in FIG. 31 when viewed in an AB direction of FIG. 23.

FIG. 30A is a perspective view of an embodiment of the lens unit 1400 and the bobbin 1110, FIG. 31 is a coupled plan view of the lens unit 1400 and the bobbin 1110 of FIG. 30A, and FIG. 32 is a sectional view of a camera module including the lens unit 1400 and the bobbin 1110 shown in FIG. 31 when viewed in an AB direction of FIG. 23.

Referring to FIGS. 30A, 31, and 32, the bobbin 1110 may be provided in an inner surface 1110a thereof with a plurality of first recesses 1036a to 1036d corresponding to the protrusions 1081a to 1081d of the lens unit 1400 is coupled.

Each of the first recesses 1036a to 1036d may extend in the direction from the upper surface of the bobbin 1110 to the lower surface of the bobbin 1110.

Each of the first recesses 1036a to 1036d may include a first opening that is open to the upper surface of the bobbin 1110 and a second opening that is open to the lower surface of the bobbin 1110.

When the lens unit 1400 is mounted to the bobbin 1110, spatial interference between the protrusions 1081a to 1081d of the lens unit 1400 and the inner surface 1110a of the bobbin 1110 may be avoided by the first opening or the second opening.

The first recesses 1036a to 1036d may be disposed in the inner surface of the bobbin 1110 at the same interval or at the same angle. Here, the angle may be an interior angle between planes, and each of the planes may be an imaginary plane passing through the central axis of the bobbin 1110 and the center of each of the first recesses.

For example, the bobbin 1110 may include four first recesses 1036a to 1036d disposed in the inner surface 1110a thereof at an angle of 90 degrees; however, the number of first recesses is not limited thereto.

Each of the first recesses 1036a to 1036d may have a quadrangular shape, e.g. a rectangular shape. However, the disclosure is not limited thereto.

For example, each of the first recesses 1036a to 1036d may extend from the lower end of the inner surface 1110a of the bobbin 1110 to the upper end of the inner surface 1110a of the bobbin 1110.

Alternatively, for example, each of the first recesses 1036a to 1036d may extend in the direction from the upper surface of the bobbin 1110 to the lower surface of the bobbin 1110.

For example, each of the first recesses 1036a to 1036d may extend from a third boundary line at which the inner surface of the bobbin 1110 and the upper surface of bobbin 1110 join each other to a fourth boundary line at which the inner surface of the bobbin 1110 and the lower surface of bobbin 1110 join each other.

For example, the first recesses 1036a to 1036d may directly contact the third boundary line and the fourth boundary line. This serves to increase the area of coupling between the protrusions 1081a to 1081d of the lens unit 1400 and the first recesses 1036a to 1036d of the bobbin 1110, whereby it is possible to improve the effect of inhibiting separation of the lens unit 1400 due to impact.

In another embodiment, each of the first recesses 1036a to 1036d may be located spaced apart from at least one of the third boundary line or the fourth boundary line.

The first recesses 1036a to 1036d and the settlement recess 1105 of the bobbin 1110 for coil settlement may overlap each other in a direction perpendicular to the optical axis. However, the disclosure is not limited thereto.

The first recesses 1036a to 1036d and the settlement recess 1105 may not communicate with each other, and a portion of the bobbin 1110 may be located between the first recesses 1036a to 1036d and the settlement recess 1105. However, the disclosure is not limited thereto. In another embodiment, the first recesses 1036a to 1036d and the settlement recess 1105 may communicate with each other or may be open to each other.

Each of the protrusions 1081a to 1081d of the lens unit 1400 may be inserted into or disposed in a corresponding one of the first recesses 1036a to 1036d of the bobbin 1110.

Corresponding ones of the protrusions of the lens barrel and the first recesses of the bobbin may overlap each other in the optical-axis direction and a direction perpendicular to the optical axis. As a result, it is possible to inhibit rotation of the lens barrel 1008 due to viscosity of an adhesive member, such as a UV bonding agent, and an adhesive injection needle or to inhibit separation between the lens barrel 1008 and the bobbin 1110, whereby it is possible to inhibit poor assembly.

For example, in the state in which the protrusions of the lens unit 1400 are coupled into the first recesses of the bobbin 1110, the upper portion (or the upper end) of the lower portion 1008a of the lens barrel 1008 or the first boundary line 1011a may be located under the upper portion (or the upper end) of the inner surface 1110a of the bobbin 1110 or the stair portion 1021 of the bobbin 1110.

For example, in the state in which the protrusions of the lens unit 1400 are coupled into the first recesses of the bobbin 1110, the first boundary line 1011a may be located under the upper portion of each of the first recesses 1036a to 1036d of the bobbin 1110.

In addition, for example, in the state in which the protrusions of the lens unit 1400 are coupled into the first recesses of the bobbin 1110, the upper end of each of the first recesses 1036a to 1036d of the bobbin 1110 may be located above the upper end of the lower portion 1008a of the lens barrel 1008 or the first boundary line 1011a.

In addition, for example, in the state in which the protrusions 1081a to 1081d of the lens unit 1400 are coupled into the first recesses 1036a to 1036d of the bobbin 1110, the upper end of each of the protrusions 1081a to 1081d may be located under the upper portion or the upper end of a corresponding one of the first recesses 1036a to 1036d of the bobbin 1110. That is, each of the protrusions 1081a to 1081d may be disposed in only a portion of the entire region of a corresponding one of the first recesses 1036a to 1036d of the bobbin 1110. However, the disclosure is not limited thereto.

Figure 30B:
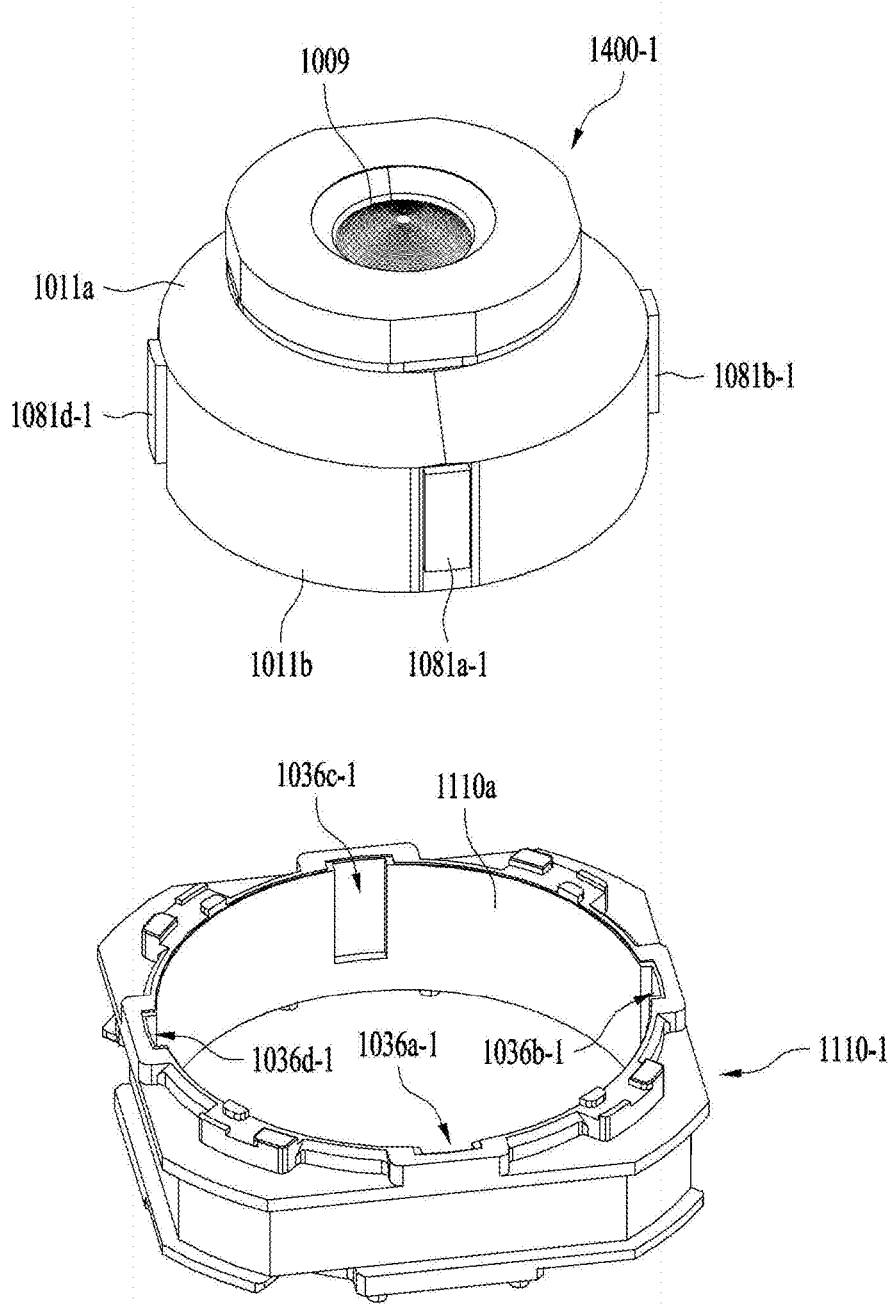
FIG. 30B is a perspective view of a lens unit and a bobbin according to another embodiment.

FIG. 30B is a perspective view of a lens unit 1400-1 and a bobbin 1110-1 according to another embodiment.

Referring to FIG. 30B, protrusions 1081a-1 to 1081d-1 of the lens unit 1400-1 may be spaced apart from the lower end of the lens barrel 1008. For example, the protrusions 1081a-1 to 1081d-1 may be spaced apart from the second boundary line 1011b.

In addition, each of first recesses 1036a-1 to 1036d-1 of the bobbin 1110-1 include a first opening open to the upper surface of the bobbin 1110-1, but is not open to the lower surface of the bobbin 1110-1.

Referring to FIG. 31, the camera module 1200 may include an adhesive member 1088 disposed between each of the first recesses 1036a to 1036d of the bobbin 1110 and a corresponding one of the protrusions 1081a to 1081d of the lens unit 1400.

For example, the adhesive member 1088 may be located between the outer surface of each of the protrusions 1081a to 1081d and a corresponding one of the first recesses of the bobbin 1110. In addition, for example, the adhesive member 1088 may be located on the upper surface of each of the protrusions 1081a to 1081d.

In addition, for example, the adhesive member 1088 may be disposed between the outer surface of the lower portion 1008a of the lens barrel 1008 and the inner surface 1110a of the bobbin 1110.

The adhesive member 1088 may adhere the lens unit 1400, e.g. the lens barrel 1008, to the bobbin 1110. The protrusions of the lens unit 1400 are adhered to the first recesses 1036a to 1036d of the bobbin 1110 by the adhesive member 1088, whereby a locked structure is provided. In the locked structure, poor assembly is inhibited, whereby it is possible to inhibit the lens unit 1400 from being separated from the bobbin 1110. The adhesive member 1088 may be a UV bonding agent. However, the disclosure is not limited thereto.

Figure 30C:
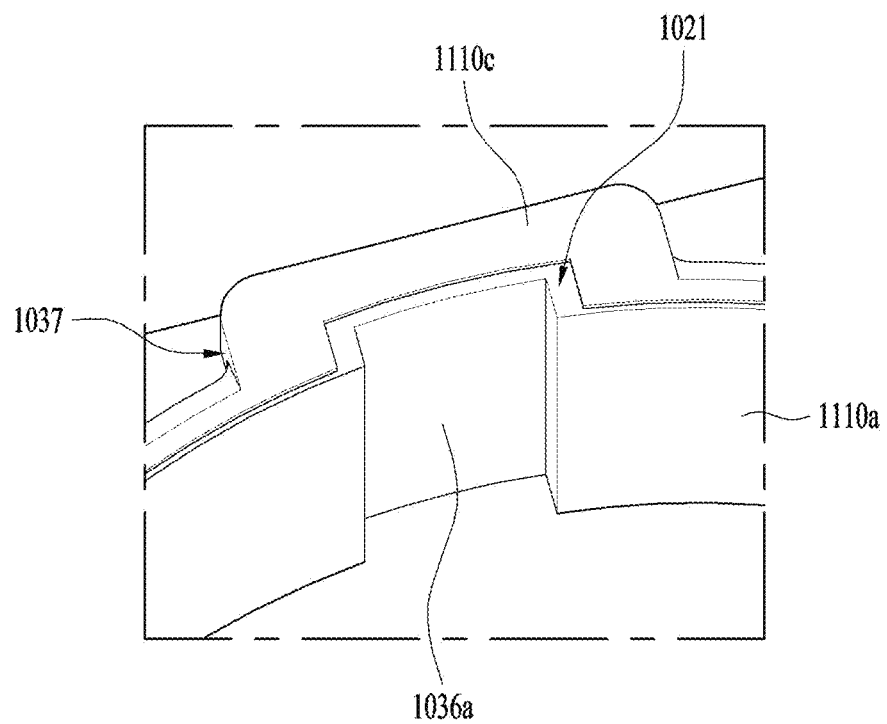
FIG. 30C is a partially enlarged view of the bobbin shown in FIG. 30A.

FIG. 30C is a partially enlarged view of the bobbin 1110 shown in FIG. 30A.

Referring to FIG. 30C, the stair portion 1021 may be formed between the upper surface of the bobbin 1110 and the upper end of the inner surface 1110a of the bobbin 1110.

The stair portion 1021 may be formed along the upper end of the inner surface 1110a of the bobbin 1110.

The stair portion 1021 may have a uniform stair formed from the upper surface of the bobbin 1110 or an upper surface 1110c of the rim 1037 in the optical-axis direction or in the direction from the upper surface of the bobbin 1110 or the upper surface 1110c of the rim 1037 to the lower surface of the bobbin 1110.

The stair portion 1021 may inhibit the adhesive member 1088, injected between the outer surface of the lower portion 1008a of the lens barrel 1008 and the inner surface 1110a of the bobbin 1110, from overflowing to the upper surface 1110c of the bobbin 1110.

In general, for convenience in assembly, the outer diameter of the lens may be smaller than the inner surface of the bobbin, and a screw thread may be formed in the inner surface of the bobbin. In this case, both are securely locked; however, matching is difficult, and foreign matter may be easily generated at the time of fastening the lens.

In contrast, in a camera module including a lens unit and a bobbin having no screw threads for coupling, the degree of freedom of the lens unit in moving in the rotational direction is high when the lens unit is coupled to the bobbin. Consequently, the lens unit may be easily rotated due to impact caused by an adhesive injection needle or viscosity of an adhesive member, and the lens unit may be moved in the upward direction due to an adhesive (e.g. a UV bonding agent) attached to the adhesive injection needle. As a result, the assembly height of the lens unit may be changed, and no AF operation may be performed due to contact between the adhesive and the cover member. That is, no operation may be performed.

In the embodiment, the bobbin and the lens unit have no screw threads for coupling, and it is possible to inhibit rotation of the lens unit 1400 and to inhibit separation thereof by the protrusions 1081a to 1081d and the first recesses 1036a to 1036d.

Figure 33:
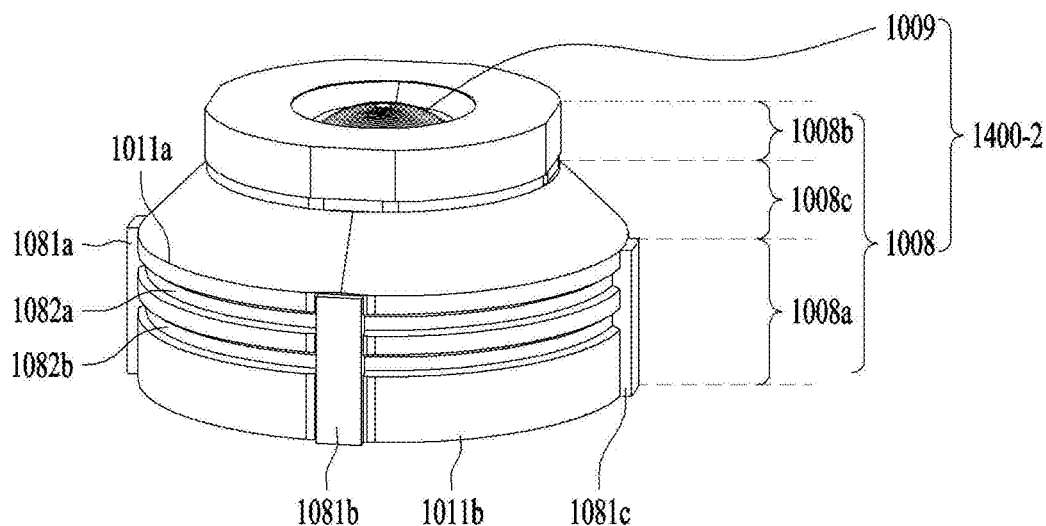
FIG. 33 is a perspective view of a lens unit according to another embodiment.

FIG. 33 is a perspective view of a lens unit 1400-2 according to another embodiment. FIG. 33 is a modification of the lens units 1400 and 1400-1 shown in FIGS. 29A and 30B.

Referring to FIG. 33, a lens barrel 1008 of the lens unit 1400-2 may include at least one second recess or adhesive member settlement recess formed in the outer surface thereof. For example, the lens barrel 1008 of FIG. 33 may include a plurality of second recesses 1082a and 1082b formed in the outer surface thereof so as to be spaced apart from each other.

The second recesses 1082a and 1082b may be located between a first boundary line 1011a and a second boundary line 1011b and between a plurality of protrusions 1081a to 1081d.

The second recesses 1082a and 1082b may extend in a direction perpendicular to the direction from the first boundary line 1011a to the second boundary line 1011b.

The second recesses 1082a and 1082b may be located spaced apart from the first boundary line 1011a to the second boundary line 1011b, and the second recesses 1082a and 1082b may abut the protrusions 1081a to 1081d.

The second recesses 1082a and 1082b may be isolated or spaced apart from each other by the protrusions 1081a to 1081d. For example, the protrusions 1081a to 1081d may abut the side surfaces and the bottoms of the second recesses 1082a and 1082b.

In addition, the second recesses 1082a and 1082b may serve as a path for uniformly distributing an adhesive member (e.g. a UV bonding agent) injected between the lower portion 1008a and the inner surface of the bobbin 1110 to the outer surface of the lens barrel 1008. In addition, the adhesive member 1088 of FIG. 31 may be disposed in the second recesses 1082a and 1082b of the lens barrel 1008.

The description of the embodiments 1400 and 1400-1 of FIGS. 29A to 32, 15A and 15B may be equally applied to the embodiment 1400-2 of FIG. 33.

Figure 34A:
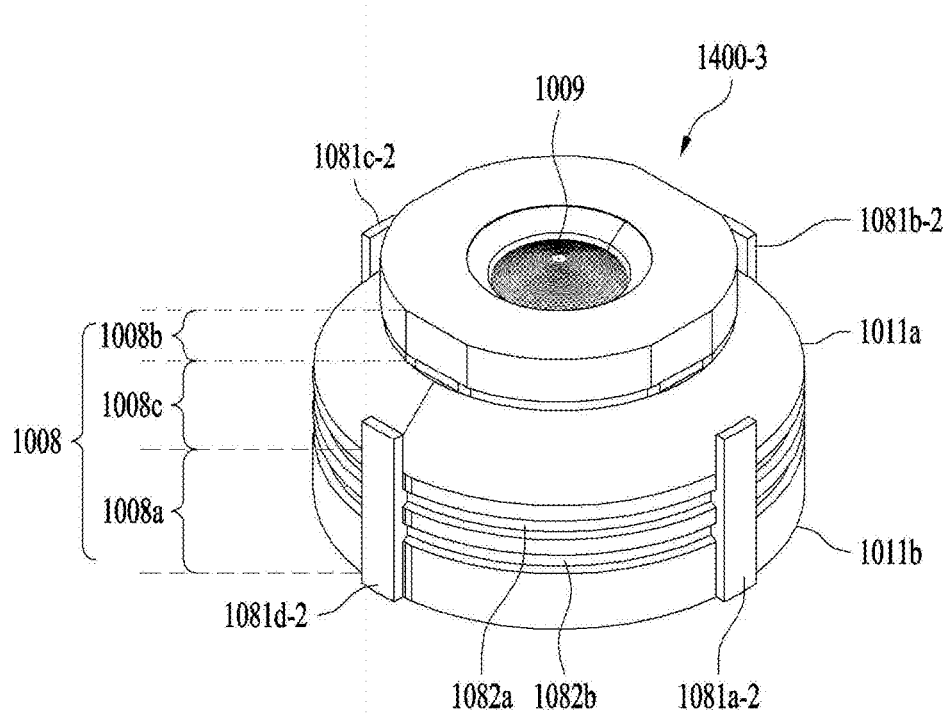
FIG. 34A is a perspective view of a lens unit according to a further embodiment.
Figure 34B:
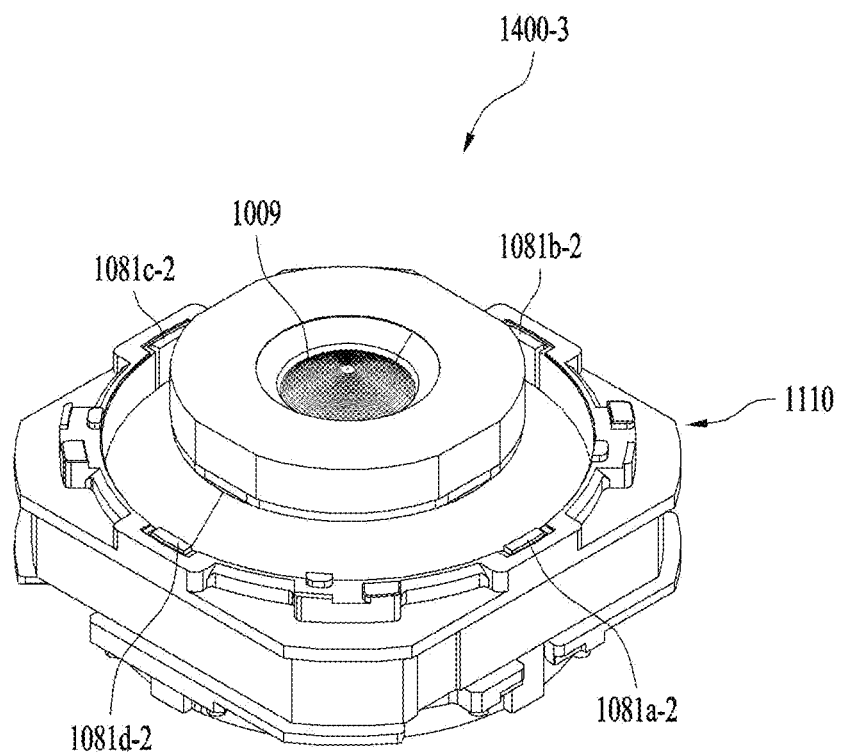
FIG. 34B is a coupled plan view of the lens unit shown in FIG. 34A and the bobbin.
Figure 35:
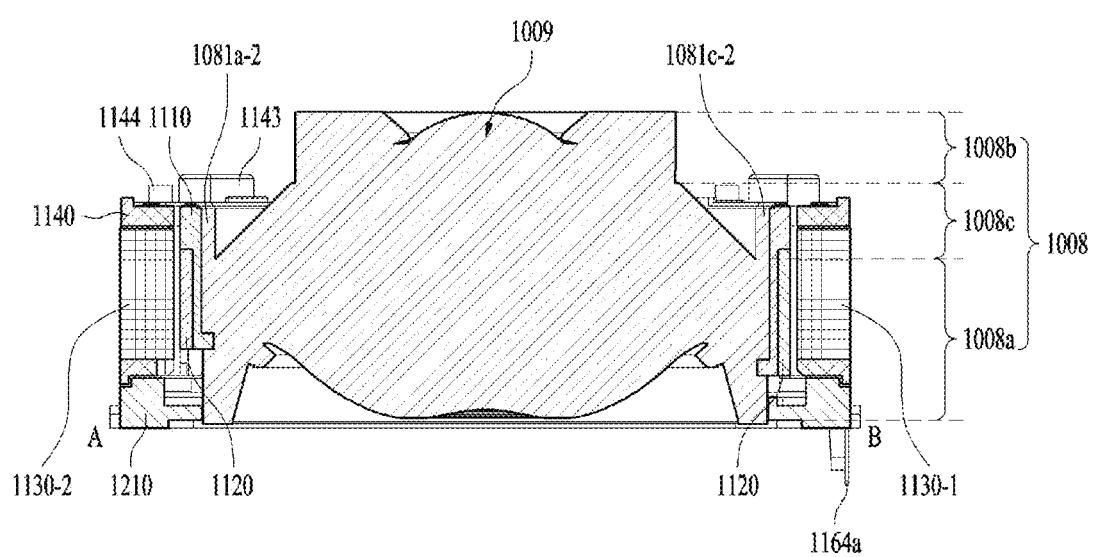
FIG. 35 is a sectional view of a camera module including the lens unit and the bobbin shown in FIG. 34B when viewed in an AB direction of FIG. 23.

FIG. 34A is a perspective view of a lens unit 1400-3 according to a further embodiment, FIG. 34B is a coupled plan view of the lens unit 1400-3 shown in FIG. 34A and the bobbin 1110, and FIG. 35 is a sectional view of a camera module including the lens unit 1400-3 and the bobbin 1110 shown in FIG. 34B when viewed in an AB direction of FIG. 23.

The lens unit 1400-3 shown in FIGS. 34A to 35 may be a modification of the lens unit 1400-2. Protrusions 1081a-2 to 1081d-2 of the lens unit 1400-3 may protrude from a first boundary line 1011a in the optical-axis direction or in the direction from a lower portion 1008a to an upper portion 1008b thereof.

For example, the upper end of each of the protrusions 1081a-2 to 1081d-2 may be located above the upper end of the lower portion 1008a or the first boundary line 1011a.

For example, in the state in which the protrusions 1081a-2 to 1081d-2 of the lens unit 1400-3 are coupled into the first recesses 1036a to 1036d of the bobbin 1110, the upper end of the lower portion 1008a of the lens barrel 1008 or the first boundary line 1011a may be located under the upper end of the inner surface 1110a of the bobbin 1110 or the stair portion 1021 of the bobbin 1110.

In addition, for example, in the state in which the protrusions 1081a-2 to 1081d-2 of the lens unit 1400-3 are coupled into the first recesses 1036a to 1036d of the bobbin 1110, the upper end of each of the first recesses 1036a to 1036d of the bobbin 1110 may be located above the upper end of the lower portion 1008a of the lens barrel 1008 or the first boundary line 1011a.

In addition, for example, the protruding portion of each of the protrusions 1081a-2 to 1081d-2 of the lens unit 1400-3 may extend from the first boundary line 1011a to the upper end of a corresponding one of the first recesses 1036a to 1036d.

In addition, for example, the upper end portion of each of the protrusions 1081a-2 to 1081d-2 of the lens unit 1400-3 may be located in the same plane as the upper end of a corresponding one of the first recesses 1036a to 1036d.

In addition, for example, in the state in which the protrusions 1081a-2 to 1081d-2 of the lens unit 1400-3 are coupled into the first recesses 1036a to 1036d of the bobbin 1110, the upper end portion of each of the protrusions 1081a-2 to 1081d-2 of the lens unit 1400-3 may be located higher than the upper surface of a corresponding one of the magnets 1130-1 and 113-2 disposed at the housing 1140.

In addition, for example, in the state in which the protrusions 1081a-2 to 1081d-2 of the lens unit 1400-3 are coupled into the first recesses 1036a to 1036d of the bobbin 1110, the upper end portion of each of the protrusions 1081a-2 to 1081d-2 of the lens unit 1400-3 may be located higher than the coil 1120 disposed at the bobbin 1110.

In addition, for example, in the state in which the protrusions 1081a-2 to 1081d-2 of the lens unit 1400-3 are coupled into the first recesses 1036a to 1036d of the bobbin 1110, the upper end portion of each of the protrusions 1081a-2 to 1081d-2 of the lens unit 1400-3 may be located lower than the second stopper 1143 and/or the second upper protrusion 1144 of the housing 1140.

Alternatively, in another embodiment, for example, the upper end portion of each of the protrusions 1081a-2 to 1081d-2 of the lens unit 1400-3 may protrude from the first opening of a corresponding one of the first recesses 1036a to 1036*d* or from the upper end of a corresponding one of the first recesses 1036*a* to 1036*d*.

In the embodiment shown in FIG. 34B, the portion of each of the protrusions 1081*a*-2 to 1081*d*-2 of the lens unit 1400-3 protruding from the first boundary line 1011*a* may increase the area of coupling with the first recesses 1036*a* to 1036*d*, whereby it is possible to inhibit separation of the lens unit 1400-3 and rotation of the lens unit 1400-3 due to impact.

The protrusions 1081*a*-2 to 1081*d*-2 described with reference to FIGS. 34A to 35 may also be applied to the lens units 1400 and 1400-1 according to other embodiments.

In FIGS. 21 to 35, the embodiments in which the protrusions are formed in the lens barrel 1008 of each of the lens units 1400, 1400-1, 1400-2, and 1400-3 and the first recesses are formed in the inner surface 1110*a* of the bobbin 1110 have been described. However, the disclosure is not limited thereto.

In another embodiment, first recesses may be formed in the outer surface of the lens barrel 1008 of each of the lens units 1400, 1400-1, 1400-2, and 1400-3, and protrusions corresponding to the first recesses of the lens barrel 1008 may be provided on the inner surface 1110*a* of the bobbin 1110, and the description of the protrusions and the first recesses in FIGS. 21 to 35 may also be applied to the other embodiment.

That is, according to an embodiment, a first coupling portion may be provided at the outer surface of the lens barrel 1008, and a second coupling portion may be provided at the inner surface 1110*a* of the bobbin 1110, the first coupling portion may be a protrusion or a recess, and the second coupling portion may be a recess corresponding to the protrusion of the lens barrel or a protrusion corresponding to the recess of the lens barrel.

In the embodiment of FIGS. 34A and 34B, each of the protrusions 1081*a*-2 to 1081*d*-2 does not contact the outer surface, i.e. the inclined surface, of the middle portion 1008*c* and the outer surface of the upper portion 1008*b*. In another embodiment, however, each protrusion may contact the outer surface of the middle portion 1008*c*, or may contact the outer surface of the middle portion 1008*c* and the outer surface of the upper portion 1008*b*. This serves to increase the area of contact between the protrusions and the outer surface of the lens barrel, thereby improving durability of the protrusions.

The description of the first recesses 1036*a* to 1036*d* or 1036*a*-1 to 1036*d*-1 given with reference to FIG. 24A or 30B may be applied to the bobbin 110 of the lens moving apparatus 100 shown in FIGS. 1 to 19, and the description of the lens units 1400, 1400-1, 1400-2, and 1400-3 according to the embodiments shown in FIGS. 29A to 35 may be applied to the lens unit 400 of the camera module 200 shown in FIG. 20.

Figure 36:
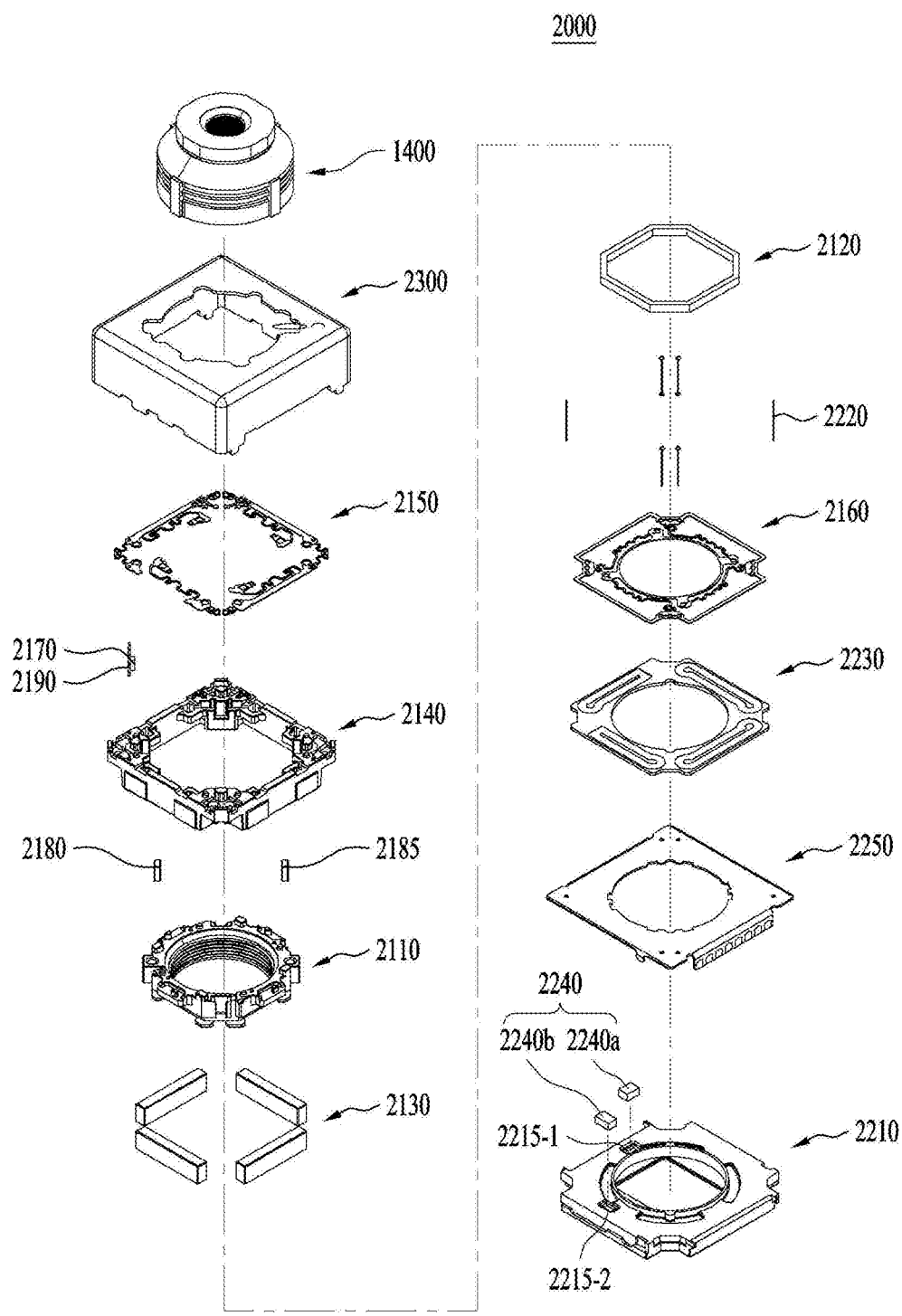
FIG. 36 is an exploded perspective view of a camera module according to another embodiment.

FIG. 36 is an exploded perspective view of a camera module 2000 according to another embodiment.

Referring to FIG. 36, the camera module 2000 may include a lens unit 1400 and a lens moving apparatus. The camera module 2000 shown in FIG. 36 may perform an optical image stabilization function as well as an autofocus function.

The lens unit 1400 may be the embodiment described with reference to FIGS. 29A to 30A. A camera module according to another embodiment may include one of the lens units 1400-1, 1400-2, and 1400-3 described with reference to FIGS. 30B to 35, instead of the lens unit 1400.

The lens moving apparatus includes a bobbin 2110, a first coil 2120, a first magnet 2130, a housing 2140, an upper elastic member 2150, a lower elastic member 2160, a supporting member 2220, a second circuit board 2250, and a base 2210.

In addition, the lens moving apparatus may further include a first circuit board 2190 and a first position sensor 2170 for AF feedback driving. In addition, the lens moving apparatus may further include a second magnet 2180 and a third magnet 2185.

In addition, the lens moving apparatus may further include a second coil 2230 for optical image stabilizer (OIS) driving, and may further include a second position sensor 2240 for OIS feedback driving. In addition, the lens moving apparatus may further include a cover member 2300.

The description of the cover member 1300 of FIG. 21 may be applied to the cover member 2300.

The lens unit may be mounted to the bobbin 2100, the bobbin may be provided with the first recesses 1036*a* to 1036*d* or 1036*a*-1 to 1036*d*-1 described above, and the description thereof will be applied.

The bobbin 2100 may be provided with a first settlement recess, in which the second magnet 2180 is settled, and a second settlement recess, in which the third magnet 2185 is settled.

The first coil 2120 is disposed at the outer circumferential surface or the outer surface of the bobbin 2110, and may be disposed in the housing 2140. The description of the coil 1120 of FIG. 22 may be applied.

The first coil 2120 may be connected to at least one of the upper elastic member 2150 or the lower elastic member 2160, and may be connected to the second circuit board 2250 via the upper elastic member 2150 or the lower elastic member 2160 and the supporting member 2220.

The housing 2140 may receive therein the bobbin 2110 at which the first coil 2120 is disposed, and the description of the housing 1140 of FIG. 22 may be applied to the housing 2140.

For example, the housing 2140 may include edges and corners located between the edges. The housing 2140 may include at least one first stopper disposed at the upper surface thereof, and may include at least one second stopper disposed at the lower surface thereof. The housing 2140 may include a guide for guiding installation of a first outer frame of the upper elastic member.

The housing 2140 may be provided at the upper surface thereof with at least one first coupling portion for coupling with the first outer frame. The housing 2140 may be provided at the lower surface thereof with a second coupling portion for coupling with a second outer frame of the lower elastic member 2160. Each of the first coupling portion and the second coupling portion may be a protrusion or a recess.

The housing 2140 may be provided at each corner thereof with a hole through which the supporting member 2220 extends.

The housing 2140 may be provided with a first settlement recess for receiving the first circuit board 2190 and a second settlement recess for receiving the first position sensor 2170. For example, the first settlement recess may be provided in the upper portion or the upper end of one of the corners of the housing 2140.

The second settlement recess may be provided in the inner surface of one of the corners of the housing 2140, may have an opening open to the inside of the housing 2140, and may abut the first settlement recess. However, the disclosure is not limited thereto.

The first magnet 2130 may be disposed at each of the edges of the housing 2140, and the description of the magnet 1130 of FIG. 22 may be applied to the first magnet 2130.

The second magnet 2180 and the third magnet 2185 may be disposed at the outer surface of the bobbin 2110, and may be disposed so as to face each other.

The interface between an N pole and an S pole of each of the second magnet 2180 and the third magnet 2185 may be parallel to a direction perpendicular to the optical axis. However, the disclosure is not limited thereto. For example, in another embodiment, the interface between the N pole and the S pole may be parallel to the optical axis.

The second magnet 2180 may be moved together with the bobbin 2100 in the optical-axis (OA) direction as the result of interaction between the first coil 2120 and the first magnet 2130, and the first position sensor 2170 may sense the intensity of a magnetic field of the second magnet 2180 moved in the optical-axis direction and may output an output signal based on the result of sensing. For example, a controller 830 of the camera module or a controller 780 of a terminal may detect the displacement of the bobbin 2110 in the optical-axis direction based on the output signal from the first position sensor 2170.

The magnetic field of the second magnet 2180 may influence interaction between the first magnet 2130 and the second coil 2230. The third magnet 2185 may serve to alleviate or remove the influence of the magnetic field of the second magnet 2180 on interaction between the first magnet 2130 and the second coil 2230.

In addition, the third magnet 2185 and the second magnet 2180 may be disposed in a symmetrical fashion, whereby an AF operation unit may be balanced and thus accurate AF operation may be performed.

In another embodiment, the second magnet 2180 and the third magnet 2185 may be omitted, the first position sensor may be mounted to the bobbin 2110, rather than the housing, and the bobbin 2110 and the first position sensor are moved in the optical-axis direction due to interaction between the first coil 2120 and the first magnet 2130, whereby the first position sensor may sense the intensity of the magnetic field of the first magnet and may output an output signal based on the result of sensing.

The first position sensor 2170 and the first circuit board 2190 may be disposed at one of the corners of the housing 2140 so as to correspond to or face the second magnet 2180. For example, at an initial position of the bobbin 2110 the first position sensor 2170 may be opposite and overlap the second magnet 2180 in a direction perpendicular to the optical axis.

For example, the first circuit board 2190 may be disposed in the first settlement recess of the housing 2140. The first position sensor 2170 may be mounted to the first circuit board 2190 disposed at the housing 2140.

The first position sensor 2170 may sense the intensity of the magnetic field of the second magnet 2180 mounted to the bobbin 2110 due to movement of the bobbin 2110, and may output an output signal (e.g. output voltage) based on the result of sensing.

The first position sensor 2170 may be configured in the form of a driver including a Hall sensor, or may be realized as a position sensor, such as a Hall sensor, alone.

The first position sensor 2170 may include two input terminals and two output terminals, and each of the input terminals and the output terminals of the first position sensor 2170 may be connected to a corresponding one of pads of the first circuit board 2190.

The first circuit board 2190 may include four pads and a circuit pattern or wiring (not shown) interconnecting the first position sensor 2170 and the four pads. For example, the first circuit board 2190 may be a printed circuit board or an FPCB.

For example, the four pads of the first circuit board 2190 may be connected to the second circuit board 2250 via four upper springs of the upper elastic member 2150 and four supporting members 2220, and the first position sensor 2170 may be connected to the second circuit board 2250.

In addition, both ends of the first coil 2120 may be connected to the inner frames of two different upper springs, and may be connected to the second circuit board 2250 via two different upper springs and two supporting members.

The upper elastic member 2150 and the lower elastic member 2160 are coupled to the bobbin 2110 and the housing 2140, and support the bobbin 2110. The description of the upper elastic member 1150 and the lower elastic member 1160 of FIG. 22 may be applied to the upper elastic member 2150 and the lower elastic member 2160.

The supporting member 2220 may support the housing 2140 relative to the base 2210, and may connect at least one of the upper elastic member 2150 or the lower elastic member 2160 to the second circuit board 2250.

At least one of the upper elastic member 2150 or the lower elastic member 2160 may be divided or separated into two or more portions.

One end of the supporting member 2220 may be coupled to the upper elastic member 2150, and the other end of the supporting member 2220 may be coupled to the second circuit board 2250 or a circuit member 2231, via solder or a conductive adhesive member.

A plurality of supporting members 2220 may be provided, and each of the supporting members may be coupled and connected to a corresponding one of the upper springs via solder. For example, the supporting members may be disposed at four corners of the housing 2140.

The supporting members may support the bobbin 2110 and the housing 2140 such that the bobbin 2110 and the housing 2140 are movable in a direction perpendicular to the first direction. In FIG. 36, one or two supporting members are disposed at each of the corners of the housing 2140. However, the disclosure is not limited thereto.

In another embodiment, two or more supporting members may be disposed at each of the second corners of the housing 2140, and one supporting member may be disposed at each of the second corners of the housing 2140.

Each of the supporting members may be spaced apart from the housing 2140, and may be directly connected to the first outer frame of a corresponding one of the upper springs, rather than fixed to the housing 2140.

A driving signal may be transmitted from the second circuit board 2250 to the first coil 2120 via the supporting members and the upper springs, a driving signal may be provided from the second circuit board 2250 to the first position sensor 2170, and an output signal from the first position sensor 2170 may be transmitted to the second circuit board 2250.

Each of the supporting members may be formed of a member that is separate from the upper elastic member 2150, and may be realized as an elastic supporting member, such as a leaf spring, a coil spring, or a suspension wire. In addition, in another embodiment, the supporting members may be integrally formed with the upper elastic member 2150.

The base 2210 is disposed under the lower elastic member 2160, may have an opening corresponding to the opening of the bobbin 2110 and/or the opening of the housing 2140, and may have a shape coinciding with or corresponding to the shape of the cover member 300, such as a quadrangular shape. The description of the base 1210 of FIG. 22 may be applied to the base 2210.

For example, the base 2210 may have a stair, to which an adhesive is applied in order to fix the cover member 2300 by adhesion.

A prop portion having a corresponding size may be provided at a surface of the base 2210 facing a portion of the second circuit board 2250 at which a terminal is formed. The prop portion of the base 2210 may support a terminal surface of the second circuit board 2250.

The base 2210 may be provided in the upper surface thereof with settlement recesses 2215-1 and 2215-2, in which the second position sensor 2240 mounted to the second circuit board 2250 may be disposed. According to the embodiment, the base 2210 may be provided with two settlement recesses 2215-1 and 2215-2.

The second circuit board 2250 is disposed on the upper surface of the base 2210.

The second coil 2230 may be disposed about the second circuit board 2250, and the second position sensor 2240 may be disposed under the second circuit board 2250.

For example, the second position sensor 2240 may be mounted to the lower surface of the second circuit board 2250, and the lower surface of the second circuit board 2250 may be a surface facing the upper surface of the base 2210.

The second position sensor 2240 may sense the intensity of the magnetic field of the first magnet 2130 disposed at the housing 2140 due to movement of the housing 2140 in a direction perpendicular to the optical axis, and may output an output signal (e.g. output voltage) based on the result of sensing.

The displacement of the housing 2140 relative to the base 2210 in a direction (e.g. the X axis or the Y axis) perpendicular to the optical axis (e.g. the Z axis) may be detected based on the output signal from the second position sensor 2240.

The second position sensor 2240 may include two OIS position sensors 2240a and 2240b in order to detect the displacement of the housing 2140 in a second direction (e.g. the X axis) perpendicular to the optical axis and a third (e.g. the Y axis) perpendicular to the optical axis.

For example, the OIS position sensor 2240a may sense the intensity of the magnetic field of the first magnet 2130 due to movement of the housing 2140 and may output a first output signal based on the result of sensing, and the OIS position sensor 2240b may sense the intensity of the magnetic field of the first magnet 2130 due to movement of the housing 2140 and may output a second output signal based on the result of sensing. The controller 830 of the camera module or a controller 780 of a portable terminal 200A may detect the displacement or tilt of the housing 2140 based on the first output signal and the second output signal.

For example, the second circuit board 2250 is disposed under the housing 2140, may be disposed on the upper surface of the base 2210, and may have an opening corresponding to the opening of the bobbin 2110, the opening of the housing 2140, and/or the opening of the base 2210. The shape of the outer surface of the second circuit board 2250 may be a shape coinciding with or corresponding to the shape of the upper surface of the base 2210, such as a quadrangular shape.

The second circuit board 2250 may be provided with a through hole, through which the supporting member 2220 extends. In another embodiment, the second circuit board 2250 may be provided in each corner thereof with an escape recess in order to exclude spatial interference with the supporting member. At this time, the escape recess of the second circuit board 2250 may be formed by chamfering each corner thereof.

The second circuit board 2250 may be provided with at least one terminal surface which is bent from the upper surface thereof and at which a plurality of terminals or pins for connection with the outside is provided.

The terminals may be installed at the terminal surface of the second circuit board 2250. For example, external driving signals may be provided to the first and second coils 2120 and 2230 and the first and second position sensors 2170 and 2240 via the terminals installed at the terminal surface of the second circuit board 2250, and output signals from the first and second position sensors 2170 and 2240 may be output to the outside.

According to the embodiment, the circuit board 2250 may be an FPCB. However, the disclosure is not limited thereto. The terminals of the second circuit board 2250 may be directly formed on the surface of the base 2210 using a surface electrode scheme or the like.

The second coil 2230 may be disposed on the upper surface of the second circuit board 2250, and is formed at a circuit member 2231 that is separate from the second circuit board 2250. However, the disclosure is not limited thereto. In another embodiment, the second coil 2230 may be configured in the form of a ring-shaped coil block located on the circuit board or an FP coil.

Alternatively, in another embodiment, the second coil 2230 may be configured in the form of a circuit pattern formed on the second circuit board 2250.

An escape recess may be provided at each corner of the circuit member 2231 at which the second coil 2230 is provided. The escape recess of the circuit member 2231 may be formed by chamfering each corner of the circuit member 2231. In addition, in another embodiment, a hole, through which the supporting member 2220 extends, may be provided in each corner of the circuit member 2231.

The second coil 2230 is disposed at the upper portion of the second circuit board 2250 so as to correspond to the first magnet 2130 disposed at the housing 2140. Alternatively, in another embodiment, the circuit board 2250 may include a second coil opposite the first magnet 2130.

For example, the second coil 2230 may include four OIS coils disposed so as to correspond to four sides of the circuit board 2250. However, the disclosure is not limited thereto. One OIS coil for a second direction and two OIS coils for a third direction may be installed, and four or more OIS coils may be installed.

As described above, the housing 2140 may be moved in the second direction and/or the third direction due to interaction between the first magnet 2130 and the second coil 2230 corresponding thereto, whereby handshake compensation may be performed.

Any sensor may be used as each of the OIS position sensors 2240a and 2240b, as long as the sensor is capable of sensing the intensity of a magnetic field. For example, each of the OIS position sensors 2240 may be configured in the form of a driver including a Hall sensor, or may be realized as a position sensor, such as a Hall sensor, alone.

Each of the OIS position sensors 2240a and 2240b is mounted on the second circuit board 2250, and the second circuit board 2250 may be provided with terminals connected to the OIS position sensors 2240a and 2240b.

For coupling between the second circuit board 2250 and the base 2210, a coupling protrusion (not shown) may be provided on the upper surface of the base 2210, a hole (not shown), into which the coupling protrusion of the base 2210 is coupled, may be provided in the second circuit board 2250, and both may be fixed to each other by thermal fusion or using an adhesive member such as an epoxy.

Figure 37:
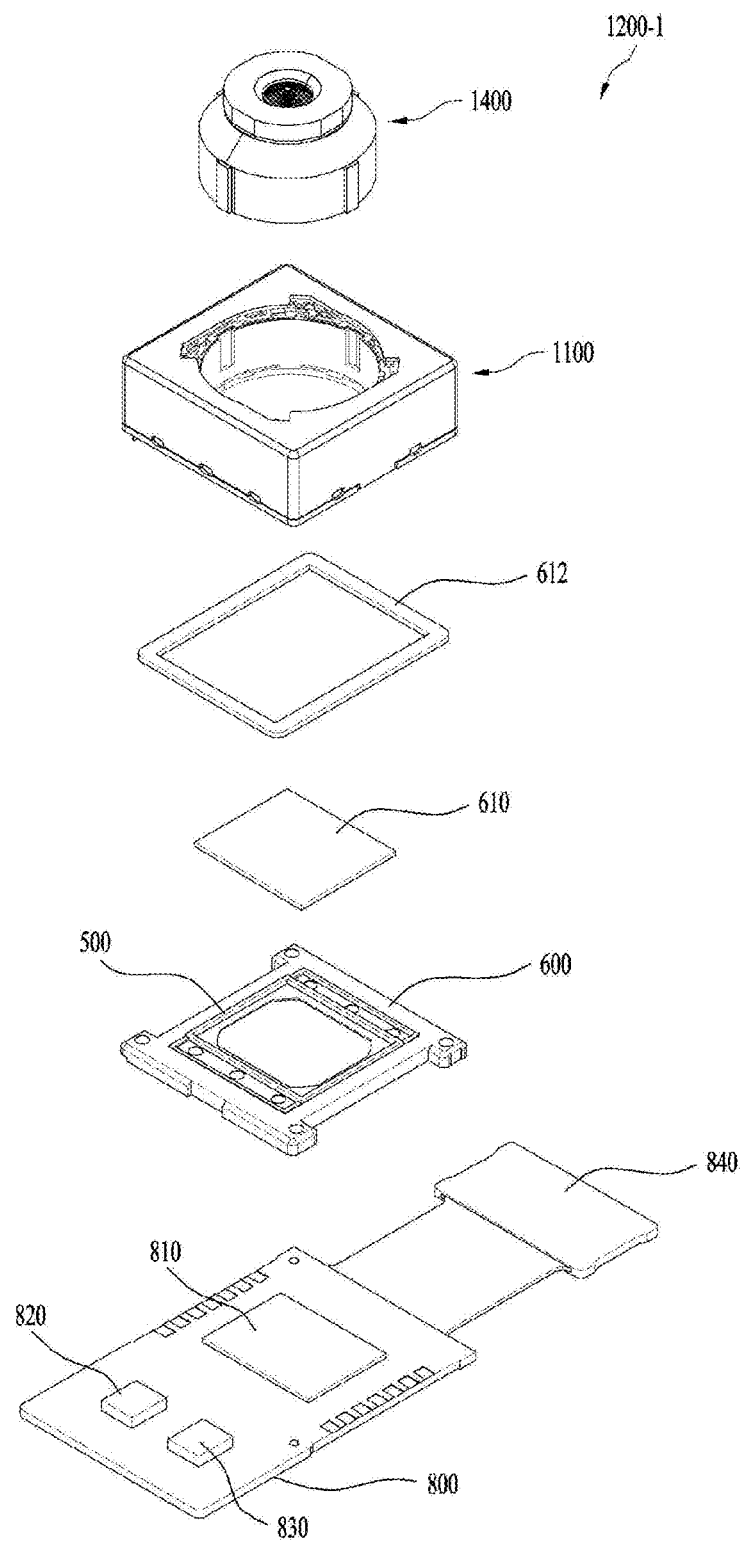
FIG. 37 is an exploded perspective view of a camera module according to a further embodiment.

FIG. 37 is an exploded perspective view of a camera module 1200-1 according to a further embodiment.

Referring to FIG. 37, the camera module 1200-1 may include a lens unit 1400, a lens moving apparatus 1100, an adhesive member 612, a filter 610, a first holder 600, a second holder 800, an image sensor 810, a motion sensor 820, a controller 830, and a connector 840.

The lens unit 1400 is the same as the above embodiment, and a camera module according to another embodiment may include one of the lens units 1400-1, 1400-2, and 1400-3, instead of the lens unit 1400.

The lens moving apparatus 1100 is the same as the above embodiment, and a camera module according to another embodiment may include the lens moving apparatus 2000, instead of the lens moving apparatus 1100.

The description of FIG. 20 may be applied to the first holder 600, the adhesive member 612, the filter 610, the second holder 800, the image sensor 810, the motion sensor 820, the controller 830, and the connector 840.

In addition, the lens moving apparatus 100 ("1100"의 오기입니다) according to the embodiment may be included in an optical instrument configured to form an image of an object in a space using reflection, refraction, absorption, interference, diffraction, etc., which are characteristics of light, to increase the visual power of the eyes, to record or reproduce an image formed by a lens, to perform optical measurement, or to propagate or transfer an image. For example, an optical instrument according to an embodiment may include a smartphone or a portable terminal equipped with a camera.

Figure 38:
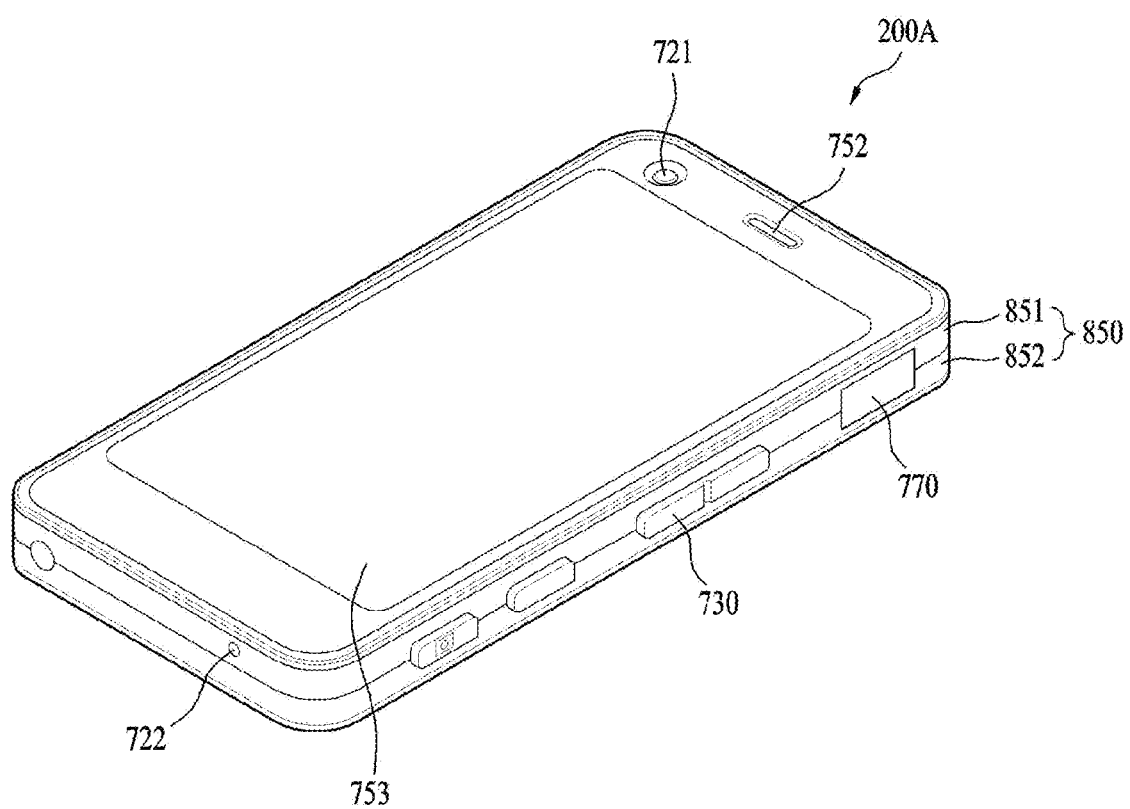
FIG. 38 is a perspective view of a portable terminal according to an embodiment.
Figure 39:
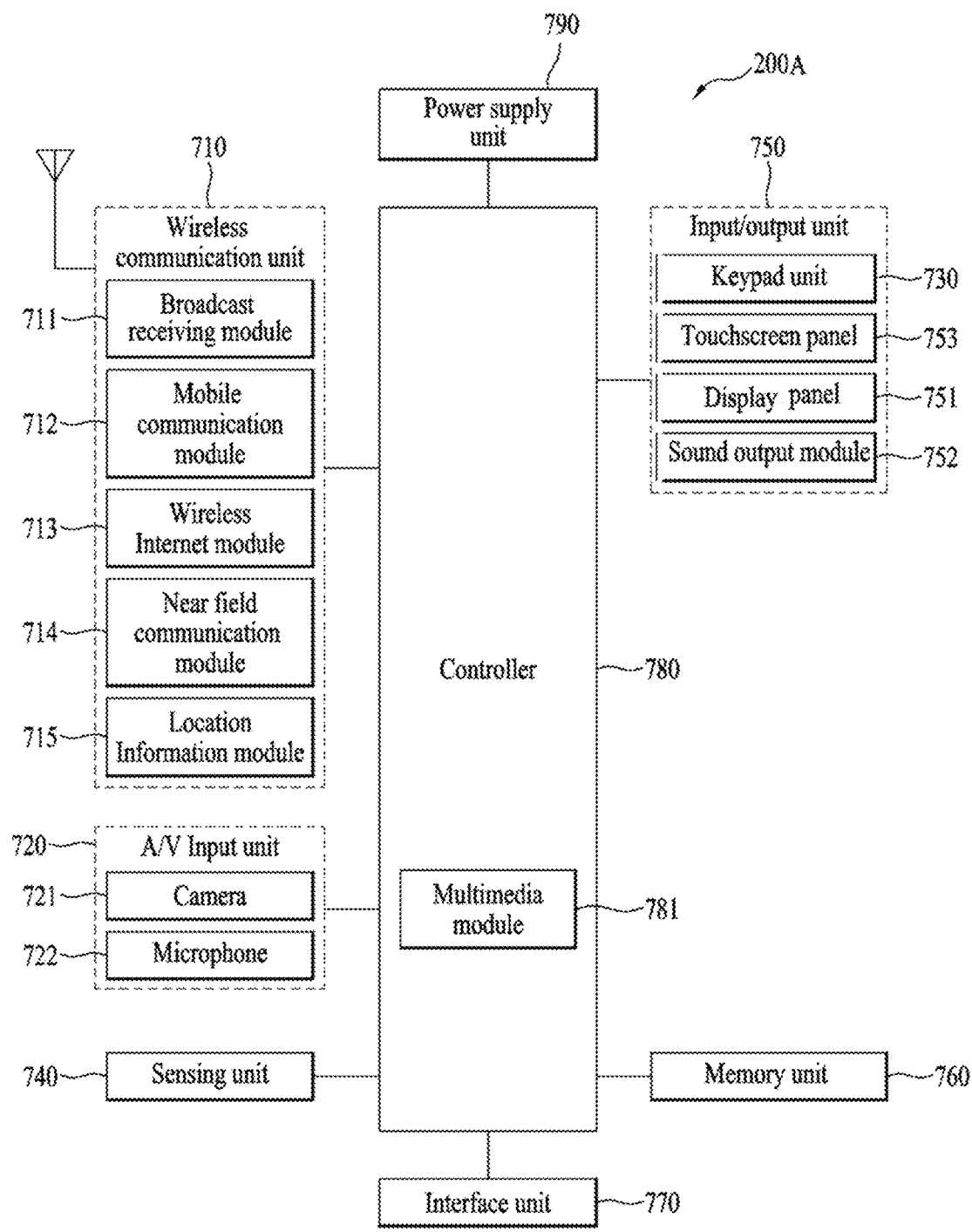
FIG. 39 shows the construction of the portable terminal shown in FIG. 38.

FIG. 38 is a perspective view of a portable terminal 200A according to an embodiment, and FIG. 39 shows the construction of the portable terminal shown in FIG. 38.

Referring to FIGS. 38 and 39, the portable terminal 200A (hereinafter referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 38 has a bar shape; however, the disclosure is not limited thereto. The body may have any of various structures, such as a slide type structure, a folder type structure, a swing type structure, and a swivel type structure, in which two or more sub-bodies are coupled so as to be movable relative to each other.

The body 850 may include a case (casing, housing, cover, etc.) that defines the external appearance thereof. For example, the body 850 may be divided into a front case 851 and a rear case 852. Various electronic parts of the terminal may be mounted in a space defined between the front case 851 and the rear case 852.

The wireless communication unit 710 may include one or more modules that enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a nearfield communication module 714, and a location information module 715.

The A/V (audio/video) input unit 720, which is provided to input an audio signal or a video signal, may include a camera 721 and a microphone 722.

The camera 721 may include the camera module according to the above embodiment.

The sensing unit 740 may sense the current state of the terminal 200A, such as the opening and closing state of the terminal 200A, the position of the terminal 200A, whether a user contacts the terminal, the orientation of the terminal 200A, and acceleration/deceleration of the terminal 200A, in order to generate a sensing signal for controlling the operation of the terminal 200A. For example, in the case in which the terminal 200A is a slide phone, the sensing unit may sense whether the slide phone is open or closed. In addition, the sensing unit senses whether power is supplied from the power supply unit 790 and whether the interface unit 770 is coupled to an external instrument.

The input/output unit 750 is provided to generate input or output related to visual sensation, audible sensation, or tactile sensation. The input/output unit 750 may generate input data for controlling the operation of the terminal 200A, and may display information processed by the terminal 200A.

The input/output unit 750 may include a keypad unit 730, a display panel 751, a sound output module 752, and a touchscreen panel 753. The keypad unit 730 may generate input data through keypad input.

The display panel 751 may include a plurality of pixels, the color of which is changed according to an electrical signal. For example, the display panel 751 may include at least one of a liquid crystal display, a thin film transistor-liquid crystal display, an organic light-emitting diode, a flexible display, or a three-dimensional (3D) display.

The sound output module 752 may output audio data received from the wireless communication unit 710 in a call signal reception mode, a telephone communication mode, a recording mode, a voice recognition mode, or a broadcast reception mode, or may output audio data stored in the memory unit 760.

The touchscreen panel 753 may convert a change in capacitance due to a user's touch on a specific region of the touchscreen into an electrical input signal.

The memory unit 760 may store a program for processing and control of the controller 780, and may temporarily store input/output data (for example, a telephone directory, messages, audio, still images, photographs, and video). For example, the memory unit 760 may store images, such as photographs or video, captured by the camera 721.

The interface unit 770 functions as a path for connection between the terminal 200A and an external instrument. The interface unit 770 may receive data from the external instrument, may receive electric power and transmit the received electric power to internal components of the terminal 200A, or may transfer data in the terminal 200A to the external instrument. For example, the interface unit 770 may include a wired/wireless headset port, an external charger port, a wired/wireless data port, a memory card port, a port for connection with an apparatus having an identification module, an audio input/output (I/O) port, a video input/output (I/O) port, and an earphone port.

The controller 780 may control the overall operation of the terminal 200A. For example, the controller 780 may perform related control and processing for voice communication, data communication, and video communication.

The controller 780 may have a multimedia module 781 for multimedia reproduction. The multimedia module 781 may be realized in the controller 780 or may be realized separately from the controller 780.

The controller 780 may perform pattern recognition processing that is capable of recognizing writing input or drawing input performed on the touchscreen as text or an image, respectively.

Instead of the controller 830 of the camera module 200, the controller 780 of the optical instrument 200A may provide a signal for driving the first coil 120 and/or the second coil 230, may provide a signal for controlling the first position sensor 170 and/or the second position sensor 240, and may perform AF feedback driving and/or OIS feedback driving using a signal output from the first position sensor 170 and/or the second position sensor 240. Alternatively, the controller 830 of the camera module 200 and the controller 780 of the optical instrument 200A may perform the above operations together.

The power supply unit 790 may receive external power and internal power and supply required power to respective components under control of the controller 780.

The features, structures, and effects described in the above embodiments are included in at least one embodiment, but are not limited only to one embodiment. Furthermore, features, structures, and effects illustrated in each embodiment may be combined or modified in other embodiments by those skilled in the art to which the embodiments pertain. Therefore, it is to be understood that such combinations and modifications fall within the scope of the present disclosure.

INDUSTRIAL APPLICABILITY

Embodiments may be used in a lens moving apparatus capable of inhibiting spatial interference with a housing and a supporting member and spatial interference with the housing and an upper spring and realizing an optical image stabilizer having a small height, and a camera module and an optical instrument including the same.

The invention claimed is:

1. A lens moving apparatus comprising:
a housing comprising a hole;
a bobbin disposed in the housing;
a first coil disposed on the bobbin;
a magnet disposed on the housing;
an upper elastic member coupled to an upper portion of the housing;
a supporting member coupled to the upper elastic member through the hole; and
a base disposed under the housing;
wherein the housing comprises a first surface, to which the upper elastic member is coupled, and a second surface disposed higher than a bottom surface of the housing and lower than the first surface,
wherein the hole is formed in the second surface, and
wherein the housing comprises a through hole formed through the housing and exposing at least a portion of the magnet, and the hole is disposed so as to be located outside of the through hole.

2. The lens moving apparatus according to claim 1, wherein the housing comprises an inclined surface adjacent to the second surface and having a predetermined angle relative to the second surface, and wherein the hole is formed over the inclined surface and the second surface.

3. The lens moving apparatus according to claim 2, wherein
the second surface comprises a horizontal surface connected to the inclined surface,
the inclined surface is located outside of the horizontal surface based on an optical axis, and
the hole is formed over the inclined surface and the horizontal surface.

4. The lens moving apparatus according to claim 1, wherein the through hole exposes a portion of an upper surface of the magnet.

5. The lens moving apparatus according to claim 1, wherein the through hole comprises two through holes spaced apart from each other.

6. The lens moving apparatus according to claim 1, wherein the hole is formed in a corner of the housing and the through hole is formed in the corner of the housing.

7. The lens moving apparatus according to claim 1, wherein the housing comprises a receiving portion for receiving the magnet, and the through hole is connected to the receiving portion.

8. The lens moving apparatus according to claim 7, wherein the magnet is fixed to the receiving portion by an adhesive injected into the receiving portion through the through hole.

9. The lens moving apparatus according to claim 1, wherein the upper elastic member comprises an outer frame coupled to the upper portion of the housing; an inner frame coupled to the upper portion of the bobbin; a frame connection portion connecting the outer frame and the inner frame, and wherein the outer frame comprises a first coupling portion coupled to the supporting member, a second coupling portion coupled to the second surface of the housing, and a connection portion connecting the first coupling portion and the second coupling portion.

10. The lens moving apparatus according to claim 1, wherein the magnet comprising a plurality of magnet bars respectively disposed in each corner of the housing.

11. The lens moving apparatus according to claim 1, comprising a damper disposed between the second surface of the housing and the upper elastic member.

12. The lens moving apparatus according to claim 11, wherein a portion of the damper is disposed in the hole.

13. The lens moving apparatus according to claim 1, wherein the housing comprises four corners and the magnet comprises four magnet bars respectively disposed in the four corners of the housing.

14. The lens moving apparatus according to claim 1, comprising: a second coil disposed under the housing; and a circuit board disposed under the second coil and electrically connected to the supporting member.

15. The lens moving apparatus according to claim 1, wherein the housing comprises a protrusion protruding from the second surface.

16. The lens moving apparatus according to claim 1, wherein the upper elastic member comprises:
an outer frame coupled to the upper portion of the housing;
an inner frame coupled to an upper portion of the bobbin; and
a frame connection portion connecting the outer frame and the inner frame, wherein the outer frame comprises:
a first coupling portion coupled to the supporting member;
a second coupling portion coupled to the second surface of the housing; and
a connection portion connecting the first coupling portion and the second coupling portion.

17. A lens moving apparatus comprising:
a housing comprising a hole;
a bobbin disposed in the housing;
a first coil disposed on the bobbin;
a magnet disposed on the housing;
an upper elastic member coupled to an upper portion of the housing;

a supporting member coupled to the upper elastic member through the hole; and
a base disposed under the housing,
wherein the housing comprises:
a first surface to which the upper elastic member is coupled;
a second surface disposed higher than a bottom surface of the housing and lower than the first surface;
a through hole formed through the housing and exposing at least a portion of the magnet; and
a receiving portion for receiving the magnet,
wherein the through hole is connected to the receiving portion, and
wherein the hole is formed in the second surface.

18. The lens moving apparatus according to claim 17, wherein the magnet is fixed to the receiving portion by an adhesive injected into the receiving portion through the through hole.

19. The lens moving apparatus according to claim 18, wherein the through hole comprises two through holes spaced apart from each other.

20. A lens moving apparatus comprising:
a housing comprising a hole;
a bobbin disposed in the housing;
a first coil disposed on the bobbin;
a magnet disposed on the housing;
an upper elastic member coupled to an upper portion of the housing;
a second coil disposed under the housing;
a circuit board disposed under the second coil;
a supporting member coupled to the upper elastic member through the hole and electrically connected to the circuit board;
a base disposed under the circuit board; and
a damper disposed between the housing and the upper elastic member,
wherein the housing comprises:
a first surface to which the upper elastic member is coupled;
a second surface disposed higher than a bottom surface of the housing and lower than the first surface; and
a through hole formed through the housing and exposing at least a portion of the magnet; and
a receiving portion for receiving the magnet,
wherein the hole is formed in the second surface.

* * * * *